United States Patent
Oppenheimer

(10) Patent No.: US 7,985,911 B2
(45) Date of Patent: Jul. 26, 2011

(54) METHOD AND APPARATUS FOR GENERATING AND UPDATING A PRE-CATEGORIZED SONG DATABASE FROM WHICH CONSUMERS MAY SELECT AND THEN DOWNLOAD DESIRED PLAYLISTS

(76) Inventor: Harold B. Oppenheimer, Lee's Summit, MO (US)

( * ) Notice: Subject to any disclaimer, the term of this patent is extended or adjusted under 35 U.S.C. 154(b) by 240 days.

(21) Appl. No.: 12/105,860

(22) Filed: Apr. 18, 2008

(65) Prior Publication Data
US 2009/0056525 A1 Mar. 5, 2009

Related U.S. Application Data

(63) Continuation-in-part of application No. 11/736,928, filed on Apr. 18, 2007, now abandoned.

(51) Int. Cl.
*G10H 1/00* (2006.01)
(52) U.S. Cl. ............... 84/600; 84/601; 715/716; 700/94
(58) Field of Classification Search ............ 84/600–602; 715/716; 700/94
See application file for complete search history.

(56) References Cited

U.S. PATENT DOCUMENTS

| | | | |
|---|---|---|---|
| 3,951,029 A | 4/1976 | Tsukamoto et al. |
| 4,375,177 A | 3/1983 | McCoskey |
| 4,539,882 A | 9/1985 | Yuzawa |
| 4,926,737 A | 5/1990 | Minamitaka |
| 5,616,876 A | 4/1997 | Kluts |
| 5,818,440 A | 10/1998 | Allibhoy et al. |
| 5,825,850 A | 10/1998 | Bren et al. |
| 5,996,015 A | 11/1999 | Day et al. |
| 6,067,562 A | 5/2000 | Goldman |
| 6,177,626 B1 | 1/2001 | Ishibashi |
| 6,252,152 B1 | 6/2001 | Aoki et al. |
| 6,362,856 B1 | 3/2002 | Guzik et al. |
| 6,441,832 B1 | 8/2002 | Tao et al. |
| 6,526,411 B1 | 2/2003 | Ward |
| 6,587,403 B1 | 7/2003 | Keller et al. |
| 6,647,417 B1 | 11/2003 | Hunter et al. |
| 6,697,800 B1 | 2/2004 | Jannink et al. |
| 6,721,489 B1 | 4/2004 | Benyamin et al. |
| 6,748,395 B1 | 6/2004 | Picker et al. |
| 6,795,820 B2 | 9/2004 | Barnett |
| 6,873,996 B2 | 3/2005 | Chand |
| 6,925,495 B2 | 8/2005 | Hegde et al. |
| 6,928,433 B2 | 8/2005 | Goodman et al. |
| 6,933,433 B1 | 8/2005 | Porteus et al. |
| 6,941,324 B2 | 9/2005 | Plastina et al. |
| 6,987,221 B2 | 1/2006 | Platt |
| 6,993,532 B1 | 1/2006 | Platt et al. |
| 6,999,961 B2 | 2/2006 | Hall |
| 7,041,892 B2 | 5/2006 | Becker |

(Continued)

*Primary Examiner* — David S. Warren
(74) *Attorney, Agent, or Firm* — Erickson, Kernell, Derusseau & Kleypas, LLC

(57) ABSTRACT

Apparatus, methods, systems, and data structures for providing a music-subscription service customer with a portable music device that has been preloaded with customer-selected music. A music-subscription service provider receives a customer order to purchase a portable music device, and also receives the customer's selection of less than all of the music available on the music-subscription service provider's music database. The music-subscription service provider uses a computer to download the customer-selected music to the portable music device ordered by the customer. The music-subscription service provider then provides to the customer the portable music device that has been preloaded with the customer-selected music. The steps may be performed over the Internet and/or at a retail location.

7 Claims, 60 Drawing Sheets

U.S. PATENT DOCUMENTS

| | | |
|---|---|---|
| 7,043,477 B2 | 5/2006 | Mercer et al. |
| 2001/0037721 A1 | 11/2001 | Hasegawa et al. |
| 2002/0019858 A1 | 2/2002 | Kaiser et al. |
| 2002/0037083 A1 | 3/2002 | Weare et al. |
| 2002/0080187 A1 | 6/2002 | Lawton |
| 2002/0087743 A1 | 7/2002 | Givoly |
| 2002/0088336 A1 | 7/2002 | Stahl |
| 2002/0111912 A1 | 8/2002 | Hunter et al. |
| 2003/0009443 A1 | 1/2003 | Yatviskiy |
| 2003/0018709 A1 | 1/2003 | Schrempp et al. |
| 2003/0023421 A1 | 1/2003 | Finn et al. |
| 2003/0023595 A1 | 1/2003 | Carlbom et al. |
| 2003/0033321 A1 | 2/2003 | Schrempp et al. |
| 2003/0033434 A1 | 2/2003 | Kavacheri et al. |
| 2003/0041066 A1 | 2/2003 | Stanfield et al. |
| 2003/0052913 A1 | 3/2003 | Barile |
| 2003/0060157 A1 | 3/2003 | Henrick et al. |
| 2003/0061105 A1 | 3/2003 | Morris et al. |
| 2003/0115351 A1 | 6/2003 | Giobbi |
| 2003/0132953 A1 | 7/2003 | Johnson et al. |
| 2003/0182254 A1 | 9/2003 | Plastina et al. |
| 2003/0182255 A1 | 9/2003 | Plastina et al. |
| 2003/0182315 A1 | 9/2003 | Plastina et al. |
| 2003/0196109 A1 | 10/2003 | Raley |
| 2003/0221541 A1 | 12/2003 | Platt |
| 2003/0226030 A1 | 12/2003 | Hurst et al. |
| 2004/0017997 A1 | 1/2004 | Cowgill |
| 2004/0057348 A1 | 3/2004 | Shteyn et al. |
| 2004/0060426 A1 | 4/2004 | Weare et al. |
| 2004/0078382 A1 | 4/2004 | Mercer et al. |
| 2004/0078383 A1 | 4/2004 | Mercer et al. |
| 2004/0078812 A1 | 4/2004 | Calvert |
| 2004/0083273 A1 | 4/2004 | Madison et al. |
| 2004/0107821 A1 | 6/2004 | Alcalde et al. |
| 2004/0122773 A1 | 6/2004 | McCombs et al. |
| 2004/0133559 A1 | 7/2004 | DeVorzon et al. |
| 2004/0140995 A1 | 7/2004 | Goldthwaite et al. |
| 2004/0164975 A1 | 8/2004 | Ho et al. |
| 2004/0193649 A1 | 9/2004 | Doshida et al. |
| 2004/0215741 A1 | 10/2004 | Watson |
| 2004/0252604 A1 | 12/2004 | Johnson et al. |
| 2004/0255139 A1 | 12/2004 | Giobbi |
| 2004/0267715 A1 | 12/2004 | Polson et al. |
| 2004/0268386 A1 | 12/2004 | Logan et al. |
| 2005/0015718 A1 | 1/2005 | Sambhus et al. |
| 2005/0021500 A1* | 1/2005 | Plastina et al. .................... 707/1 |
| 2005/0038877 A1 | 2/2005 | Gupta et al. |
| 2005/0065912 A1 | 3/2005 | Cafrelli et al. |
| 2005/0071881 A1 | 3/2005 | Deshpande |
| 2005/0076027 A1 | 4/2005 | Kaiser et al. |
| 2005/0097138 A1 | 5/2005 | Kaiser et al. |
| 2005/0097593 A1 | 5/2005 | Raley et al. |
| 2005/0108754 A1 | 5/2005 | Carhart et al. |
| 2005/0120126 A1 | 6/2005 | Gupta et al. |
| 2005/0122853 A1 | 6/2005 | Seo et al. |
| 2005/0138654 A1 | 6/2005 | Minne |
| 2005/0160111 A1* | 7/2005 | Plastina et al. ................ 707/102 |
| 2005/0165779 A1 | 7/2005 | Kaiser et al. |
| 2005/0228830 A1 | 10/2005 | Plastina et al. |
| 2005/0234995 A1* | 10/2005 | Plastina et al. ............. 707/104.1 |
| 2005/0240494 A1 | 10/2005 | Cue et al. |
| 2005/0243863 A1 | 11/2005 | Engelhart |
| 2005/0251566 A1 | 11/2005 | Weel |
| 2005/0251807 A1 | 11/2005 | Weel |
| 2005/0278761 A1 | 12/2005 | Gonder et al. |
| 2005/0283765 A1 | 12/2005 | Warren et al. |
| 2006/0017980 A1 | 1/2006 | Yatabe et al. |
| 2006/0020609 A1 | 1/2006 | LaChapelle et al. |
| 2006/0031293 A1 | 2/2006 | Thommes et al. |
| 2006/0032363 A1 | 2/2006 | Platt |
| 2006/0040609 A1 | 2/2006 | Petschke et al. |
| 2006/0067296 A1* | 3/2006 | Bershad et al. ................ 370/351 |
| 2006/0080261 A1 | 4/2006 | Christal |
| 2006/0089948 A1 | 4/2006 | Picker et al. |
| 2006/0112082 A1 | 5/2006 | Platt et al. |
| 2006/0112098 A1 | 5/2006 | Renshaw et al. |
| 2006/0112808 A1 | 6/2006 | Küskinen et al. |
| 2006/0120384 A1 | 6/2006 | Boutboul et al. |
| 2007/0025194 A1* | 2/2007 | Morse et al. .................. 369/30.1 |
| 2007/0048712 A1* | 3/2007 | Plastina et al. ................ 434/308 |
| 2007/0048713 A1* | 3/2007 | Plastina et al. ................ 434/308 |
| 2007/0048714 A1* | 3/2007 | Plastina et al. ................ 434/308 |
| 2007/0073596 A1* | 3/2007 | Alexander et al. .............. 705/26 |
| 2008/0005673 A1* | 1/2008 | Thane ........................... 715/700 |
| 2008/0109846 A1* | 5/2008 | Ewertz et al. .................... 725/37 |
| 2008/0114794 A1* | 5/2008 | Craner ........................... 707/101 |
| 2008/0115173 A1* | 5/2008 | Ellis et al. ......................... 725/61 |
| 2008/0133311 A1* | 6/2008 | Madriz Ottolina ............. 705/10 |
| 2008/0178238 A1* | 7/2008 | Khedouri et al. .............. 725/109 |
| 2008/0212945 A1* | 9/2008 | Khedouri et al. .............. 386/124 |
| 2008/0215494 A1* | 9/2008 | Corbett ............................ 705/80 |
| 2008/0235589 A1* | 9/2008 | Shaw et al. .................... 715/723 |
| 2008/0244681 A1* | 10/2008 | Gossweiler et al. ........... 725/133 |
| 2008/0257134 A1* | 10/2008 | Oppenheimer ................ 84/609 |
| 2009/0056525 A1* | 3/2009 | Oppenheimber ................ 84/609 |
| 2009/0071316 A1* | 3/2009 | Oppenheimer ................ 84/609 |
| 2009/0144153 A1* | 6/2009 | Kondrk et al. .................. 705/14 |
| 2010/0125351 A1* | 5/2010 | Davydov ......................... 700/94 |
| 2010/0131527 A1* | 5/2010 | Wohlert ......................... 707/758 |
| 2010/0131844 A1* | 5/2010 | Wohlert ......................... 715/716 |
| 2010/0131895 A1* | 5/2010 | Wohlert ......................... 715/811 |

* cited by examiner

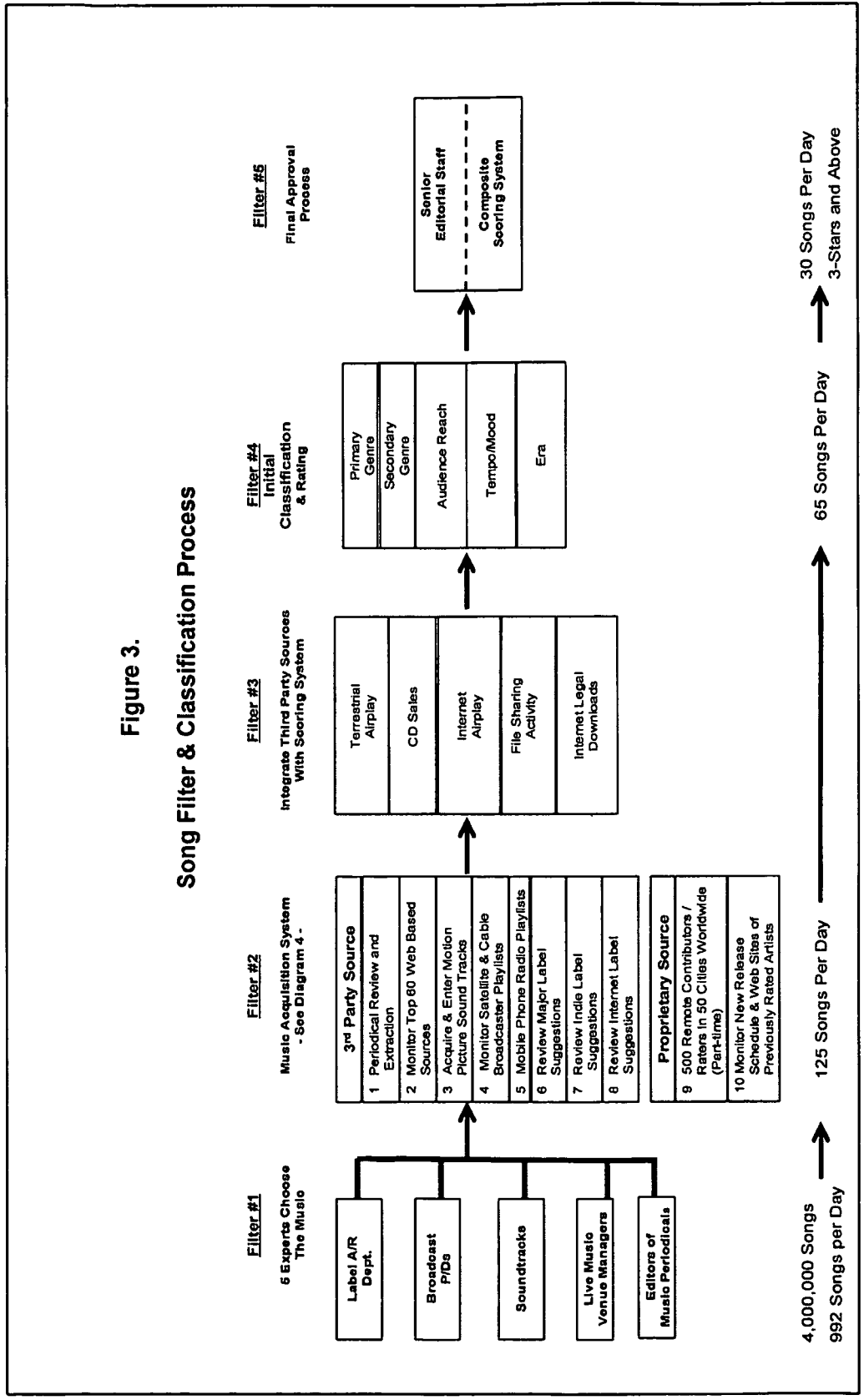

Third Party Sources

1. Periodical Review and Extraction

| Data Sources (Singles Only) | Historical Sources | Editorial Sources (Singles/Albums) |
|---|---|---|
| Radio Airplay Charts | Past Charts and Data | Highly Rated or Reviewed |
| CD Sales Charts | Retrospective Collections | Top Picks |
| Internet Airplay | | Recommended Playlists |
| Downloads | | Famous People Playlists |

Examples

- BPM
- Bender
- BillBoard
- Blender
- Buddyhead.com
- Comes With A Smile
- EW (Listen to This)
- Filter
- Harp
- Jam

- NewMusicWeekly.com w/S TS
- No Depression
- Notion
- MixMag
- Paste
- Pitchforkmedia.com
- R & R
- Relix
- Res
- Rolling Stone

- Spin
- The Big Takeover
- The Source
- Uncut
- Vibe
- XLR & R
- XXL
- Wire

2. Monitor Top 60 Web Based Sources
- Top Songs By Download/Internet Airplay/File Sharing Volume
- New Artist Recommendations
- Playlist Recommendations

*TPM Web Sources Directory*

- 18 Diversified Subscripton Services (Incl.Playlist Recommenders)
- 22 Web Based NewArtist and Playlist Recommenders
- 20 Webcaster/Podcaster Playlist Creators & Recommenders
- 13 Web Based Song Matching or CustomizedPlaylist Generators
- 6 Mobile Music Infrastructure Sites
- 12 Smaller Music Sites
- 15 P2P File SharingSites (Legal and Illegal)
- 10 Online Digital Music Infrastructure Sites
- 8 Download Only Sites
- 5 PodCast Infrastructure Sites

3. Acquire and Enter Motion Picture Sound Tracks

4. Monitor Satellite and Cable Broadcaster Playlists
Examples: Sirius, XM, Music Choice, MTV, VH-1, DMX

5. Mobile Phone Radio Playlists
- 3 (London)
- Axcess Radio Alltel
- iRadio Motorola – 435 Stations
- Sprint (Groove Mobile)
- V-Cast Verizon (Ampd Mobile)

6. Review Major Label Suggestions

7. Review Indie Label Suggestions

8. Review Internet Label Suggestions

Proprietary Sources

9. 500 Remote Contributors/Raters In 50 Cities Worldwide (Part-time)

| Who | Coverage | Support |
|---|---|---|
| • Local Musicians<br>• Venue Employees<br>• College Kids<br>• Bartenders<br>• Amateur Music Buffs<br>• Local Press<br>• DJs<br>• PDs | • Local Concert Venues<br>• Local Music Night Clubs<br>• College Radio Stations<br>• Local Music Press | • Local Venue Artist System |

10. Monitor New Release Schedule and Web Sites of Previously Rated Artists

Figure 4A

| Genre | Genre |
| --- | --- |
| Alternative/Punk | Instrumental |
| Bluegrass | Jazz |
| Blues | Latin |
| Children | Metal |
| Christian | Pop |
| Christmas (X-mas) | R&B (includes Soul andFunk) |
| Country | Rap |
| Dance | Explicit Rap |
| Dirty | Reggae |
| Electronica (includes Techno) | Rock |
| Folk | Movie Scores |
| Funny | Swing |
| Gospel | World |

| Total Song Count | | | 510 |
|---|---|---|---|
| Overall Audience Reach Rating | | | 5 |
| Primary Genre Distribution | | | 17 |
| Alternative/Punk | 6 | Oldies | 15 |
| Bluegrass | 10 | Pop | 282 |
| Blues | 28 | R&B (Includes Soul) | 30 |
| Country | 48 | Rap | 8 |
| Folk | 8 | Reggae | 17 |
| Funny | 2 | Rock | 117 |
| Gospel | 3 | Swing | 9 |
| Jazz | 24 | World | 16 |
| Latin | 7 | | |

| Era Distribution | 5 | Tempo/Mood Available | 4 |
|---|---|---|---|
| Recent | 83 | Includes Slow, Medium, Fast, Party | |
| Modern | 213 | | |
| Classic | 145 | Unique Artists Available | 248 |
| Oldies | 15 | | |
| Archive | 8 | | |

Figure 7

Forced Curve Allocations
For A 14,000 Song Database

| | Individual Rating Category | Individual Song Count | Cumulative Rating Categories | Cumulative Song Count |
|---|---|---|---|---|
| 5-Stars | Top 5% | 700 Songs | 5% | 700 Songs |
| 4-Stars | Next 10% | 1,400 Songs | 15% | 2,100 Songs |
| 3-Stars | Next 35% | 4,900 Songs | 50% | 7,000 Songs |
| 2-Stars | Bottom 50% | 7,000 Songs | 100% | 14,000 Songs |
| 1-Star | Omitted | | | |

Figure 8

| | Favorite Playlists | | | Archive Prior to 1950 | | | Dance | |
|---|---|---|---|---|---|---|---|---|
| 2 | *To Be Determined by Customer* | N/A | 100 | Archive-2 | 400 | 201 | Dance-2 | 129 |
| 3 | *To Be Determined by Customer* | N/A | 101 | Archive-3 | 88 | 202 | Dance-3 | 82 |
| 4 | *To Be Determined by Customer* | N/A | 102 | Archive-4 | 24 | 203 | Dance-4 | 38 |
| 5 | *To Be Determined by Customer* | N/A | 103 | Archive-5 | 6 | 204 | Dance-5 | 8 |
| 6 | *To Be Determined by Customer* | N/A | | Oldies/Archieve | | | | |
| 7 | *To Be Determined by Customer* | N/A | 106 | Oldies/Archieve-2 | 659 | 215 | Dirty | 7 |
| 8 | *To Be Determined by Customer* | N/A | 107 | Oldies/Archieve-3 | 208 | | | |
| 9 | *To Be Determined by Customer* | N/A | 108 | Oldies/Archieve-4 | 70 | | Electonica (incl. Techno) | |
| 10 | *To Be Determined by Customer* | N/A | 109 | Oldies/Archieve-5 | 13 | 228 | Electonica-2 | 352 |
| 11 | *To Be Determined by Customer* | N/A | | | | 229 | Electonica-3 | 95 |
| | | | | Genre: By Rating and Era | | 230 | Electonica-4 | 17 |
| | Star Rating:All Songs | | | Alternative/Punk | | 231 | Electonica-5 | 0 |
| 23 | 1 Star and above | 20,503 | 117 | Alt/Punk-2 | 1,019 | | | |
| 24 | 2 Stars and above | 17,732 | 118 | Alt/Punk-3 | 280 | | Folk | |
| 25 | 3 Stars and above | 6,788 | 119 | Alt/Punk-4 | 51 | 244 | Folk-2 | 261 |
| 26 | 4 Stars and above | 2,267 | 120 | Alt/Punk-5 | 1 | 245 | Folk-3 | 89 |
| 27 | 5 Stars and above | 474 | | | | 246 | Folk-4 | 33 |
| | | | | Bluegrass | | 247 | Folk-5 | 7 |
| | Mood/Tempo:By Rating | | 133 | Bluegrass-2 | 138 | | | |
| 39 | Party-(Danceable) | | 134 | Bluegrass-3 | 57 | 258 | Funny | 160 |
| 41 | Party-2 | 12 | 135 | Bluegrass-4 | 28 | | | |
| 42 | Party-3 | 11 | 136 | Bluegrass-5 | 7 | | Gospel (incl.Christian) | |
| 43 | Party-4 | 4 | | | | 271 | Gospel-2 | 159 |
| 44 | Party-5 | 1 | | Blues | | 272 | Gospel-3 | 42 |
| | Fast | | 149 | Blues-2 | 678 | 273 | Gospel-4 | 9 |
| 47 | Fast-2 | 1,792 | 150 | Blues-3 | 290 | 274 | Gospel-5 | 3 |
| 48 | Fast-3 | 569 | 151 | Blues-4 | 99 | | | |
| 49 | Fast-4 | 84 | 152 | Blues-5 | 28 | | Jazz | |
| 50 | Fast-5 | 18 | | | | 287 | Jazz-2 | 2,393 |
| | Medium | | | Children | | 288 | Jazz-3 | 336 |
| 53 | Medium-2 | 9,612 | 155 | Preschool-2 | N/A | 289 | Jazz-4 | 56 |
| 54 | Medium-3 | 3,886 | 156 | Preschool-3 | N/A | 290 | Jazz-5 | 4 |
| 55 | Medium-4 | 1,245 | 157 | Preschool-4 | N/A | | | |
| 56 | Medium-5 | 231 | 158 | Preschool-5 | N/A | | Latin | |
| | Slow | | 159 | Elementary-2 | N/A | 303 | Latin-2 | 363 |
| 59 | Slow-2 | 5,619 | 160 | Elementary-3 | N/A | 304 | Latin-3 | 105 |
| 60 | Slow-3 | 2,131 | 161 | Elementary-4 | N/A | 305 | Latin-4 | 36 |
| 61 | Slow-4 | 873 | 162 | Elementary-5 | N/A | 306 | Latin-5 | 3 |
| 62 | Slow-5 | 216 | | Country | | | Metal | |
| | Era: By Rating | | 165 | All Country-2 | 1,556 | 319 | Metal-2 | 94 |
| | Recent 03-Now | | 166 | All Country-3 | 667 | 320 | Metal-3 | 19 |
| 76 | Recent-2 | 2,881 | 167 | All Country-4 | 221 | 321 | Metal-4 | 3 |
| 77 | Recent-3 | 1,439 | 168 | All Country-5 | 49 | 322 | Metal-5 | 0 |
| 78 | Recent-4 | 458 | 170 | Recent Country-2 | N/A | | | |
| 79 | Recent-5 | 85 | 171 | Recent Country-3 | 126 | | Pop | |
| | Modern 1983-2002 | | 172 | Recent Country-4 | 42 | 351 | All Pop-2 | 4,435 |
| 82 | Modern-2 | 5,319 | 173 | Recent Country-5 | 5 | 352 | All Pop-3 | 2,466 |
| 83 | Modern-3 | N/A | 175 | Modern Country-2 | N/A | 353 | All Pop-4 | 1,102 |
| 84 | Modern-4 | 817 | 176 | Modern Country-3 | 359 | 354 | All Pop-5 | 268 |
| 85 | Modern-5 | 205 | 177 | Modern Country-4 | 119 | 356 | Recent Pop-2 | 1,066 |
| | Classic 1965-1982 | | 178 | Modern Country-5 | 24 | 357 | Recent Pop-3 | 640 |
| 88 | Classic-2 | 3,846 | 180 | Classic Country-2 | N/A | 358 | Recent Pop-4 | 252 |
| 89 | Classic-3 | 1,583 | 181 | Classic Country-3 | 151 | 359 | Recent Pop-5 | 59 |
| 90 | Classic-4 | 604 | 182 | Classic Country-4 | 56 | 361 | Modern Pop-2 | 2,071 |
| 91 | Classic-5 | 119 | 183 | Classic Country-5 | 19 | 362 | Modern Pop-3 | 981 |
| | Oldies 1950-1964 | | 185 | Old/Arch Country-2 | N/A | 363 | Modern Pop-4 | 486 |
| 94 | Oldies 2 | 428 | 186 | Old/Arch Country-3 | N/A | 364 | Modern Pop-5 | 126 |
| 95 | Oldies 3 | 157 | 187 | Old/Arch Country-4 | N/A | | | |
| 96 | Oldies 4 | 52 | 188 | Old/Arch Country-5 | N/A | | | |
| 97 | Oldies 5 | 10 | | | | | | |
| 366 | Classic Pop-2 | 1,238 | 483 | Modern Rock-4 | 211 | | Rock/Pop: Med/Fast | |
| 367 | Classic Pop-3 | 733 | 484 | Modern Rock-5 | 56 | 602 | All Rock/All Pop-2 | N/A |
| 368 | Classic Pop-4 | 335 | 486 | Classic Rock-2 | 1,274 | 603 | All Rock/All Pop-3 | 2,883 |
| 369 | Classic Pop-5 | 76 | 487 | Classic Rock-3 | 570 | 604 | All Rock/All Pop-4 | 975 |
| 371 | Pop Old/Arch-2 | N/A | 488 | Classic Rock-4 | 198 | 605 | All Rock/All Pop-5 | 195 |
| 372 | Pop Old/Arch-3 | N/A | 489 | Classic Rock-5 | 24 | 607 | Recent Rock/Recent Pop-2 | 1,853 |
| 373 | Pop Old/Arch-4 | N/A | 491 | Rock Old/Arch-2 | N/A | 608 | Recent Rock/Recent Pop-3 | 992 |
| 374 | Pop Old/Arch-5 | N/A | 492 | Rock Old/Arch-3 | N/A | 609 | Recent Rock/Recent Pop-4 | 305 |
| | | | 493 | Rock Old/Arch-4 | N/A | 610 | Recent Rock/Recent Pop-5 | 60 |

FIG. 9A

| | R&B (incl. Soul) | | | 494 Rock Old/Arch-5 | N/A | 612 Modern Rock/Modern Pop-2 | 2,370 |
|---|---|---|---|---|---|---|---|
| 387 | All R&B-2 | 1,163 | | | | 613 Modern Rock/Modern Pop-3 | 1,066 |
| 388 | All R&B-3 | 521 | | Swing | | 614 Modern Rock/Modern Pop-4 | 372 |
| 389 | All R&B-4 | 166 | 507 | Swing-2 | 359 | 615 Modern Rock/Modern Pop-5 | 96 |
| 390 | All R&B-5 | 25 | 508 | Swing-3 | 103 | 617 Recent + Modern Rock/Pop-2 | 4,223 |
| 392 | Recent R&B-2 | 102 | 509 | Swing-4 | 37 | 618 Recent + Modern Rock/Pop-3 | N/A |
| 393 | Recent R&B-3 | 68 | 510 | Swing-5 | 9 | 619 Recent + Modern Rock/Pop-4 | N/A |
| 394 | Recent R&B-4 | 24 | | | | 620 Recent + Modern Rock/Pop-5 | N/A |
| 395 | Recent R&B-5 | 1 | | World | | 622 Classic Rock/Classic Pop-2 | 1,546 |
| 397 | Modern R&B-2 | N/A | 523 | World-2 | 1,052 | 623 Classic Rock/Classic Pop-3 | 802 |
| 398 | Modern R&B-3 | N/A | 524 | World-3 | 274 | 624 Classic Rock/Classic Pop-4 | 292 |
| 399 | Modern R&B-4 | N/A | 525 | World-4 | 66 | 625 Classic Rock/Classic Pop-5 | 35 |
| 400 | Modern R&B-5 | N/A | 526 | World-5 | 14 | | |
| 402 | Classic R&B-2 | N/A | | | | Rock/Pop: Slow | |
| 403 | Classic R&B-3 | N/A | | Christmas | | 638 All Rock/All Pop-2 | N/A |
| 404 | Classic R&B-4 | N/A | 539 | Christmas-2 | N/A | 639 All Rock/All Pop-3 | 1,270 |
| 405 | Classic R&B-5 | N/A | 540 | Christmas-3 | N/A | 640 All Rock/All Pop-4 | 641 |
| 407 | Old/Arch R&B-2 | N/A | 541 | Christmas-4 | N/A | 641 All Rock/All Pop-5 | 164 |
| 408 | Old/Arch R&B-3 | N/A | 542 | Christmas-5 | N/A | 643 Recent Rock/Recent Pop-2 | 593 |
| 409 | Old/Arch R&B-4 | N/A | | | | 644 Recent Rock/Recent Pop-3 | 299 |
| 410 | Old/Arch R&B-5 | N/A | 553 | Combined Genres | | 645 Recent Rock/Recent Pop-4 | 115 |
| | | | | | | 646 Recent Rock/Recent Pop-5 | 22 |
| | Rap | | | 564 Rock/Pop:All | | 648 Modern Rock/Modern Pop-2 | 919 |
| 423 | Rap-2 | 1,316 | 566 | All Rock/All Pop-2 | N/A | 649 Modern Rock/Modern Pop-3 | 530 |
| 424 | Rap-3 | 260 | 567 | All Rock/All Pop-3 | 4,260 | 650 Modern Rock/Modern Pop-4 | 299 |
| 425 | Rap-4 | 42 | 568 | All Rock/All Pop-4 | 1,652 | 651 Modern Rock/Modern Pop-5 | 82 |
| 426 | Rap-5 | 7 | 569 | All Rock/All Pop-5 | 363 | 653 Recent + Modern Rock/Pop-2 | 1,512 |
| | | | 571 | Recent Rock/Recent Pop-2 | 2,526 | 654 Recent + Modern Rock/Pop-3 | 829 |
| | Explicit Rap | | 572 | Recent Rock/Recent Pop-3 | 1,291 | 655 Recent + Modern Rock/Pop-4 | 414 |
| 439 | Explicit Rap-2 | 197 | 573 | Recent Rock/Recent Pop-4 | 420 | 656 Recent + Modern Rock/Pop-5 | 104 |
| 440 | Explicit Rap-3 | N/A | 574 | Recent Rock/Recent Pop-5 | 82 | 658 Classic Rock/Classic Pop-2 | 670 |
| 441 | Explicit Rap-4 | 3 | 576 | Modern Rock/Modern Pop-2 | 3,790 | 659 Classic Rock/Classic Pop-3 | 400 |
| 442 | Explicit Rap-5 | 0 | 577 | Modern Rock/Modern Pop-3 | 1,644 | 660 Classic Rock/Classic Pop-4 | 216 |
| | | | 578 | Modern Rock/Modern Pop-4 | 694 | 661 Classic Rock/Classic Pop-5 | 58 |
| | Reggae | | 579 | Modern Rock/Modern Pop-5 | 181 | | |
| 455 | Reggae-2 | 285 | 581 | Recent + Modern Rock/Pop-2 | 6,316 | | |
| 456 | Reggae-3 | 142 | 582 | Recent + Modern Rock/Pop-3 | 2,935 | | |
| 457 | Reggae-4 | 58 | 583 | Recent + Modern Rock/Pop-4 | 1,114 | | |
| 458 | Reggae-5 | 17 | 584 | Recent + Modern Rock/Pop-5 | 263 | | |
| | | | 586 | Classic Rock/Classic Pop-2 | 2,270 | | |
| | Rock | | 587 | Classic Rock/Classic Pop-3 | 1,221 | | |
| 471 | All Rock-2 | 4,504 | 588 | Classic Rock/Classic Pop-4 | 511 | | |
| 472 | All Rock-3 | 1,905 | 589 | Classic Rock/Classic Pop-5 | 94 | | |
| 473 | All Rock-4 | 582 | | | | | |
| 474 | All Rock-5 | 106 | | | | | |
| 476 | Recent Rock-2 | 1,478 | | | | | |
| 477 | Recent Rock-3 | 661 | | | | | |
| 478 | Recent Rock-4 | 173 | | | | | |
| 479 | Recent Rock-5 | 26 | | | | | |
| 481 | Modern Rock-2 | 1,736 | | | | | |
| 482 | Modern Rock-3 | 670 | | | | | |
| | Country/Bluegrass/Folk (C/B/F):All | | | World/Reggae/Latin (W/R/L): All | | R&B/Rap: All | |
| 687 | All C/B/F-2 | 1,904 | 710 | All W/R/L-2 | 1,679 | 737 All R&B/Rap-2 | 2,456 |
| 688 | All C/B/F-3 | 791 | 711 | All W/R/L-3 | 508 | 738 All R&B/Rap-3 | N/A |
| 689 | All C/B/F-4 | 273 | 712 | All W/R/L-4 | 152 | 739 All R&B/Rap-4 | 204 |
| 690 | All C/B/F-5 | 62 | 713 | All W/R/L-5 | 33 | 740 All R&B/Rap-5 | 32 |
| 691 | Recent C/B/F-2 | N/A | 715 | Recent W/R/L-2 | N/A | 742 Recent R&B/Rap-2 | N/A |
| 692 | Recent C/B/F-3 | N/A | 716 | Recent W/R/L-3 | N/A | 743 Recent R&B/Rap-3 | N/A |
| 693 | Recent C/B/F-4 | N/A | 717 | Recent W/R/L-4 | N/A | 744 Recent R&B/Rap-4 | N/A |
| 694 | Recent C/B/F-5 | N/A | 718 | Recent W/R/L-5 | N/A | 745 Recent R&B/Rap-5 | N/A |
| 695 | Modern C/B/F-2 | N/A | 720 | Modern W/R/L-2 | N/A | 746 Modern R&B/Rap-2 | N/A |
| 696 | Modern C/B/F-3 | N/A | 721 | Modern W/R/L-3 | N/A | 747 Modern R&B/Rap-3 | N/A |
| 697 | Modern C/B/F-4 | N/A | 722 | Modern W/R/L-4 | N/A | 748 Modern R&B/Rap-4 | N/A |
| 698 | Modern C/B/F-5 | N/A | 723 | Modern W/R/L-5 | N/A | 749 Modern R&B/Rap-5 | N/A |
| 699 | Recent + C/B/F-2 | N/A | 725 | Recent + W/R/L-2 | N/A | 751 Recent + R&B/Rap-2 | N/A |
| 700 | Recent + C/B/F-3 | N/A | 726 | Recent + W/R/L-3 | N/A | 752 Recent + R&B/Rap-3 | N/A |
| 701 | Recent + C/B/F-4 | N/A | 727 | Recent + W/R/L-4 | N/A | 753 Recent + R&B/Rap-4 | N/A |
| 702 | Recent + C/B/F-5 | N/A | 728 | Recent + W/R/L-5 | N/A | 754 Recent + R&B/Rap-5 | N/A |
| 703 | Classic C/B/F-2 | N/A | 730 | Classic W/R/L-2 | N/A | 757 Classic R&B/Rap-2 | N/A |
| 704 | Classic C/B/F-3 | N/A | 731 | Classic W/R/L-3 | N/A | 758 Classic R&B/Rap-3 | N/A |
| 705 | Classic C/B/F-4 | N/A | 732 | Classic W/R/L-4 | N/A | 759 Classic R&B/Rap-4 | N/A |
| 706 | Classic C/B/F-5 | N/A | 733 | Classic W/R/L-5 | N/A | 760 Classic R&B/Rap-5 | N/A |

FIG. 9B

CJF WAS 9-13-06

| Title | Artist | Album | Genre | S/M | # |
|---|---|---|---|---|---|
| Long Gone Lonesome Bl | Hank Williams | 20th Century Master | RU-5 Classic Country | S | 2 |
| Wake Up Everybody, Pt. | Harold Melvin & The | Sony Music 100 Yea | PD-B Classic R&B | S | 1 |
| Magnify | Ian Eskelin | Save the Humans | PD-R Recent Pop | S | 2 |
| Keep On Pushing | The Impressions | Ultimate Collection | PD-B Classic R&B | S | 1 |
| Pop That Thang | The Isley Brothers | Brother, Brother, Bro | PD-B Classic R&B | M | 2 |
| Fight the Power | The Isley Brothers | The Ultimate Isley Br | PD-B Classic R&B | M | 1 |
| Friend of God | Israel Houghton & Ne | Live from Another Le | PD-R Gospel | M | 3 |
| Another Breakthrough | Israel Houghton & Ne | Live from Another Le | PD-R Gospel | S | 3 |
| So Hard to Find My Way | Jackie Greene | American Myth | PE-U Modern Pop | M | 1 |
| Supersede | Jackie Greene | American Myth | PE-U Modern Pop | M | 1 |
| Honey I Been Thinking A | Jackie Greene | Sweet Somewhere B | PD-R Blues/Modern Pop | M | 3 |
| The Love You Save | The Jackson 5 | Diana Ross Presents | PD-B Classic R&B | M | 3 |
| Mama's Pearl | The Jackson 5 | Maybe Tomorrow/T | PD-B Classic R&B | M | 1 |
| Never Can Say Goodbye | The Jackson 5 | Maybe Tomorrow/T | PD-B Classic R&B | S | 4 |
| Dancing Machine | The Jackson 5 | Skywriter/Get it Tog | PD-B Classic R&B | M | 2 |
| What If | Jadon Lavik | Moving on Faith | PD-R Recent Pop | S | 2 |
| Papa's Got a Brand New | James Brown | James Brown: The 5 | PD-B Classic R&B | M | 5 |
| Say It Loud I'M Black an | James Brown | James Brown: The 5 | PD-B Classic R&B | M | 1 |
| Get On the Good Foot, P | James Brown | James Brown: The 5 | PD-B Classic R&B | M | 1 |
| Living in America | James Brown | Living in America | PD-B Modern R&B | M | 3 |
| Mother Popcorn, Pt. 1 | James Brown & Astru | James Brown: The 5 | PD-B Classic R&B | M | 1 |
| How Sweet It Is | James Taylor | Live | PD-B Modern Pop | M | 2 |
| God Will Lift Up Your He | Jars of Clay | Redemption Songs | PD-R Recent Pop | M | 3 |
| Open My Eyes | Jeff Anderson | Open My Eyes - Sin | PD-R Recent Pop | S | 1 |
| More Love, More Power | Jeff Deyo | Saturate | PD-R Recent Pop | M | 1 |
| I Give You My Heart | Jeff Deyo | Saturate | PD-R Recent Pop | M | 1 |
| Take You Back | Jeremy Camp | Restored | PD-R Recent Pop | M | 2 |
| Lay Down My Pride | Jeremy Camp | Restored | PD-R Recent Pop | F | 2 |
| This Man | Jeremy Camp | Restored | PD-R Recent Pop | M | 3 |
| Walk by Faith | Jeremy Camp | Stay | PD-R Recent Pop | S | 1 |
| Never Give You Up | Jerry Butler | 20th Century Master | PD-B Classic Pop/R&B | S | 2 |
| Hey, Western Union Man | Jerry Butler | 20th Century Master | PD-B Classic Pop/Classic R&B | M | 2 |
| Ain't Understanding Meli | Jerry Butler & Brenda | 20th Century Master | PD-B Classic Pop/Classic R&B | S | 2 |
| You Are My Sunshine | Jimmie Davis | Louisiana (Soundtrack | RU-5 Classic Country/Classic Pop | S | 3 |
| Blue Yodel No. 1 (T for | Jimmie Rogers | The Essential: Jimmi | RU-5 Classic Country | S | 1 |
| P.T. 109 | Jimmie Dean | Jimmy Dean's Greate | PD-B Classic Country | M | 2 |
| Blessed Like That (Tradit | Jimmy Hicks & The V | Crossroads Reloader | PD-R Gospel | M | 2 |
| We've Come to Praise Hi | Joe Pace | Joe Pace Presents S | PD-R Gospel | M | 1 |
| Ain't Gonna Bump No Mo | Joe Tex | Party Super Hits | PD-B Classic R&B/Funny | M | 2 |
| Louder Than the Angels | Joel Engle | Made for Worship | PD-R Recent Pop | M | 2 |
| Miracle | John David Webster | Made to Shine | PD-R Recent Pop | M | 3 |
| Indiana Girl - Main | John Krondes | Indiana Girl | PD-N Modern Rock | M | 1 |
| Cherry Bomb | John Mellencamp | The Lonesome Jubile | PD-B Modern Pop | M | 3 |
| Walk Tall | John Mellencamp | Words & Music - Jo | PD-R Modern Pop | S | 2 |
| Harvest | John P. Kee | The Color of Music | PD-R Gospel | M | 2 |
| Nuisance | John Reuben | The Boy vs. the Cyni | PD-R Recent Pop | M | 1 |
| Disco Lady | Johnnie Taylor | Eargasm | PD-B Classic R&B | S | 2 |
| Tennessee Flat Top Box | Johnny Cash | 20th Century Masters | RU-5 Modern Country | S | 1 |
| Orange Blossom Special | Johnny Cash | Orange Blossom Spec | RU-5 Classic Country | M | 2 |
| The Ballad of Ira Hayes | Johnny Cash | The Essential Johnny | RU-5 Classic Country | S | 2 |

FIG. 9C

| | | Passive Listeners | Semi-Active Listeners | | |
|---|---|---|---|---|---|
| | | #1 | #2 | #3 | #4 |
| Device Size | | Recommended Song File | Full-Download | Full-Download | Full-Download |
| < 1 GB | | 100 | Exclude Rap | Rap | ETC |
| 1 GB | | 250 | | Rock | ETC |
| 2 GB | | 500 | | Country Only | |
| 4 GB | | 1,000 | | | |
| 20 GB | | 5,000 | | | |
| 40 GB | | 10,000 | | | |
| 60 GB | | 14,000 | | | |

Figure 10

Initial Screen        Figure 12A

CHOOSE ONE

Screen # 1 The PBM Song Library
Learn About PBMusic's 30,000 Hand Rated Song Library and 480 Pre-programmed Playlists — Figures 13A-13I

Screen #2 Loading Your PC
Selecting A Song Library For Your PC — Figures 14A-14J

Screen # 3 Loading Your Device
Selecting A Song Library For Your Portable MP3 Player — Figures 15A-15E

Screen # 4 Building Your Library
Active Users of the Playlist Generator™ Database — Figures 16A-16L

Screen # 5 Join PMB.com
How to Register For A Free Trial (Menu) — Figure 17

Artist Favorites/Song Count    Page 1 of 51                                                   Screen # 1 A - 1

| Artist | # | Artist | # | Artist | # |
|---|---|---|---|---|---|
| 'Til Tuesday | ## | Acker Bilk | ## | Alex Konadu | ## | An Anthology of Sacred | ## |
| Baby Face Willette | ## | Across The Sky | ## | Alexander Bernard | ## | Ana Bárbara | ## |
| *NSYNC | ## | Action Figure Party | ## | Alexandra Slate | ## | Ana Caram | ## |
| .38 Special | ## | The Action | ## | Aleda | ## | Anais & Voltio | ## |
| +/- | ## | Adam Ant | ## | Alexis & Fido | ## | Anastacia | ## |
| 10 Years | ## | Adam Sandler | ## | Alexkid | ## | Anberlin | ## |
| 10,000 Maniacs | ## | Adoniran Barbosa | ## | Alfredo Rey E La Sua | ## | Anchondo | ## |
| The 101'ers | ## | Adrian Belew | ## | Ali Farka Toure | ## | Anderson Sanctuary C | ## |
| 10cc | ## | Adriano Celentano | ## | Alice Cooper | ## | Andreas Johnson | ## |
| 112 | ## | Aerosmith | ## | Alice Deejay | ## | Andrew Bird | ## |
| The 13th Floor Elevators | ## | AFI | ## | Alice In Chains | ## | Andrew Cyrille Quintet | ## |
| The 18th Day Of May | ## | African Brothers | ## | Alicia Bridges | ## | Andrew Hill | ## |
| 1927 | ## | Africando | ## | Alicia Keys | ## | The Andrews Sisters | ## |
| 202 | ## | Africando All Stars | ## | Allison Krauss | ## | Andy Bell | ## |
| 2Pac | ## | Afro Cuban All Stars | ## | Alizée | ## | Andy Gibb | ## |
| 3 Doors Down | ## | Afro Medusa | ## | Alkaholiks | ## | Andy Griffith | ## |
| 30 Seconds to Mars | ## | Afroman | ## | Alkaline Trio | ## | Andy Griggs | ## |
| 311 | ## | The Afters | ## | All-4-One | ## | Andy Irvine, with Patric | ## |
| 3LW | ## | The Agony Scene | ## | The All-American Reje | ## | Andy M. Stewart & Ma | ## |
| The 3rd Generation Ba | ## | Ahmad | ## | All Saints | ## | Andy Russell | ## |
| 3T | ## | Ali & Lyli Vainikainor | ## | All That Remains | ## | Andy White | ## |
| 4 Etoiles | ## | Aimee Mann | ## | Allen Asbury | ## | Andy Williams | ## |
| 4 Non Blondes | ## | Air | ## | Allen Miller | ## | Ane Brun & Madrugad | ## |
| 50 Cent | ## | Air Supply | ## | Allen Toussaint | ## | The Angel Brothers & | ## |
| The 5th Dimension | ## | Akira | ## | Allie Young, Bessy Du | ## | Angelic Upstarts | ## |
| 666 | ## | Akiyoshi | ## | The Allman Brothers B | ## | Angélique Kidjo | ## |
| 702 | ## | Akon | ## | Allure & 112 | ## | Angels & Airwaves | ## |
| 80 | ## | Akwid | ## | Almodóvar & McNamar | ## | The Angels | ## |
| The 88 | ## | Al Amanecer | ## | Alpha Blondy | ## | Angie Martinez, Lil' Mo | ## |
| 899 | ## | Al B. Sure! | ## | Alphaville | ## | Angie Stone | ## |
| 8th Wave | ## | Al Bowlly | ## | Alter Bridge | ## | Ani DiFranco | ## |
| 95 South | ## | Al Cohn | ## | Alternative TV | ## | Animal Collective |## |
| 98° | ## | Al Dexter | ## | Althea & Donna | ## | Animotion | ## |
| A-Ha | ## | Al DiMeola | ## | Alton Ellis & The Flame | ## | Anindo | ## |
| A Dozen Furies | ## | Al Green | ## | Alvin & The Chipmunks | ## | Anita Baker | ## |
| A Flock of Seagulls | ## | Al Hibbler | ## | Alvin Cash & The Crav | ## | Anita Cochran | ## |
| A Perfect Circle | ## | Al Hirt | ## | Aly & AJ | ## | Anita O'Day | ## |
| A Taste Of Honey | ## | Al Hopkins & The Buck | ## | Alyson | ## | Anna Nalick | ## |
| A Tribe Called Quest | ## | Al Johnson | ## | Amadou & Mariam | ## | Anna Oxa | ## |
| A.B. Quintanilla III Y Lo | ## | Al Jolson | ## | Amadou Balaké | ## | Anne Louise Blythe | ## |
| A.C. Reed | ## | Al Martino | ## | Amanda Perez | ## | Anne Murray | ## |
| AA V | ## | Al Stewart | ## | Amaral | ## | Annie | ## |
| Aaron Hall | ## | Alabama | ## | Amazones De Guinee | ## | Annie Brewer | ## |
| Aaron Kane | ## | Alacranes Musical | ## | Ambassadeurs du Mot | ## | Annie Lennox | ## |
| Aaron Neville | ## | Alan Jackson | ## | Ambassadeurs Internat | ## | Annie Ross | ## |
| Aaron Tippin | ## | The Alan Parsons Proj | ## | Amber | ## | Anointed | ## |
| Aaron Zimmer | ## | Alanis Morissette | ## | The Amboy Dukes | ## | Anouar Brahem | ## |
| Abandoned Pools | ## | Alannah Myles | ## | Ambrosia | ## | Anouk | ## |
| Abba | ## | Albert Collins | ## | Ambulance Ltd | ## | Anthony Braxton | ## |
| Abbey Lincoln | ## | Albert King | ## | Amel Larrieux | ## | Anthony Evans | ## |
| ABC | ## | Albert Lee | ## | America | ## | Anthony Hamilton | ## |
| Abdel Gadir Salim & El | ## | The Album Leaf | ## | Amerie | ## | Anthony Wilson | ## |
| Abdullah Ibrahim/ Dollar | ## | Aldo Nova | ## | The Ames Brothers | ## | Anthrax | ## |
| Abou Sylla | ## | Alê Muniz | ## | Amina Claudine Myers | ## | Anti Nowhere League | ## |
| Aby N'Dour | ## | Alejandro Escovedo | ## | Amorphis | ## | Antonello Venditti | ## |
| AC/DC | ## | Alejandro Fernández | ## | Amos Lee | ## | Antonio Carlos Jobim | ## |
| Ace Cannon | ## | Alejandro Sanz | ## | Amparanoia | ## | Antonio Hart | ## |
| Ace Frehley | ## | Aleks Syntek & Ana To | ## | Amuka & Sheila Brody | ## | Antonio Orozco | ## |
| Ace Of Base | ## | Alex Britti | ## | Amy Chappell | ## | Apache Indian | ## |

Figure 13B

Screen # 1 A-2

Genre Favorites/Song Count [1]

Primary Genres

- Alternative/Punk — ###
- Bluegrass — ###
- Blues — ###
- Country — ###
- Dance — ###
- Dirty — ###
- Electronica (incl. Techno) — ###
- Folk — ###
- Funny — ###
- Gospel — ###
- Jazz — ###
- Latin — ###
- Metallica — ###
- Oldies — ###
- Pop — ###
- R&B (incl. Soul) — ###
- Rap (incl. Hip Hop) — ###
- Explicit Rap — ###
- Reggae — ###
- Rock — ###
- Swing — ###
- World — ###
- Christmas — ###

Combined Genres

- Rock/Pop — ###
- Country/Bluegrass/Folk (C/B/F) — ###
- World/Reggae/Latin (W/R/L) — ###
- R&B/Rap — ###

[1] One song may be classified in several different genres. This approach allows additional song combinations (or playlists) without taking up additional space on the MP3 device.

Figure 13C

Screen # 1 A-3

1-5 Stars for Estimated Audience Reach/ Song Count

1-5 Stars for Estimated Audience Reach [2]

1-Star: Processed and Songs Omitted     ###

2-Star: Favorite Songs By That Artist
Favorite Songs In That Genre [3]     ###

3-Star: 50% Crossover Potential
Medium Audience     ###

4-Star: 75% Crossover Potential
Large Audience     ###

5-Star: 95% Crossover Potential
Mass Audience     ###

[2] Choosing a given star rating means all songs at that rating or higher.
[3] Super songs in a small audience genre may receive only 2-Stars or 3-Stars due to their limited audience reach.
For the best songs in a small audience genre, pick 2-Stars and above.

Figure 13D

Screen # 1 A-4

Key Words That Describe Mood/Tempos

| Slow | Relaxed, Softer, Mellow, Easy, Lite, Adult. Lyrics should be clear. Includes Love Songs, Soulful, Most R&B, Reggae, and Gospel. Generally, you cannot hear the Drummer much. Most Instrumental or Jazz music. |

| Medium | Upbeat, Happy, Foot Tapping, 60% of all Rock/Pop, You can hear the Drummer. |

| Fast | Harder or Faster, Dance, Feet Stomping, will include some Hard Rock, Metal, or Angry Loud Music, Heavy Electric Guitar Solo as well as most Club or Dance genre music. |

| Party | Fast Music That Is: Happy, Handy Clapping, Feet Stomping, Stand-Up and Dance, Party/Fiesta/La Pura Vida. |

Figure 13E

480 Recommended Playlists from PushButtonMusic.com    Screen # 1 B

Subscribers that choose to do so can visit the Active Listener area of the website discussed below and use the five criteria above to generate over 1.8 billion different song combinations (playlists). However, for ease of use, PushButtonMusic™ has selected 480 of our most popular playlists. These will appear in numerical order on the subscribers PC and/or portable device (see Playlist Menu, Screen # 1 B-1 / # 1 B-3). To avoid scrolling through the entire playlist menu, subscribers will enter their top 10 playlist choices at the top of the menu list. The diagram below describes how many of these 480 playlist options appear in each of the search criteria described above. (Note: Artist specific playlists are too numerous to include on the playlist menu. For those, the user will use the "artist" button on their portable device menu. Next to each category of playlists shown below is the number of 2-Star and above songs and the number of artists that appear in each playlist.

480 Recommended Playlists With 2-Star and Above Music

| Favorite Playlists | PL # | Songs # | Artists # |
|---|---|---|---|
| Star Ratings/All Songs | | | |
| 1-Star and Above | 5 | 30,000 | 11,580 |
| 2-Stars and Above | 1 | # | # |
| 3-Stars and Above | 1 | # | # |
| 4-Stars and Above | 1 | # | # |
| 5-Stars and Above | 1 | # | # |
| Mood/Tempos/All Songs | | | |
| Slow | 4 | 30,000 | 11,580 |
| Medium | 1 | # | # |
| Fast | 1 | # | # |
| Party (Danceable) | 1 | # | # |
| Eras/All Songs | | | |
| Recent | 4 | 30,000 | 11,580 |
| Modern | 1 | # | # |
| Classic | 1 | # | # |
| Oldies | 1 | # | # |
| Archive | 1 | # | # |
| Combined Genres | | | |
| Rock/Pop | 20 | # | # |
| R&B/Rap | 20 | # | # |
| Country/Bluegrass/Folk | 20 | # | # |
| Oldies/Archieve | 4 | # | # |

| Genre | PL # | Songs # | Artists # |
|---|---|---|---|
| Alternative/Punk | 4 | # | # |
| Bluegrass | 4 | # | # |
| Blues | 4 | # | # |
| Country | 20 | # | # |
| Dance | 4 | # | # |
| Dirty | 1 | # | # |
| Electronica (incl. Techno) | 4 | # | # |
| Folk | 4 | # | # |
| Funny | 1 | # | # |
| Gospel | 4 | # | # |
| Jazz | 4 | # | # |
| Latin | 4 | # | # |
| Metallica | 4 | # | # |
| Oldies | 4 | # | # |
| Pop | 20 | # | # |
| R&B (incl. Soul) | 20 | # | # |
| Rap | 4 | # | # |
| Explicit Rap | 1 | # | # |
| Reggae | 4 | # | # |
| Rock | 20 | # | # |
| Swing | 4 | # | # |
| World | 4 | # | # |
| Christmas | 1 | # | # |
| Total | 480 | 30,000 | 11,580 |

FIG. 13G

| | | | | | | |
|---|---|---|---|---|---|---|
| Favorite Playlists | | | | Dance | | |
| 2 | ---To Be Determined by Customer--- | N/A | | 201 Dance-2 | | 129 |
| 3 | ---To Be Determined by Customer--- | N/A | | 202 Dance-3 | | 82 |
| 4 | ---To Be Determined by Customer--- | N/A | | 203 Dance-4 | | 36 |
| 5 | ---To Be Determined by Customer--- | N/A | | 204 Dance-5 | | 8 |
| 6 | ---To Be Determined by Customer--- | N/A | | | | |
| 7 | ---To Be Determined by Customer--- | N/A | | 215 Disco | | 7 |
| 8 | ---To Be Determined by Customer--- | N/A | | | | |
| 9 | ---To Be Determined by Customer--- | N/A | | 228 Electronica (incl. Techno) | | 352 |
| 10 | ---To Be Determined by Customer--- | N/A | | 229 Electronica-2 | | 17 |
| 11 | ---To Be Determined by Customer--- | N/A | | 230 Electronica-4 | | 95 |
| | | | | 231 Electronica-5 | | 0 |
| | Star Rating: All Songs | | | | | |
| 23 | 1 Star and above | 20,503 | | Folk | | |
| 24 | 2 Stars and above | 17,732 | 117 Alt/Punk-2 | 280 | 244 Folk-2 | 261 |
| 25 | 3 Stars and above | 6,789 | 118 Alt/Punk-3 | 51 | 245 Folk-3 | 89 |
| 26 | 4 Stars and above | 2,267 | 119 Alt/Punk-4 | 1 | 246 Folk-4 | 32 |
| 27 | 5 Stars and above | 474 | 120 Alt/Punk-5 | | 247 Folk-5 | 7 |
| | Mood/Tempo: (Danceable) | | Bluegrass | | | |
| 39 | Party-2 | | 133 Bluegrass-2 | 198 | 259 Funny | 166 |
| 40 | Party-3 | | 134 Bluegrass-3 | 57 | | |
| 41 | Party-4 | | 135 Bluegrass-4 | 28 | Gospel (incl.Christian) | |
| 42 | Party-5 | | 136 Bluegrass-5 | 7 | 271 Gospel-2 | 159 |
| 43 | Fast-2 | 12 | | | 272 Gospel-3 | 42 |
| 44 | Fast-3 | 11 | Blues | | 273 Gospel-4 | 9 |
| 45 | Fast-4 | 1 | 149 Blues-2 | 678 | 274 Gospel-5 | 5 |
| 46 | Fast-5 | | 150 Blues-3 | 260 | | |
| 47 | Medium-2 | 1,792 | 151 Blues-4 | 99 | Jazz | |
| 48 | Medium-3 | 369 | 152 Blues-5 | 26 | 287 Jazz-2 | 2,393 |
| 49 | Medium-4 | 84 | | | 288 Jazz-3 | 336 |
| 50 | Medium-5 | 18 | Children | | 289 Jazz-4 | 56 |
| 52 | Slow-2 | 2,612 | 155 Preschool-2 | N/A | 290 Jazz-5 | 4 |
| 53 | Slow-3 | 2,625 | 156 Preschool-3 | N/A | | |
| 54 | Slow-4 | 1,245 | 157 Preschool-4 | N/A | Latin | |
| 55 | Slow-5 | 231 | 158 Preschool-5 | N/A | 303 Latin-2 | 309 |
| 59 | Slow-2 | 5,619 | 159 Elementary-2 | N/A | 304 Latin-3 | 105 |
| 60 | Slow-3 | 2,131 | 160 Elementary-3 | N/A | 305 Latin-4 | 35 |
| 61 | Slow-4 | 873 | 161 Elementary-4 | N/A | 306 Latin-5 | 3 |
| 62 | Slow-5 | 215 | 162 Elementary-5 | N/A | | |
| | | | | | Metal | |
| | Eras By Rating | | Country | | 319 Metal-2 | 94 |
| | Recent 03-Now | | 165 All Country-2 | 1,556 | 320 Metal-3 | 19 |
| 74 | Recent-2 | 2,691 | 166 All Country-3 | 607 | 321 Metal-4 | 3 |
| 77 | Recent-3 | 1,439 | 167 All Country-4 | 221 | 322 Metal-5 | 0 |
| 78 | Recent-4 | 436 | 168 All Country-5 | 49 | | |
| 79 | Recent-5 | 85 | 170 Recent Country-2 | N/A | Pop | |
| 82 | Modern 1983-2002 | | 171 Recent Country-3 | 42 | 351 All Pop-2 | 4,435 |
| 83 | Modern-2 | 3,319 | 172 Recent Country-4 | 3 | 352 All Pop-3 | 2,466 |
| 84 | Modern-3 | N/A | 173 Recent Country-5 | N/A | 353 All Pop-4 | 1,102 |
| 85 | Modern-4 | 817 | 176 Modern Country-2 | 359 | 354 All Pop-5 | 208 |
| 86 | Modern-5 | 205 | 177 Modern Country-3 | 119 | 356 Recent Pop-2 | 1,066 |
| 88 | Classic 1965-1983 | | 178 Modern Country-4 | 24 | 357 Recent Pop-3 | 640 |
| 89 | Classic-2 | 3,846 | 180 Classic Country-2 | N/A | 358 Recent Pop-4 | 252 |
| 90 | Classic-3 | 1,565 | 181 Classic Country-3 | 131 | 359 Recent Pop-5 | 59 |
| 91 | Classic-4 | 604 | 182 Classic Country-4 | 56 | 361 Modern Pop-2 | 2,071 |
| 92 | Classic-5 | 119 | 183 Classic Country-5 | 19 | 362 Modern Pop-3 | 981 |
| 94 | Oldies 1950-1964 | | 185 Old/Arch Country-2 | N/A | 363 Modern Pop-4 | 466 |
| 95 | Oldies-2 | 428 | 186 Old/Arch Country-3 | N/A | 364 Modern Pop-5 | 126 |
| 96 | Oldies-3 | 137 | 187 Old/Arch Country-4 | N/A | | |
| 97 | Oldies-4 | 52 | 188 Old/Arch Country-5 | N/A | Rock/Pop: Mod/Fast | |
| | Oldies 5 | 10 | | | 602 All Rock/All Pop-2 | N/A |
| 366 | Classic Pop-2 | 1,238 | 483 Modern Rock-4 | 211 | 603 All Rock/All Pop-3 | 2,863 |
| 367 | Classic Pop-3 | 723 | 484 Modern Rock-5 | 56 | 604 All Rock/All Pop-4 | 973 |
| 368 | Classic Pop-4 | 323 | 485 Classic Rock-2 | 1,274 | 605 All Rock/All Pop-5 | 195 |
| 369 | Classic Pop-5 | 76 | 486 Classic Rock-3 | 570 | 607 Recent Rock/Recent Pop-2 | 1,833 |
| 371 | Pop Old/Arch-2 | N/A | 488 Classic Rock-4 | 198 | 608 Recent Rock/Recent Pop-3 | 992 |
| 372 | Pop Old/Arch-3 | N/A | 489 Classic Rock-5 | 24 | 609 Recent Rock/Recent Pop-4 | N/A |
| 373 | Pop Old/Arch-4 | N/A | 491 Rock Old/Arch-2 | N/A | 610 Recent Rock/Recent Pop-5 | 305 |
| 374 | Pop Old/Arch-5 | N/A | 492 Rock Old/Arch-3 | N/A | | 50 |
| | | | 493 Rock Old/Arch-4 | N/A | | |

Screen # 2   Fig. 14A

Selecting A Song Library For Your PC

Subscribers can choose from one of the nine libraries shown below to download from our website to their PC. Music from the Modern, Classic, Oldies, and Archive eras will be provided on DVD as indicated below. Recent Era music will be automatically downloaded via the internet to the subscriber's PC upon installation. Updates to the chosen library, including newly released material and changes to the classification and rating of particular songs, will be made on a daily, weekly, or monthly basis. The estimated download time to install the recent songs and update the chosen library is indicated below assuming DSL speed.

| Library Number | (Choose One) Library Title | Description | Song Count | Artist Count | Total PC Storage Required | Size of DVD Install | Size of Internet Install |
|---|---|---|---|---|---|---|---|
| PC-1 | All 2-Star and Above Songs | Includes all songs with a 2-Star rating or above rating | 20,000 | ### | ?? | ?? | ?? |
| PC-2 | All 3-Star and Above Songs | Includes all songs with a 3-Star rating or above rating | 8,000 e | ### | ?? | ?? | ?? |
| PC-3 | All 4-Star and Above Songs | Includes all songs with a 4-Star rating or above rating | 2,500 e | ### | ?? | ?? | ?? |
| PC-4 | Recommended Full Download (RFD) | Removes 2-Star songs by Artist in High Audience Genres such as Rock, Pop, Country and Rap | 14,000 e | ### | ?? | ?? | ?? |
| PC-5 | RFD Without: Rock/Pop/Dance/ Electronica/Misc | This includes no Rock or Pop songs or miscellaneous genres. [1] All other 2-Star songs are included. | 9,000 e | ### | ?? | ?? | ?? |
| PC-6 | RFD Without: Country/Bluegrass/ Folk/Misc | This includes no Country, Bluegrass, or Folk songs or miscellaneous genres. [1] All other 2-Star songs are included. | 12,000 e | ### | ?? | ?? | ?? |
| PC-7 | RFD Without: World/Reggae/ Latin/Misc | This includes no World, Reggae, Latin, or miscellaneous genres. [1] All other 2-Star songs are included. | 13,000 e | ### | ?? | ?? | ?? |
| PC-8 | RFD Without: R&B/Rap/Explicit Rap/Misc | This includes no R&B, Rap, Explicit Rap or miscellaneous genres. [1] All other 2-Star songs are included. | 11,000 e | ### | ?? | ?? | ?? |
| PC-9 | RFD Without: Jazz/Swing/Oldies/ Archive/Misc | This includes no Jazz, Swing, Oldies, Archive, or miscellaneous genres. [1] All other 2-Star songs are included. | 13,000 e | ### | ?? | ?? | ?? |

[1] Miscellaneous genres includes Dirty, Funny, or Christmas.

Screen # 2 A-1 Fig. 14B

Content of PC Libraries

Library # PC-1
ALL 2-Star and Above Songs

| Total | PL# | Songs # | Artists # |
|---|---|---|---|

| Favorite Playlists | | | |
|---|---|---|---|
| | 0 | 0 | 0 |

| Star Ratings/All Songs | | | |
|---|---|---|---|
| 1-Star and Above | 1 | 20,000 | # |
| 2-Stars and Above | 1 | 10,000 | # |
| 3-Stars and Above | 1 | 5,000 | # |
| 4-Stars and Above | 1 | 1,000 | # |
| 5-Stars and Above | | | |

| Mood/Tempos/All Songs | | | |
|---|---|---|---|
| • Slow | 1 | # | # |
| • Medium | 1 | # | # |
| • Fast | 1 | # | # |
| • Party (Danceable) | 1 | # | # |

| Eras/All Songs | | | |
|---|---|---|---|
| • Recent | 1 | # | # |
| • Modern | 1 | # | # |
| • Classic | 1 | # | # |
| • Oldies | 1 | # | # |
| • Archive | 1 | # | # |

| Combined Genres | | | |
|---|---|---|---|
| • Rock/Pop | # | # | # |
| • R&B/Rap | # | # | # |
| • Country/Bluegrass/Folk | # | # | # |
| • Oldies/Archive | # | # | # |

| Primary Genres | PL# | Songs # | Artists # |
|---|---|---|---|
| • Alternative/Punk | # | # | # |
| • Bluegrass | # | # | # |
| • Blues | # | # | # |
| • Country | # | # | # |
| • Dance | # | # | # |
| • Dirty | # | # | # |
| • Electronica (incl. Techno) | # | # | # |
| • Folk | # | # | # |
| • Funny | # | # | # |
| • Gospel | # | # | # |
| • Jazz | # | # | # |
| • Latin | # | # | # |
| • Metallica | # | # | # |
| • Oldies | # | # | # |
| • Pop | # | # | # |
| • R&B (incl. Soul) | # | # | # |
| • Rap | # | # | # |
| • Explicit Rap | # | # | # |
| • Reggae | # | # | # |
| • Rock | # | # | # |
| • Swing | # | # | # |
| • World | # | # | # |
| • Christmas | # | # | # |
| Total | # | # | # |

Screen # 2 A-2   Fig. 14C

Content of PC Libraries

Library # PC- 2
ALL 3-Star and Above Songs

| Total | PL # | Songs # | Artists # |
|---|---|---|---|
| | | | |

Favorite Playlists

Star Ratings/All Songs
| | | | |
|---|---|---|---|
| • 1-Star and Above | 0 | 0 | 0 |
| • 2-Stars and Above | 1 | 20,000 | # |
| • 3-Stars and Above | 1 | 10,000 | # |
| • 4-Stars and Above | 1 | 5,000 | # |
| • 5-Stars and Above | 1 | 1,000 | # |

Mood/Tempos/All Songs
| | | | |
|---|---|---|---|
| • Slow | 1 | # | # |
| • Medium | 1 | # | # |
| • Fast | 1 | # | # |
| • Party (Danceable) | 1 | # | # |

Eras/All Songs
| | | | |
|---|---|---|---|
| • Recent | 1 | # | # |
| • Modern | 1 | # | # |
| • Classic | 1 | # | # |
| • Oldies | 1 | # | # |
| • Archive | 1 | # | # |

Combined Genres
| | | | |
|---|---|---|---|
| • Rock/Pop | # | # | # |
| • R&B/Rap | # | # | # |
| • Country/Bluegrass/Folk | # | # | # |
| • Oldies/Archieve | # | # | # |

Primary Genres

| | PL # | Songs # | Artists # |
|---|---|---|---|
| • Alternative/Punk | # | # | # |
| • Bluegrass | # | # | # |
| • Blues | # | # | # |
| • Country | # | # | # |
| • Dance | # | # | # |
| • Dirty | # | # | # |
| • Electronica (incl. Techno) | # | # | # |
| • Folk | # | # | # |
| • Funny | # | # | # |
| • Gospel | # | # | # |
| • Jazz | # | # | # |
| • Latin | # | # | # |
| • Metallica | # | # | # |
| • Oldies | # | # | # |
| • Pop | # | # | # |
| • R&B (incl. Soul) | # | # | # |
| • Rap | # | # | # |
| • Explicit Rap | # | # | # |
| • Reggae | # | # | # |
| • Rock | # | # | # |
| • Swing | # | # | # |
| • World | # | # | # |
| • Christmas | # | # | # |
| Total | # | # | # |

Screen # 2 A-3 Fig. 14D

Content of PC Libraries

Library # PC-3
ALL 4-Star and Above Songs

| Total | PL # | Songs # | Artists # | | | PL # | Songs # | Artists # |
|---|---|---|---|---|---|---|---|---|
| Favorite Playlists | | | | | Primary Genres | | | |
| Star Ratings/All Songs | | | | | • Alternative/Punk | | # | # |
| • 1-Star and Above | 0 | 0 | 0 | | • Bluegrass | | # | # |
| • 2-Stars and Above | 1 | 20,000 | # | | • Blues | | # | # |
| • 3-Stars and Above | 1 | 10,000 | # | | • Country | | # | # |
| • 4-Stars and Above | 1 | 5,000 | # | | • Dance | | # | # |
| • 5-Stars and Above | 1 | 1,000 | # | | • Dirty | | # | # |
| Mood/Tempos/All Songs | | | | | • Electronica (incl. Techno) | | # | # |
| • Slow | 1 | # | # | | • Folk | | # | # |
| • Medium | 1 | # | # | | • Funny | | # | # |
| • Fast | 1 | # | # | | • Gospel | | # | # |
| • Party (Danceable) | 1 | # | # | | • Jazz | | # | # |
| Eras/All Songs | | | | | • Latin | | # | # |
| • Recent | 1 | # | # | | • Metallica | | # | # |
| • Modern | 1 | # | # | | • Oldies | | # | # |
| • Classic | 1 | # | # | | • Pop | | # | # |
| • Oldies | 1 | # | # | | • R&B (incl. Soul) | | # | # |
| • Archive | 1 | # | # | | • Rap | | # | # |
| Combined Genres | | | | | • Explicit Rap | | # | # |
| • Rock/Pop | | # | # | | • Reggae | | # | # |
| • R&B/Rap | | # | # | | • Rock | | # | # |
| • Country/Bluegrass/Folk | | # | # | | • Swing | | # | # |
| • Oldies/Archive | | # | # | | • World | | # | # |
| | | | | | • Christmas | | # | # |
| | | | | | Total | | | |

Screen # 2 A-4  Fig. 14E

Content of PC Libraries
Library # PC-4
Recommended Full Download (RFD)

| Total | PL# | Songs # | Artists # | | PL# | Songs # | Artists # |
|---|---|---|---|---|---|---|---|
| Favorite Playlists | | | | Primary Genres | | | |
| | | | | • Alternative/Punk | # | # | # |
| Star Ratings/All Songs | | | | • Bluegrass | # | # | # |
| 1-Star and Above | 0 | 0 | 0 | • Blues | # | # | # |
| 2-Stars and Above | 1 | 20,000 | # | • Country | # | # | # |
| 3-Stars and Above | 1 | 10,000 | # | • Dance | # | # | # |
| 4-Stars and Above | 1 | 5,000 | # | • Dirty | # | # | # |
| 5-Stars and Above | 1 | 1,000 | # | • Electronica (incl. Techno) | # | # | # |
| | | | | • Folk | # | # | # |
| Mood/Tempos/All Songs | | | | • Funny | # | # | # |
| • Slow | 1 | # | # | • Gospel | # | # | # |
| • Medium | 1 | # | # | • Jazz | # | # | # |
| • Fast | 1 | # | # | • Latin | # | # | # |
| • Party (Danceable) | 1 | # | # | • Metallica | # | # | # |
| | | | | • Oldies | # | # | # |
| Eras/All Songs | | | | • Pop | # | # | # |
| • Recent | 1 | # | # | • R&B (incl. Soul) | # | # | # |
| • Modern | 1 | # | # | • Rap | # | # | # |
| • Classic | 1 | # | # | • Explicit Rap | # | # | # |
| • Oldies | 1 | # | # | • Reggae | # | # | # |
| • Archive | 1 | # | # | • Rock | # | # | # |
| | | | | • Swing | # | # | # |
| Combined Genres | | | | • World | # | # | # |
| • Rock/Pop | # | # | # | • Christmas | # | # | # |
| • R&B/Rap | # | # | # | Total | # | # | # |
| • Country/Bluegrass/Folk | # | # | # | | | | |
| • Oldies/Archieve | # | # | # | | | | |

Fig. 14F

Screen # 2 A-5

Content of PC Libraries
Library # PC- 5
RFD Without: Rock/Pop/Dance/Electronica/Misc.

| Total | PL# | Songs # | Artists # |
|---|---|---|---|

Favorite Playlists

Star Ratings/All Songs
| | PL# | Songs # | Artists # |
|---|---|---|---|
| 1-Star and Above | 0 | 0 | 0 |
| 2-Stars and Above | 1 | 20,000 | # |
| 3-Stars and Above | 1 | 10,000 | # |
| 4-Stars and Above | 1 | 5,000 | # |
| 5-Stars and Above | 1 | 1,000 | # |

Mood/Tempos/All Songs
| | PL# | Songs # | Artists # |
|---|---|---|---|
| Slow | 1 | # | # |
| Medium | 1 | # | # |
| Fast | 1 | # | # |
| Party (Danceable) | 1 | # | # |

Eras/All Songs
| | PL# | Songs # | Artists # |
|---|---|---|---|
| Recent | 1 | # | # |
| Modern | 1 | # | # |
| Classic | 1 | # | # |
| Oldies | 1 | # | # |
| Archive | 1 | # | # |

Combined Genres
| | PL# | Songs # | Artists # |
|---|---|---|---|
| Rock/Pop | # | # | # |
| R&B/Rap | # | # | # |
| Country/Bluegrass/Folk | # | # | # |
| Oldies/Archieve | # | # | # |

Primary Genres
| | PL# | Songs # | Artists # |
|---|---|---|---|
| Alternative/Punk | | | |
| Bluegrass | # | # | # |
| Blues | # | # | # |
| Country | # | # | # |
| Dance | # | # | # |
| Dirty | # | # | # |
| Electronica (incl. Techno) | # | # | # |
| Folk | # | # | # |
| Funny | # | # | # |
| Gospel | # | # | # |
| Jazz | # | # | # |
| Latin | # | # | # |
| Metallica | # | # | # |
| Oldies | # | # | # |
| Pop | # | # | # |
| R&B (incl. Soul) | # | # | # |
| Rap | # | # | # |
| Explicit Rap | # | # | # |
| Reggae | # | # | # |
| Rock | # | # | # |
| Swing | # | # | # |
| World | # | # | # |
| Christmas | # | # | # |
| Total | # | # | # |

Fig. 14G

Screen # 2 A-6

Content of PC Libraries
Library # PC-6
RFD Without: Country/Bluegrass/Folk/Misc.

| Total | PL # | Songs # | Artists # |
|---|---|---|---|
| Favorite Playlists | | | |
| Star Ratings/All Songs | | | |
| 1-Star and Above | 0 | 0 | 0 |
| 2-Stars and Above | 1 | 20,000 | # |
| 3-Stars and Above | 1 | 10,000 | # |
| 4-Stars and Above | 1 | 5,000 | # |
| 5-Stars and Above | 1 | 1,000 | # |
| Mood/Tempos/All Songs | | | |
| Slow | 1 | # | # |
| Medium | 1 | # | # |
| Fast | 1 | # | # |
| Party (Danceable) | 1 | # | # |
| Eras/All Songs | | | |
| Recent | 1 | # | # |
| Modern | 1 | # | # |
| Classic | 1 | # | # |
| Oldies | 1 | # | # |
| Archive | 1 | # | # |
| Combined Genres | | | |
| Rock/Pop | # | # | # |
| R&B/Rap | # | # | # |
| Country/Bluegrass/Folk | # | # | # |
| Oldies/Archive | # | # | # |

| | PL # | Songs # | Artists # |
|---|---|---|---|
| Primary Genres | | | |
| Alternative/Punk | # | # | # |
| Bluegrass | # | # | # |
| Blues | # | # | # |
| Country | # | # | # |
| Dance | # | # | # |
| Dirty | # | # | # |
| Electronica (incl. Techno) | # | # | # |
| Folk | # | # | # |
| Funny | # | # | # |
| Gospel | # | # | # |
| Jazz | # | # | # |
| Latin | # | # | # |
| Metallica | # | # | # |
| Oldies | # | # | # |
| Pop | # | # | # |
| R&B (incl. Soul) | # | # | # |
| Rap | # | # | # |
| Explicit Rap | # | # | # |
| Reggae | # | # | # |
| Rock | # | # | # |
| Swing | # | # | # |
| World | # | # | # |
| Christmas | # | # | # |
| Total | # | # | # |

Screen # 2 A-7   Fig. 14H

Content of PC Libraries
Library # PC-7
RFD Without: World/Reggae/Latin/Misc.

| Total | PL # | Songs # | Artists # |
|---|---|---|---|
| Favorite Playlists | | | |
| Star Ratings/All Songs | | | |
| 1-Star and Above | 0 | 0 | 0 |
| 2-Stars and Above | 1 | 20,000 | # |
| 3-Stars and Above | 1 | 10,000 | # |
| 4-Stars and Above | 1 | 5,000 | # |
| 5-Stars and Above | 1 | 1,000 | # |
| Mood/Tempos/All Songs | | | |
| Slow | 1 | # | # |
| Medium | 1 | # | # |
| Fast | 1 | # | # |
| Party (Danceable) | 1 | # | # |
| Eras/All Songs | | | |
| Recent | 1 | # | # |
| Modern | 1 | # | # |
| Classic | 1 | # | # |
| Oldies | 1 | # | # |
| Archive | 1 | # | # |
| Combined Genres | | | |
| Rock/Pop | # | # | # |
| R&B/Rap | # | # | # |
| Country/Bluegrass/Folk | # | # | # |
| Oldies/Archieve | # | # | # |

| | PL # | Songs # | Artists # |
|---|---|---|---|
| Primary Genres | | | |
| Alternative/Punk | # | # | # |
| Bluegrass | # | # | # |
| Blues | # | # | # |
| Country | # | # | # |
| Dance | # | # | # |
| Dirty | # | # | # |
| Electronica (incl. Techno) | # | # | # |
| Folk | # | # | # |
| Funny | # | # | # |
| Gospel | # | # | # |
| Jazz | # | # | # |
| Latin | # | # | # |
| Metallica | # | # | # |
| Oldies | # | # | # |
| Pop | # | # | # |
| R&B (incl. Soul) | # | # | # |
| Rap | # | # | # |
| Explicit Rap | # | # | # |
| Reggae | # | # | # |
| Rock | # | # | # |
| Swing | # | # | # |
| World | # | # | # |
| Christmas | # | # | # |
| Total | # | # | # |

Content of PC Libraries
Library # PC-8
RFD Without: R&B/Rap/Explicit Rap/Misc.

Screen # 2 A-8  Fig. 14I

| Total | PL# | Songs # | Artists # |  | | PL# | Songs # | Artists # |
|---|---|---|---|---|---|---|---|---|
| Favorite Playlists | | | | | | | | |
| | | | | Primary Genres | | | | |
| Star Ratings/All Songs | | | | | Alternative/Punk | | # | # |
|   1-Star and Above | 0 | 0 | 0 | | Bluegrass | | # | # |
|   2-Stars and Above | 1 | 20,000 | # | | Blues | | # | # |
|   3-Stars and Above | 1 | 10,000 | # | | Country | | # | # |
|   4-Stars and Above | 1 | 5,000 | # | | Dance | | # | # |
|   5-Stars and Above | 1 | 1,000 | # | | Dirty | | # | # |
| | | | | | Electronica (incl. Techno) | | # | # |
| Mood/Tempos/All Songs | | | | | Folk | | # | # |
|   Slow | 1 | # | # | | Funny | | # | # |
|   Medium | 1 | # | # | | Gospel | | # | # |
|   Fast | 1 | # | # | | Jazz | | # | # |
|   Party (Danceable) | 1 | # | # | | Latin | | # | # |
| | | | | | Metallica | | # | # |
| Eras/All Songs | | | | | Oldies | | # | # |
|   Recent | 1 | # | # | | Pop | | # | # |
|   Modern | 1 | # | # | | R&B (incl. Soul) | | # | # |
|   Classic | 1 | # | # | | Rap | | # | # |
|   Oldies | 1 | # | # | | Explicit Rap | | # | # |
|   Archive | 1 | # | # | | Reggae | | # | # |
| | | | | | Rock | | # | # |
| Combined Genres | | | | | Swing | | # | # |
|   Rock/Pop | # | # | # | | World | | # | # |
|   R&B/Rap | # | # | # | | Christmas | | # | # |
|   Country/Bluegrass/Folk | # | # | # | | Total | | | |
|   Oldies/Archieve | # | # | # | | | | | |

Screen # 2 A-9 Fig. 14J

Content of PC Libraries
Library # PC-9
RFD Without: Jazz/Swing/Oldies/Archive/Misc.

| Total | PL # | Songs # | Artists # |
|---|---|---|---|
| Favorite Playlists | | | |
| Star Ratings/All Songs | | | |
| 1-Star and Above | 0 | 0 | 0 |
| 2-Stars and Above | 1 | 20,000 | # |
| 3-Stars and Above | 1 | 10,000 | # |
| 4-Stars and Above | 1 | 5,000 | # |
| 5-Stars and Above | 1 | 1,000 | # |
| Mood/Tempos/All Songs | | | |
| • Slow | 1 | # | # |
| • Medium | 1 | # | # |
| • Fast | 1 | # | # |
| • Party (Danceable) | 1 | # | # |
| Eras/All Songs | | | |
| • Recent | 1 | # | # |
| • Modern | 1 | # | # |
| • Classic | 1 | # | # |
| • Oldies | 1 | # | # |
| • Archive | 1 | # | # |
| Combined Genres | | | |
| • Rock/Pop | # | # | # |
| • R&B/Rap | # | # | # |
| • Country/Bluegrass/Folk | # | # | # |
| • Oldies/Archieve | # | # | # |

| Primary Genres | PL # | Songs # | Artists # |
|---|---|---|---|
| • Alternative/Punk | # | # | # |
| • Bluegrass | # | # | # |
| • Blues | # | # | # |
| • Country | # | # | # |
| • Dance | # | # | # |
| • Dirty | # | # | # |
| • Electronica (incl. Techno) | # | # | # |
| • Folk | # | # | # |
| • Funny | # | # | # |
| • Gospel | # | # | # |
| • Jazz | # | # | # |
| • Latin | # | # | # |
| • Metallica | # | # | # |
| • Oldies | # | # | # |
| • Pop | # | # | # |
| • R&B (incl. Soul) | # | # | # |
| • Rap | # | # | # |
| • Explicit Rap | # | # | # |
| • Reggae | # | # | # |
| • Rock | # | # | # |
| • Swing | # | # | # |
| • World | # | # | # |
| • Christmas | # | # | # |
| Total | # | # | # |

Screen # 3   Fig. 15A

Loading Your Portable Device

Selecting A Song Library For Your Portable Device

Once their selected library is loaded to Windows Media Player-11 on the subscribers PC, they can begin the process of side loading their portable MP3 player. This is a two step process as shown below. In the first step, the user must decide how much of their device capacity they wish to load with pre-programmed playlists from PBMusic.

In the second step, subscribers can choose between three levels of involvement in selecting music for their MP3 players. 1) "Passive" users can simply select the PushButtonMusic™ Recommended Full Download (RFD) for their device size. 2) "Semi-Active" users can browse among a variety of libraries designed for their device size similar to the way they selected their PC Library. 3) "Active" users can use any combination of the five selection criteria available to generate a series of totally unique playlists. Whatever combination of playlists or entire libraries chosen by the user, those choices will be updated on a daily, weekly, or monthly basis.

Identify Your Device:

- MP3 Enabled Mobile Phones, PDA's
- MP3: Flash Memory
- MP3: Hard-Drive

Select Your Device Library:

- Portable Device Libraries Available By Device Size

Identify Your Device

Screen # 3 A Fig. 15B

Below is a list of Windows Media Player-11 / Play-For-Sure compatible devices as of October of 2006.

| | 1 GB<br>250 Songs | 2 GB<br>500 Songs | 5 GB<br>1,250 Songs | 10 GB<br>2,500 Songs | 20 GB<br>5,000 Songs | 30 GB<br>7,500 Songs | 60 GB<br>14,000 Songs |
|---|---|---|---|---|---|---|---|
| MP3 Enabled Mobile Phones, PDA's | Device Name<br>Device Name<br>Device Name | Device Name<br>Device Name | | | | | |
| MP3: Flash Memory | Device Name<br>Device Name | Device Name | Device Name<br>Device Name<br>Device Name | Device Name | | | |
| MP3: Hard-Drive | | | | Device Name<br>Device Name<br>Device Name | Device Name<br>Device Name | Device Name | |

- Please Identify your device:
- Please indicate the amount of song capacity you wish to load with pre-programmed music:
  _____ (song number).

Screen # 3 B  Fig. 15C

Portable Libraries Available By Device Size

CHOOSE ONE DEVICE SIZE TO VIEW LIBRARY OPTIONS

| Desired Library Size | | Recommended Full Downloads For Passive Users | Selection of Full Download For Semi-Active Users | Customized Downloads For Active Users |
|---|---|---|---|---|
| Songs | GBs | | | |
| ☐ 4,000 / 19,000 | 80 | 1 | 1 | Customized |
| ☐ 7,500 / 14,000 | 60 | 1 | 7 | Customized |
| ☐ 5,000 / 7,500 | 30 | 1 | 6 | Customized |
| ☐ 2,500 / 5,000 | 20 | 0 | 10 | Customized |
| ☐ 1,250 / 2,500 | 10 | 0 | 15 | Customized |
| ☐ 500 / 1,250 | 5 | 0 | 20 | Customized |
| ☐ 250 / 500 | 2 | 0 | 25 | Customized [1] |
| ☐ 0 / 250 | 1 | 0 | 30 | Customized [1] |

[1] Creating a large number of playlists from a very small library will result in just a few songs per playlist.

Screen # 3 B-1 Fig. 15D

Libraries Available for 7,500 / 14,000 Song Device

Recommended Full Download For Passive Users

| Library Number | Library Title | Description | Song Count | Artist Count | Total PC Storage Required | Size of DVD Install | Size of Internet Install | Daily Update at DSL Speed |
|---|---|---|---|---|---|---|---|---|
| PC-4 | Recommended Full Download (RFD) | Includes all songs with a 2-Star rating or above rating | 14,000 e | ### | ?? | ?? | ?? | ?? |

Selection of Full Downloads For Semi-Active Users

| Library Number | Library Title | Description | Song Count | Artist Count | Storage Required | Size of DVD Install | Internet Install | Update at DSL Speed |
|---|---|---|---|---|---|---|---|---|
| PC-2 | All 3-Star and Above Songs | Includes all songs with a 2-Star rating or above rating | 8,000 e | ### | ?? | ?? | ?? | ?? |
| PC-3 | All 4-Star and Above Songs | Includes all songs with a 4-Star rating or above rating | 2,500 e | ### | ?? | ?? | ?? | ?? |
| PC-5 | RFD Without: Rock/Pop/Dance/ Electronica/Misc | This includes no Rock or Pop songs or miscellaneous genres. [1] All other 2-Star songs are included. | 9,000 e | ### | ?? | ?? | ?? | ?? |
| PC-6 | RFD Without: Country/Bluegrass/ Folk/Misc | This includes no Country, Bluegrass, or Folk songs or miscellaneous genres. [1] All other 2-Star songs are included. | 12,000 e | ### | ?? | ?? | ?? | ?? |
| PC-7 | RFD Without: World/Reggae/ Latin/Misc | This includes no World, Reggae, Latin, or miscellaneous genres. [1] All other 2-Star songs are included. | 13,000 e | ### | ?? | ?? | ?? | ?? |
| PC-8 | RFD Without: R&B/Rap/Explicit Rap/Misc | This includes no R&B, Rap, Explicit Rap or miscellaneous genres. [1] All other 2-Star songs are included. | 11,000 e | ### | ?? | ?? | ?? | ?? |
| PC-9 | RFD Without: Jazz/Swing/Oldies/ Archive/Misc | This includes no Jazz, Swing, Oldies, Archive, or miscellaneous genres. [1] All other 2-Star songs are included. | 13,000 e | ### | ?? | ?? | ?? | ?? |

Screen # 3 B-2 Fig. 15E

Content of Device Library

Whether the user selects a library from the Passive or Semi-Active Menu, or constructs their own on the Active User Site, the contents of their portable library will be displayed as shown below. In this way, users can click on a library choice and see what it contains.

Library PC – 4: Recommended Full Download

| Total | PL # | Songs # | Artists # | | | PL # | Songs # | Artists # |
|---|---|---|---|---|---|---|---|---|
| Favorite Playlists | | | | | | | | |
| Star Ratings/All Songs | | | | | Primary Genres | | | |
| 1-Star and Above | 0 | 0 | 0 | | Alternative/Punk | # | # | # |
| 2-Stars and Above | 1 | 20,000 | # | | Bluegrass | # | # | # |
| 3-Stars and Above | 1 | 10,000 | # | | Blues | # | # | # |
| 4-Stars and Above | 1 | 5,000 | # | | Country | # | # | # |
| 5-Stars and Above | 1 | 1,000 | # | | Dance | # | # | # |
| | | | | | Dirty | # | # | # |
| Mood/Tempos/All Songs | | | | | Electronica (incl. Techno) | # | # | # |
| • Slow | 1 | # | # | | Folk | # | # | # |
| • Medium | 1 | # | # | | Funny | # | # | # |
| • Fast | 1 | # | # | | Gospel | # | # | # |
| • Party (Danceable) | 1 | # | # | | Jazz | # | # | # |
| | | | | | Latin | # | # | # |
| Eras/All Songs | | | | | Metallica | # | # | # |
| • Recent | 1 | # | # | | Oldies | # | # | # |
| • Modern | 1 | # | # | | Pop | # | # | # |
| • Classic | 1 | # | # | | R&B (incl. Soul) | # | # | # |
| • Oldies | 1 | # | # | | Rap | # | # | # |
| • Archive | 1 | # | # | | Explicit Rap | # | # | # |
| | | | | | Reggae | # | # | # |
| Combined Genres | | | | | Rock | # | # | # |
| • Rock/Pop | # | # | # | | Swing | # | # | # |
| • R&B/Rap | # | # | # | | World | # | # | # |
| • Country/Bluegrass/Folk | # | # | # | | Christmas | # | # | # |
| • Oldies/Archive | # | # | # | | Total | # | # | # |

Building A Customized Library
Active Users of the Playlist Generator™ Database The PushButtonMusic™ Playlist Generator™ Creates A New Tool For Active Listeners To Develop Millions of Playlist Options.

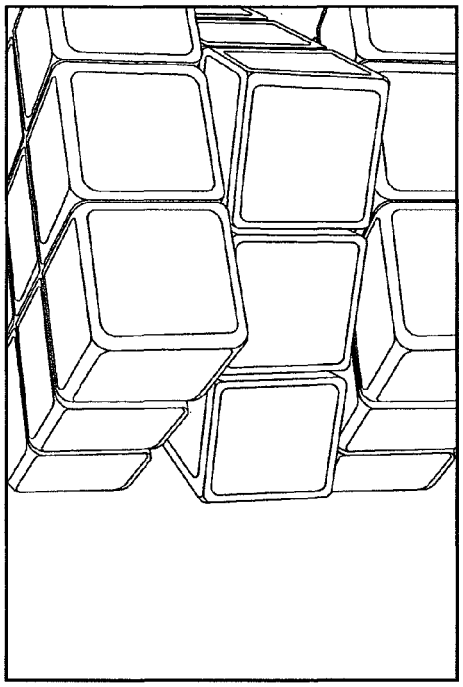

For ease of use, we provide two different methods for "Active Listeners" to create a library of songs to side load to their portable device as shown below. Regardless of the method a Music Fuel Gauge appears at the top of the screen indicating the song count in your library and the room left on your device.

FIG. 16A

Identify Your Device

Screen # 4 A-1  Fig. 16B

Below is a list of Windows Media Player-11 / Play-For-Sure compatible devices as of October of 2006.

| | 1 GB<br>250 Songs | 2 GB<br>500 Songs | 5 GB<br>1,250 Songs | 10 GB<br>2,500 Songs | 20 GB<br>5,000 Songs | 30 GB<br>7,500 Songs | 60 GB<br>14,000 Songs |
|---|---|---|---|---|---|---|---|
| MP3 Enabled Mobile Phones, PDA's | Device Name<br>Device Name<br>Device Name | Device Name<br>Device Name | | | | | |
| MP3: Flash Memory | Device Name<br>Device Name | Device Name | Device Name<br>Device Name<br>Device Name | Device Name | | | |
| MP3: Hard-Drive | | | | Device Name<br>Device Name<br>Device Name | Device Name<br>Device Name | Device Name | |

- Please Identify your device: _____
- Please indicate the amount of song capacity you wish to load with pre-programmed music: _____ (song number).

Select Whole Playlists  Screen # 4 B-1  Fig. 16C

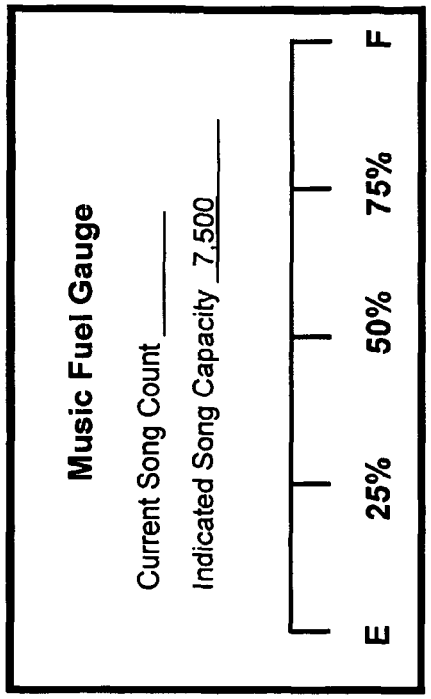

Music Fuel Gauge

Current Song Count _____
Indicated Song Capacity  7,500

E   25%   50%   75%   F

To utilize this method simply click to the next screen where you will find the PBMusic Recommended Playlist Menu. By clicking on the playlist number you desire, that list will automatically be dropped into your library. Duplications across the playlists will be automatically eliminated and then your music fuel gauge will be adjusted appropriately.

Recommended Playlist Menu  page 1   Screen # 4 B-1

The next three screens display the numbered playlist that will appear on the subscribers PC and portable device. (This playlist will also be provided in a separate hard-copy brochure for subscribers.)

| | Favorite Playlists | | | Archive Prior to 1950 | | | Dance | |
|---|---|---|---|---|---|---|---|---|
| 2 | *To Be Determined by Customer* | N/A | 100 | Archive-2 | 400 | 201 | Dance-2 | 129 |
| 3 | *To Be Determined by Customer* | N/A | 101 | Archive-3 | 88 | 202 | Dance-3 | 82 |
| 4 | *To Be Determined by Customer* | N/A | 102 | Archive-4 | 24 | 203 | Dance-4 | 38 |
| 5 | *To Be Determined by Customer* | N/A | 103 | Archive-5 | 6 | 204 | Dance-5 | 8 |
| 6 | *To Be Determined by Customer* | N/A | | Oldies/Archieve | | | | |
| 7 | *To Be Determined by Customer* | N/A | 106 | Oldies/Archieve-2 | 659 | 215 | Dirty | 7 |
| 8 | *To Be Determined by Customer* | N/A | 107 | Oldies/Archieve-3 | 208 | | | |
| 9 | *To Be Determined by Customer* | N/A | 108 | Oldies/Archieve-4 | 70 | | Electonica (incl. Techno) | |
| 10 | *To Be Determined by Customer* | N/A | 109 | Oldies/Archieve-5 | 13 | 228 | Electonica-2 | 352 |
| 11 | *To Be Determined by Customer* | N/A | | | | 229 | Electonica-3 | 95 |
| | | | | Genre: By Rating and Era | | 230 | Electonica-4 | 17 |
| | Star Rating:All Songs | | | Alternative/Punk | | 231 | Electonica-5 | 0 |
| 23 | 1 Star and above | 20,503 | 117 | Alt/Punk-2 | 1,019 | | | |
| 24 | 2 Stars and above | 17,732 | 118 | Alt/Punk-3 | 280 | | Folk | |
| 25 | 3 Stars and above | 6,788 | 119 | Alt/Punk-4 | 51 | 244 | Folk-2 | 261 |
| 26 | 4 Stars and above | 2,267 | 120 | Alt/Punk-5 | 1 | 245 | Folk-3 | 89 |
| 27 | 5 Stars and above | 474 | | | | 246 | Folk-4 | 33 |
| | | | | Bluegrass | | 247 | Folk-5 | 7 |
| | Mood/Tempo:By Rating | | 133 | Bluegrass-2 | 138 | | | |
| 39 | Party-(Danceable) | | 134 | Bluegrass-3 | 57 | 258 | Funny | 160 |
| 41 | Party-2 | 12 | 135 | Bluegrass-4 | 28 | | | |
| 42 | Party-3 | 11 | 136 | Bluegrass-5 | 7 | | Gospel (incl.Christian) | |
| 43 | Party-4 | 4 | | | | 271 | Gospel-2 | 159 |
| 44 | Party-5 | 1 | | Blues | | 272 | Gospel-3 | 42 |
| | Fast | | 149 | Blues-2 | 678 | 273 | Gospel-4 | 9 |
| 47 | Fast-2 | 1,792 | 150 | Blues-3 | 290 | 274 | Gospel-5 | 3 |
| 48 | Fast-3 | 569 | 151 | Blues-4 | 99 | | | |
| 49 | Fast-4 | 84 | 152 | Blues-5 | 28 | | Jazz | |
| 50 | Fast-5 | 18 | | | | 287 | Jazz-2 | 2,393 |
| | Medium | | | Children | | 288 | Jazz-3 | 336 |
| 53 | Medium-2 | 9,612 | 155 | Preschool-2 | N/A | 289 | Jazz-4 | 56 |
| 54 | Medium-3 | 3,886 | 156 | Preschool-3 | N/A | 290 | Jazz-5 | 4 |
| 55 | Medium-4 | 1,245 | 157 | Preschool-4 | N/A | | | |
| 56 | Medium-5 | 231 | 158 | Preschool-5 | N/A | | Latin | |
| | Slow | | 159 | Elementary-2 | N/A | 303 | Latin-2 | 363 |
| 59 | Slow-2 | 5,619 | 160 | Elementary-3 | N/A | 304 | Latin-3 | 105 |
| 60 | Slow-3 | 2,131 | 161 | Elementary-4 | N/A | 305 | Latin-4 | 36 |
| 61 | Slow-4 | 873 | 162 | Elementary-5 | N/A | 306 | Latin-5 | 3 |
| 62 | Slow-5 | 216 | | | | | | |
| | | | | Country | | | Metal | |
| | Era: By Rating | | 165 | All Country-2 | 1,556 | 319 | Metal-2 | 94 |
| | Recent 03-Now | | 166 | All Country-3 | 667 | 320 | Metal-3 | 19 |
| 76 | Recent-2 | 2,881 | 167 | All Country-4 | 221 | 321 | Metal-4 | 3 |
| 77 | Recent-3 | 1,439 | 168 | All Country-5 | 49 | 322 | Metal-5 | 0 |
| 78 | Recent-4 | 458 | 170 | Recent Country-2 | N/A | | | |
| 79 | Recent-5 | 85 | 171 | Recent Country-3 | 126 | | Pop | |
| | Modern 1983-2002 | | 172 | Recent Country-4 | 42 | 351 | All Pop-2 | 4,435 |
| 82 | Modern-2 | 5,319 | 173 | Recent Country-5 | 5 | 352 | All Pop-3 | 2,466 |
| 83 | Modern-3 | N/A | 175 | Modern Country-2 | N/A | 353 | All Pop-4 | 1,102 |
| 84 | Modern-4 | 817 | 176 | Modern Country-3 | 359 | 354 | All Pop-5 | 268 |
| 85 | Modern-5 | 205 | 177 | Modern Country-4 | 119 | 356 | Recent Pop-2 | 1,066 |
| | Classic 1965-1982 | | 178 | Modern Country-5 | 24 | 357 | Recent Pop-3 | 640 |
| 88 | Classic-2 | 3,846 | 180 | Classic Country-2 | N/A | 358 | Recent Pop-4 | 252 |
| 89 | Classic-3 | 1,583 | 181 | Classic Country-3 | 151 | 359 | Recent Pop-5 | 59 |
| 90 | Classic-4 | 604 | 182 | Classic Country-4 | 56 | 361 | Modern Pop-2 | 2,071 |
| 91 | Classic-5 | 119 | 183 | Classic Country-5 | 19 | 362 | Modern Pop-3 | 981 |

FIG. 16D

| | | | | | | |
|---|---|---|---|---|---|---|
| 94 | Oldies 2 | 428 | 186 Old/Arch Country-3 | N/A | 364 Modern Pop-5 | 126 |
| 95 | Oldies 3 | 157 | 187 Old/Arch Country-4 | N/A | | |
| 96 | Oldies 4 | 52 | 188 Old/Arch Country-5 | N/A | | |
| 97 | Oldies 5 | 10 | | | Rock/Pop: Med/Fast | |
| 366 | Classic Pop-2 | 1,238 | 483 Modern Rock-4 | 211 | 602 All Rock/All Pop-2 | N/A |
| 367 | Classic Pop-3 | 733 | 484 Modern Rock-5 | 56 | 603 All Rock/All Pop-3 | 2,883 |
| 368 | Classic Pop-4 | 335 | 486 Classic Rock-2 | 1,274 | 604 All Rock/All Pop-4 | 975 |
| 369 | Classic Pop-5 | 76 | 487 Classic Rock-3 | 570 | 605 All Rock/All Pop-5 | 195 |
| 371 | Pop Old/Arch-2 | N/A | 488 Classic Rock-4 | 198 | 607 Recent Rock/Recent Pop-2 | 1,853 |
| 372 | Pop Old/Arch-3 | N/A | 489 Classic Rock-5 | 24 | 608 Recent Rock/Recent Pop-3 | 992 |
| 373 | Pop Old/Arch-4 | N/A | 491 Rock Old/Arch-2 | N/A | 609 Recent Rock/Recent Pop-4 | 305 |
| 374 | Pop Old/Arch-5 | N/A | 492 Rock Old/Arch-3 | N/A | 610 Recent Rock/Recent Pop-5 | 60 |
| | | | 493 Rock Old/Arch-4 | N/A | 612 Modern Rock/Modern Pop-2 | 2,370 |
| | R&B (incl. Soul) | | 494 Rock Old/Arch-5 | N/A | 613 Modern Rock/Modern Pop-3 | 1,066 |
| 387 | All R&B-2 | 1,163 | | | 614 Modern Rock/Modern Pop-4 | 372 |
| 388 | All R&B-3 | 521 | Swing | | 615 Modern Rock/Modern Pop-5 | 96 |
| 389 | All R&B-4 | 166 | 507 Swing-2 | 359 | 617 Recent + Modern Rock/Pop-2 | 4,223 |
| 390 | All R&B-5 | 25 | 508 Swing-3 | 103 | 618 Recent + Modern Rock/Pop-3 | N/A |
| 392 | Recent R&B-2 | 102 | 509 Swing-4 | 37 | 619 Recent + Modern Rock/Pop-4 | N/A |
| 393 | Recent R&B-3 | 68 | 510 Swing-5 | 9 | 620 Recent + Modern Rock/Pop-5 | N/A |
| 394 | Recent R&B-4 | 24 | | | 622 Classic Rock/Classic Pop-2 | 1,546 |
| 395 | Recent R&B-5 | 1 | World | | 623 Classic Rock/Classic Pop-3 | 802 |
| 397 | Modern R&B-2 | N/A | 523 World-2 | 1,052 | 624 Classic Rock/Classic Pop-4 | 292 |
| 398 | Modern R&B-3 | N/A | 524 World-3 | 274 | 625 Classic Rock/Classic Pop-5 | 35 |
| 399 | Modern R&B-4 | N/A | 525 World-4 | 66 | | |
| 400 | Modern R&B-5 | N/A | 526 World-5 | 14 | Rock/Pop: Slow | |
| 402 | Classic R&B-2 | N/A | | | 638 All Rock/All Pop-2 | N/A |
| 403 | Classic R&B-3 | N/A | Christmas | | 639 All Rock/All Pop-3 | 1,270 |
| 404 | Classic R&B-4 | N/A | 539 Christmas-2 | N/A | 640 All Rock/All Pop-4 | 641 |
| 405 | Classic R&B-5 | N/A | 540 Christmas-3 | N/A | 641 All Rock/All Pop-5 | 164 |
| 407 | Old/Arch R&B-2 | N/A | 541 Christmas-4 | N/A | 643 Recent Rock/Recent Pop-2 | 593 |
| 408 | Old/Arch R&B-3 | N/A | 542 Christmas-5 | N/A | 644 Recent Rock/Recent Pop-3 | 299 |
| 409 | Old/Arch R&B-4 | N/A | | | 645 Recent Rock/Recent Pop-4 | 115 |
| 410 | Old/Arch R&B-5 | N/A | 553 Combined Genres | | 646 Recent Rock/Recent Pop-5 | 22 |
| | | | | | 648 Modern Rock/Modern Pop-2 | 919 |
| | Rap | | 564 Rock/Pop:All | | 649 Modern Rock/Modern Pop-3 | 530 |
| 423 | Rap-2 | 1,316 | 566 All Rock/All Pop-2 | N/A | 650 Modern Rock/Modern Pop-4 | 299 |
| 424 | Rap-3 | 260 | 567 All Rock/All Pop-3 | 4,260 | 651 Modern Rock/Modern Pop-5 | 82 |
| 425 | Rap-4 | 42 | 568 All Rock/All Pop-4 | 1,652 | 653 Recent + Modern Rock/Pop-2 | 1,512 |
| 426 | Rap-5 | 7 | 569 All Rock/All Pop-5 | 363 | 654 Recent + Modern Rock/Pop-3 | 829 |
| | | | 571 Recent Rock/Recent Pop-2 | 2,526 | 655 Recent + Modern Rock/Pop-4 | 414 |
| | Explicit Rap | | 572 Recent Rock/Recent Pop-3 | 1,291 | 656 Recent + Modern Rock/Pop-5 | 104 |
| 439 | Explicit Rap-2 | 197 | 573 Recent Rock/Recent Pop-4 | 420 | 658 Classic Rock/Classic Pop-2 | 670 |
| 440 | Explicit Rap-3 | N/A | 574 Recent Rock/Recent Pop-5 | 82 | 659 Classic Rock/Classic Pop-3 | 400 |
| 441 | Explicit Rap-4 | 3 | 576 Modern Rock/Modern Pop-2 | 3,790 | 660 Classic Rock/Classic Pop-4 | 216 |
| 442 | Explicit Rap-5 | 0 | 577 Modern Rock/Modern Pop-3 | 1,644 | 661 Classic Rock/Classic Pop-5 | 58 |
| | | | 578 Modern Rock/Modern Pop-4 | 694 | | |
| | Reggae | | 579 Modern Rock/Modern Pop-5 | 181 | | |
| 455 | Reggae-2 | 285 | 581 Recent + Modern Rock/Pop-2 | 6,316 | | |
| 456 | Reggae-3 | 142 | 582 Recent + Modern Rock/Pop-3 | 2,935 | | |
| 457 | Reggae-4 | 58 | 583 Recent + Modern Rock/Pop-4 | 1,114 | | |
| 458 | Reggae-5 | 17 | 584 Recent + Modern Rock/Pop-5 | 263 | | |
| | | | 586 Classic Rock/Classic Pop-2 | 2,270 | | |
| | Rock | | 587 Classic Rock/Classic Pop-3 | 1,221 | | |
| 471 | All Rock-2 | 4,504 | 588 Classic Rock/Classic Pop-4 | 511 | | |
| 472 | All Rock-3 | 1,905 | 589 Classic Rock/Classic Pop-5 | 94 | | |
| 473 | All Rock-4 | 582 | | | | |
| 474 | All Rock-5 | 106 | | | | |

FIG. 16E

Screen # 4 B -1C Fig. 16F

| Country/Bluegrass/Folk (C/B/F):All | | World/Reggae/Latin (W/R/L): All | | R&B/Rap: All | |
|---|---|---|---|---|---|
| 687 All C/B/F-2 | 1,904 | 710 All W/R/L-2 | 1,679 | 737 All R&B/Rap-2 | 2,456 |
| 688 All C/B/F-3 | 791 | 711 All W/R/L-3 | 508 | 738 All R&B/Rap-3 | N/A |
| 689 All C/B/F-4 | 273 | 712 All W/R/L-4 | 152 | 739 All R&B/Rap-4 | 204 |
| 690 All C/B/F-5 | 62 | 713 All W/R/L-5 | 33 | 740 All R&B/Rap-5 | 32 |
| 691 Recent C/B/F-2 | N/A | 715 Recent W/R/L-2 | N/A | 742 Recent R&B/Rap-2 | N/A |
| 692 Recent C/B/F-3 | N/A | 716 Recent W/R/L-3 | N/A | 743 Recent R&B/Rap-3 | N/A |
| 693 Recent C/B/F-4 | N/A | 717 Recent W/R/L-4 | N/A | 744 Recent R&B/Rap-4 | N/A |
| 694 Recent C/B/F-5 | N/A | 718 Recent W/R/L-5 | N/A | 745 Recent R&B/Rap-5 | N/A |
| 695 Modern C/B/F-2 | N/A | 720 Modern W/R/L-2 | N/A | 746 Modern R&B/Rap-2 | N/A |
| 696 Modern C/B/F-3 | N/A | 721 Modern W/R/L-3 | N/A | 747 Modern R&B/Rap-3 | N/A |
| 697 Modern C/B/F-4 | N/A | 722 Modern W/R/L-4 | N/A | 748 Modern R&B/Rap-4 | N/A |
| 698 Modern C/B/F-5 | N/A | 723 Modern W/R/L-5 | N/A | 749 Modern R&B/Rap-5 | N/A |
| 699 Recent + C/B/F-2 | N/A | 725 Recent + W/R/L-2 | N/A | 751 Recent + R&B/Rap-2 | N/A |
| 700 Recent + C/B/F-3 | N/A | 726 Recent + W/R/L-3 | N/A | 752 Recent + R&B/Rap-3 | N/A |
| 701 Recent + C/B/F-4 | N/A | 727 Recent + W/R/L-4 | N/A | 753 Recent + R&B/Rap-4 | N/A |
| 702 Recent + C/B/F-5 | N/A | 728 Recent + W/R/L-5 | N/A | 754 Recent + R&B/Rap-5 | N/A |
| 703 Classic C/B/F-2 | N/A | 730 Classic W/R/L-2 | N/A | 757 Classic R&B/Rap-2 | N/A |
| 704 Classic C/B/F-3 | N/A | 731 Classic W/R/L-3 | N/A | 758 Classic R&B/Rap-3 | N/A |
| 705 Classic C/B/F-4 | N/A | 732 Classic W/R/L-4 | N/A | 759 Classic R&B/Rap-4 | N/A |
| 706 Classic C/B/F-5 | N/A | 733 Classic W/R/L-5 | N/A | 760 Classic R&B/Rap-5 | N/A |

Screen # 4 C -1 Fig. 16G

Create Your Own Playlist

In this method, you select individual artist and/or primary genres from the directories of "Artist Favorites" and "Genre Favorites" found on the next two screens.

After selecting an "Artist" or "Genre" name in the space below, then indicate which Star Rating, Mood/Tempo, or ERA you want included for each Artist or Genre selection. (Note: You must check the box for each group of star ratings you want. For example, if you want 2-Stars and above, you must check 2-Stars only, 3-Stars only, 4-Stars only, and 5-Stars only.) Once you have completed a particular artist or genre selection, click continue and start over. When your Music Fuel Gauge gets full the continue button will stop working.

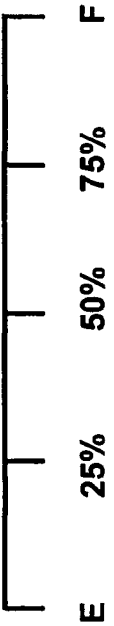

Music Fuel Gauge [1]

Current Song Count _____

Indicated Song Capacity _____

E  25%  50%  75%  F

[1] If you hit full, the site will give you options to make global (%) reductions.

| Audience Reach<br>1-Star / 5-Stars | Mood /<br>Tempo | ERA |
|---|---|---|
| ☐ 2-Stars Only | ☐ Slow | ☐ Recent (xx/xx) |
| ☐ 3-Stars Only | ☐ Medium | ☐ Modern (xx/xx) |
| ☐ 4-Stars Only | ☐ Fast | ☐ Classic (xx/xx) |
| ☐ 5-Stars Only | ☐ Party | ☐ Oldies (xx/xx) |
| ☐ All | ☐ All | ☐ Archive (xx/xx) |
| | | ☐ All |

Artist  ▶ | Robert Uhlmann |

Genre  ▶ | Explicit Rap |

(Drop Down Menu will appear.)

Artist Favorites/Song Count                                                                                      Screen # 4 C-2 Fig. 16H

| | | | | | |
|---|---|---|---|---|---|
| 'Til Tuesday | ### | Acker Bilk | ### | Alex Konadu | ### | An Anthology of Sacre | ### |
| Baby Face Willette | ### | Across The Sky | ### | Alexander Bernard | ### | Ana Bárbara | ### |
| *NSYNC | ### | Action Figure Party | ### | Alexandra Slate | ### | Ana Caram | ### |
| .38 Special | ### | The Action | ### | Alexia | ### | Anais & Voitio | ### |
| +/- | ### | Adam Ant | ### | Alexis & Fido | ### | Anastacia | ### |
| 10 Years | ### | Adam Sandler | ### | Alexkid | ### | Anberlin | ### |
| 10,000 Maniacs | ### | Adoniran Barbosa | ### | Alfredo Rey E La Sua | ### | Anchondo | ### |
| The 101'ers | ### | Adrian Belew | ### | Ali Farka Toure | ### | Anderson Sanctuary C | ### |
| 10cc | ### | Adriano Celentano | ### | Alice Cooper | ### | Andreas Johnson | ### |
| 112 | ### | Aerosmith | ### | Alice Deejay | ### | Andrew Bird | ### |
| The 13th Floor Elevato | ### | AFI | ### | Alice In Chains | ### | Andrew Cyrille Quintet | ### |
| The 18th Day Of May | ### | African Brothers | ### | Alicia Bridges | ### | Andrew Hill | ### |
| 1927 | ### | Africando | ### | Alicia Keys | ### | The Andrews Sisters | ### |
| 202 | ### | Africando All Stars | ### | Alison Krauss | ### | Andy Bell | ### |
| 2Pac | ### | Afro Cuban All Stars | ### | Alizee | ### | Andy Gibb | ### |
| 3 Doors Down | ### | Afro Medusa | ### | Alkaholiks | ### | Andy Griffith | ### |
| 30 Seconds to Mars | ### | Afroman | ### | Alkaline Trio | ### | Andy Irvine, with Patric | ### |
| 311 | ### | The Afters | ### | All-4-One | ### | Andy M. Stewart & Ma | ### |
| 3LW | ### | The Agony Scene | ### | The All-American Reje | ### | Andy Russell | ### |
| The 3rd Generation Ba | ### | Ahmad | ### | All Saints | ### | Andy White | ### |
| 3T | ### | Aili & Lylii Vainikainer | ### | All That Remains | ### | Andy Williams | ### |
| 4 Etolles | ### | Aimee Mann | ### | Allen Asbury | ### | Are Brun & Madrugad | ### |
| 4 Non Blondes | ### | Air | ### | Allen Miller | ### | The Angel Brothers & | ### |
| 50 Cent | ### | Air Supply | ### | Allen Toussaint | ### | Angelic Upstarts | ### |
| The 5th Dimension | ### | Akira | ### | Allie Young, Bessy Du | ### | Angélique Kidjo | ### |
| 666 | ### | Akiyoshi | ### | The Allman Brothers B | ### | Angels & Airwaves | ### |
| 702 | ### | Akon | ### | Allure & 112 | ### | The Angels | ### |
| 80 | ### | Akwid | ### | Almodóvar & McNama | ### | Angie Martinez, Lil' Mo | ### |
| The 88 | ### | Al Amanecer | ### | Alpha Blondy | ### | Angie Stone | ### |
| 899 | ### | Al B. Sure! | ### | Alphaville | ### | Ani DiFranco | ### |
| 8th Wave | ### | Al Bowlly | ### | Alter Bridge | ### | Animal Collective | ### |
| 95.South | ### | Al Cohn | ### | Alternative TV | ### | Animotion | ### |
| 98° | ### | Al Dexter | ### | Althea & Donna | ### | Anindo | ### |
| A-Ha | ### | Al DiMeola | ### | Alton Ellis & The Flam | ### | Anita Baker | ### |
| A Dozen Furies | ### | Al Green | ### | Alvin & The Chipmunk | ### | Anita Cochran | ### |
| A Flock of Seagulls | ### | Al Hibbler | ### | Alvin Cash & The Crav | ### | Anita O'Day | ### |
| A Perfect Circle | ### | Al Hirt | ### | Aly & AJ | ### | Anna Nalick | ### |
| A Taste Of Honey | ### | Al Hopkins & The Buck | ### | Alyson | ### | Anna Oxa | ### |
| A Tribe Called Quest | ### | Al Johnson | ### | Amadou & Mariam | ### | Anne Louise Blythe | ### |
| A.B. Quintanilla III Y Lo | ### | Al Jolson | ### | Amadou Balaké | ### | Anne Murray | ### |
| A.C. Reed | ### | Al Martino | ### | Amanda Perez | ### | Annie | ### |
| AA VV | ### | Al Stewart | ### | Amaral | ### | Annie Brewer | ### |
| Aaron Hall | ### | Alabama | ### | Amazones De Guinee | ### | Annie Lennox | ### |
| Aaron Kane | ### | Alacranes Musical | ### | Ambassadeurs du Mo | ### | Annie Ross | ### |
| Aaron Neville | ### | Alan Jackson | ### | Ambassadeurs Interna | ### | Anointed | ### |
| Aaron Tippin | ### | The Alan Parsons Proj | ### | Amber | ### | Anouar Braham | ### |
| Aaron Zimmer | ### | Alanis Morissette | ### | The Amboy Dukes | ### | Anouk | ### |
| Abandoned Pools | ### | Alannah Myles | ### | Ambrosia | ### | Anthony Braxton | ### |
| Abba | ### | Albert Collins | ### | Ambulance Ltd | ### | Anthony Evans | ### |
| Abbey Lincoln | ### | Albert King | ### | Amel Larrieux | ### | Anthony Hamilton | ### |
| ABC | ### | Albert Lee | ### | America | ### | Anthony Wilson | ### |
| Abdel Gadir Salim & E | ### | The Album Leaf | ### | Amerie | ### | Anthrax | ### |
| Abdullah Ibrahim/ Dolle | ### | Aldo Nova | ### | The Ames Brothers | ### | Anti Nowhere League | ### |
| Abou Sylla | ### | Alê Muniz | ### | Amina Claudine Myers | ### | Antonello Venditti | ### |
| Aby N'Dour | ### | Alejandro Escovedo | ### | Amorphis | ### | Antonio Carlos Jobim | ### |
| AC/DC | ### | Alejandro Fernández | ### | Amos Lee | ### | Antonio Hart | ### |
| Ace Cannon | ### | Alejandro Sanz | ### | Amparanoia | ### | Antonio Orozco | ### |
| Ace Frehley | ### | Aleks Syntek & Ana To | ### | Amuka & Sheila Brody | ### | Apache Indian | ### |
| Ace Of Base | ### | Alex Britti | ### | Amy Chappell | ### | | |

Screen # 4 C-3 Fig. 16I

Genre Favorites/Song Count [1]

Primary Genres

- Alternative/Punk    ###
- Bluegrass    ###
- Blues    ###
- Country    ###
- Dance    ###
- Dirty    ###
- Electronica (incl. Techno)    ###
- Folk    ###
- Funny    ###
- Gospel    ###
- Jazz    ###
- Latin    ###
- Metallica    ###
- Oldies    ###
- Pop    ###
- R&B (incl. Soul)    ###
- Rap (incl. Hip Hop)    ###
- Explicit Rap    ###
- Reggae    ###
- Rock    ###
- Swing    ###
- World    ###
- Christmas    ###

Combined Genres

- Rock/Pop    ###
- Country/Bluegrass/Folk (C/B/F)    ###
- World/Reggae/Latin (W/R/L)    ###
- R&B/Rap    ###

[1] One song may be classified in several different genres. This approach allows additional song combinations (or playlists) without taking up additional space on the MP3 device.

Screen # 4 C-4 Fig. 16J

1-5 Stars for Estimated Audience Reach/ Song Count

1-5 Stars for Estimated Audience Reach [2]

1-Star: Processed and Songs Omitted     ###

2-Star: Favorite Songs By That Artist
Favorite Songs In That Genre [3]     ###

3-Star: 50% Crossover Potential
Medium Audience     ###

4-Star: 75% Crossover Potential
Large Audience     ###

5-Star: 95% Crossover Potential
Mass Audience     ###

[2] Choosing a given star rating means all songs at that rating or higher.
[3] Super songs in a small audience genre may receive only 2-Stars or 3-Stars due to their limited audience reach.
For the best songs in a small audience genre, pick 2-Stars and above.

Screen # 4 C-5   Fig. 16K

Key Words That Describe Mood/Tempos

Slow — Relaxed, Softer, Mellow, Easy, Lite, Adult. Lyrics should be clear. Includes Love Songs, Soulful, Most R&B, Reggae, and Gospel. Generally, you cannot hear the Drummer much. Most Instrumental or Jazz music.

Medium — Upbeat, Happy, Foot Tapping, 60% of all Rock/Pop, You can hear the Drummer.

Fast — Harder, Dance, Feet Stomping, will include some Hard Rock, Metal, or Angry Loud Music, Heavy Electric Guitar Solo.

Party — Fast Music That Is: Happy, Handy Clapping, Feet Stomping, Stand-Up and Dance, Party/Fiesta/La Pura Vida.

Screen # 4 C-6 Fig. 16L
MUSIC ERA
[1] New songs are re-rated for Audience Reach (Star System) when they are no longer recent.

Description Of Popularity Index

👥👥👥👥👥  Solid Hits   (Mass Audience Appeal)

👥👥👥👥  Mainstream   (Large Audience Appeal)

👥👥👥  Discovery   (Medium Audience Appeal)

👥👥  Artist Favorites   (Small Audience Appeal)

👥  Deep Playlist   (Niche Audience Appeal)

*Fig. 19*

Diagram 7: The PBM Genre/Popularity Omission Process

METHOD AND APPARATUS FOR GENERATING AND UPDATING A PRE-CATEGORIZED SONG DATABASE FROM WHICH CONSUMERS MAY SELECT AND THEN DOWNLOAD DESIRED PLAYLISTS

This is a continuation-in-part of U.S. patent application Ser. No. 11/736,928, filed Apr. 18, 2007, the contents of which are incorporated herein by reference.

BACKGROUND OF THE INVENTION

1. Field of the Invention

The present invention relates to the loading of digital music onto personal computers (PCs) and/or portable music players from one or more song databases residing on one or more Internet (or network) servers. More particularly, the present invention relates to the generation and use of a song database(s), where each song is individually categorized based upon predetermined criteria. Consumers may then access the song database(s), and download one or more complete song libraries based upon consumer preference. Since entire song libraries may be downloaded to the PC with, for example, a one or two-click Internet interface and then loaded to the consumer's portable music player (such as an iPod™, an MP3 player, a cellular telephone, a laptop computer, a personal digital assistant (PDA), etc.), it is very quick and easy, as opposed to the current system whereby the consumer must spend hours on his/her computer selecting each song or album or playlist to be loaded onto his/her portable music player. The downloaded library or libraries allow the consumer to generate and listen to playlists, in the well known fashion on his/her PC. The consumer can then side load to his/her portable device: (i) playlists he/she generates on his/her PC, (ii) predetermined playlists recommended by the provider, or (iii) the entire song library. In a preferred embodiment, each song stored on the song database(s) is individually predetermined (pre-categorized) in accordance with five criteria (in addition to the known criteria of artist, album, and song title.)

2. Related Art

With the advent of digital music technology, and especially the MP3 files and the iPod™, consumers now enjoy access to approximately 4,000,000 song choices. On-line music download services such as Apple iTunes™ and on-line subscription-based services such as Napster, Rhapsody, and MTV/Urge provide over 2,700,000 songs that consumers can utilize to listen to, buy, or discover new music.

This tidal wave of choices has created a need for consumers to filter and select music in order to discover new music as well as organize the music they are already familiar with. One method of organizing this universe is to create playlists of songs. This allows consumers to avoid the need to individually select songs by artist, song, or album name each time they want to listen.

In order to enjoy a playlist of songs, consumers currently have two general choices. First, they can select a live radio broadcast station that is programmed for a particular style of preferred music. Today, such platforms include Internet radio, pod-casting, satellite, terrestrial and cable-based music broadcasters. Listening to live broadcast requires no expertise or time on the listeners' part to enjoy hundreds of different station playlist options. The music is selected for them by professional programmers to fit a particular "format" or theme. However, listening to playlists on these broadcast platforms has certain significant limitations. First, with a few minor exceptions, broadcast songs cannot be stored on the personal computer (PC) or portable music player because they are licensed for "listen only" consumption. This means consumers cannot fast-forward over songs they do not like (as they can with songs stored on a portable MP3 player or CD player). Instead, to listen to music they like, the consumers must station-surf, which is especially annoying while driving a car or while exercising. Second, the number of choices available from such satellite, cable, or terrestrial broadcast platforms is small and limited in depth, including the number of new artists and genres covered. Third, the number of commercial-free stations is extremely limited, with Sirius and XM offering only 69 channels each. And, these supposedly commercial-free stations are actually full of house ads promoting the broadcasters own service offerings. This too eliminates the feel of listening to one's personal library of songs without interruption. Fourth, Internet Radio is a "listen-only" format so songs cannot be legally stored on the PC or portable device.

To enjoy a desired playlist of songs, the consumers' second general option is to take the time to search for individual songs (or entire playlists) on their own, and then download them, one at a time, into their personal libraries or set of playlists. Each such do-it-yourself library can then be stored on a PC or portable MP3 player, thus allowing the consumer to skip to the next song without limitation.

Over the last several years, dozens of techniques have been developed to assist these do-it-yourself consumers in creating their own playlists from the millions of songs now available to them. These methods typically make the same two assumptions regarding music consumers: 1) The consumers want to be actively involved in choosing songs for a personalized station playlist. More specifically, it is assumed that computer-savvy music listeners with high-speed Internet access and MP3 player devices have the expertise and the time to spend many hours attempting to "discover" and download desirable music; and 2) Each consumer wants to select among a narrow range of songs and artists that they are familiar with, in order to create a profile of song traits or user preferences that can be used to sort through a 4,000,000 song universe, to recommend songs for download. The idea is to narrow the songs available to conform to past listening habits. This ignores the possible discovery of high quality new music from unfamiliar sources.

As it turns out, none of these do-it-yourself or "active" methods have appealed to a mass audience. In fact, the average owner of an iPod™ or similar MP3 player device has only two to three hundred songs stored, and purchases less than one new song per month, on average. Likewise, all eight of the music subscription services now available have collectively only obtained a total of roughly 2.0 million subscribers. None of these systems are enjoying significant growth, despite the fact that over 90 million Americans now have iPods™ or similar MP3 player devices. The reason for this is pretty simple: The vast majority of music listeners do not have the time, the expertise, or the desire to sort through the vast universe of available songs—it is simply too much work. Furthermore, the systems and methods now available to recommend songs, based on various inputs and preferences from the user, are ineffective and are also too much work. Finally, because they are based on a consumer's past, and usually highly limited, experience with the music universe, they limit the chance to discover music from unfamiliar genres, sources, artists, or time periods, and enjoy the kind of diversity now available.

These active or user-based playlist recommendation systems fall into five broad categories:

Song Matching Algorithms: The user is asked to provide favorite songs that are then analyzed in detail to find songs with similar "musical DNA" (e.g., Pandora, Yahoo-Music Match and Alcalde et. al., U.S. Pat. No. 7,081,579).

Playlist Sharing The user shares his playlists with others to get ideas from people with similar tastes (e.g., mystrands.com, last.fm.com, MOG.com).

Artist Matching Systems: Instead of favorite songs, the user inputs favorite artists or radio stations to generate a list of recommended songs (e.g., Porteus et al., U.S. Pat. No. 6,933,433).

Identifying a "Plurality" of Preferences: The user fills out a complicated survey of "desired and undesirable seed items," that is then used to recommend songs (e.g. Platt, U.S. Pat. No. 6,987,221).

Genre/Station Preferences: A user's radio station/genre choices form the basis for recommending songs (Doshida et al., U.S. Patent Application Publication No. 20040193649). Again, all of these systems assume that: 1) the listener wants his/her past choices to limit his/her future choices; and 2) the listener has the time to be actively involved in the process of generating playlists.

Meanwhile, new passive systems for retrieving and listening to playlists that are prepared by professional programmers have had fantastic success. Such "passive" systems include Internet radio broadcasters with an online listening audience of approximately 60,000,000 people, and subscription-based satellite radio services, currently with approximately 10,000,000 subscribers. Both of these types of systems are presently growing at an approximate rate of 25% annually. The present invention is intended to address this need for passive systems and methods for providing song playlists to consumers that can be legally stored on their PC or portable device thereby avoiding the limitations of live broadcast.

SUMMARY OF THE INVENTION

The methods, systems, and data structures of the present invention are designed primarily for passive listeners without the time, experience, or desire to generate their own playlists and store them on a PC or portable device. The present invention will enable users to replicate the experience of listening to a favorite broadcast radio channel having songs most likely to please the listener, with zero interruptions. Since the downloaded songs are individually categorized, the consumer can easily "slice-and-dice" his/her downloaded song library in any number of ways to produce an almost infinite variety of playlists. For a subscription fee, the consumer will have continued access to listen to the downloaded (PC) and side loaded (MP3 player) songs, but with limited ability to copy or transfer the song. For an additional fee (or perhaps a higher subscription fee) the consumer can take actual ownership of downloaded song libraries and/or individual songs that they heard over their subscription service.

Specifically, according to a preferred embodiment of the preferred embodiment, the consumer will access an Internet-based server storing a database of roughly 30,000 songs, each of which has been categorized in accordance with five criteria (in addition to the known criteria of artist, album, and song title). After logging into the PushButtonMusic™ website, the consumer may select among nine or more song libraries ranging in size from 250 to 22,000 songs. Once the desired library is downloaded to his/her PC, the consumer can choose from a number of options to "side-load" a portable MP3 device. These include:

(i) the Full-Download Portable Service™, in which one or two clicks may be used to download a predetermined library of the highest rated songs in the song database, depending on the memory capacity of the consumer's portable music player (e.g., an entire 19,000 song database for a 80 Gigabyte MP3 player, or the 5,000 highest rated songs for a 30 Gigabyte MP3 player, etc.);

(ii) the SemiFull-Download Portable Service™, in which a few clicks may be used to eliminate from the 19,000 song Full-Download library certain categories of songs the consumer is not interested in downloading (e.g., Punk Music, Jazz, Rap, etc.).

(iii) the MyChoice Portable Service™, in which multiple clicks may be used to select the specific categories of music that the consumer is interested in downloading (e.g., Slow, Classic Jazz, and Fast, Modern, Pop);

(iv) the Advanced Portable Service™, which is akin to today's services which allow the consumer to individually choose songs, artists, albums, etc, to download, based upon criteria related to past listening choices; and (v) the Playlist Recommender Service which allows the consumer to download entire playlists recommended by the provider based on the consumers past listening habits or stated preferences.

Another notable feature of the preferred embodiment is that a consumer's chosen library, playlist, and downloaded songs will be stored on the company's server for 12 months after the consumer discontinues the subscription for any reason. This is to address the concern by consumers that songs "rented" over a subscription service will disappear should they temporarily fail to renew for any reason.

Another notable feature of the preferred embodiment is that the consumer is encouraged to continue his/her subscription to any of the above in order to periodically download desired songs which have been recently added to the database. This presents the user with fresh music and fresh playlist possibilities.

A further notable feature according to the preferred embodiment is the 30,000 song Playlist Generator Database™ itself, which is initially installed and then continually updated using the Music Content Management System™. According to the Music Content Management System™, the universe of known digital songs (4,000,000 and growing) is filtered (preferably using five filters) to narrow that universe to 30,000 of the most popular songs which are installed into the Playlist Generator Database™. Preferably, the fourth filter (to be described in detail below) attaches to each song data indicative of five different criteria: One or more Genres; Era; Year of Original Release; Mood; and Star Rating (indicative of estimated Audience Reach or Audience Crossover potential). Each song in the database is thus pre-categorized (pre-filtered, predetermined) in accordance with the five criteria. The power of such a pre-categorized song database cannot be overemphasized. With each song in the database having five different criteria associated therewith, consumers have unparalleled ability to generate precisely those playlists in which they have the most interest. With the Playlist Generator Database™ according to the preferred embodiment, there are 1.8 billion possible different playlists that can be generated from various combinations of these criteria. The consumer can thus easily produce a portable music player having the exact kinds of songs the consumer wants to listen to, without any commercial interruptions.

In one aspect, the present invention provides a method for developing (and then updating) the Playlist Generator Database™. The method preferably comprises using five filtering steps to reduce the universe of 4,000,000 plus songs to a manageable number, perhaps 30,000, and pre-categorizing those songs so that the consumers may efficiently select the song or playlist of songs they desire. In the first filter, a plurality of predetermined expert sources are used to select a first subset of songs from the available digital song universe, wherein a number of songs included in the first subset is less than 5% of a number of songs available. In the second filtering step, a plurality of predetermined media sources are used in combination with suggestions from a network of trained remote contributors. to select a second subset of songs from the first subset, wherein a number of songs included in the second subset is less than 30% of the number of songs in the first subset. In the third filtering step, each song included in the second subset is scored with information related to consumer listening and purchasing behavior obtained from a plurality of predetermined data sources. In the fourth filtering step, a plurality of raters is used to classify each song included in the scored second subset according to a predetermined set of five criteria. In the fifth filtering step, the categorized songs surviving the fourth filtering step are subject to final approval by editorial staff.

In another aspect, the invention provides a portable music player storing a plurality of song files, each song file including data corresponding to song title, artist, genre, era, year of (preferably original) release, mood or tempo, and estimated audience reach.

In yet another aspect, the invention provides a music provider server including a processor, and a memory storing a plurality of song files, each song file including data corresponding to song title, artist, genre, era, year of original release, tempo, and audience reach. An interface is provided to couple the server to a network, such as the Internet.

In still another aspect, the invention provides a method of providing a consumer with digital music files, comprising the steps of: (i) selecting a plurality of digital music files from among a predetermined group of digital music files, the selecting step including the step of categorizing each selected digital music file in accordance with music title, artist, genre, era, year of original release, tempo, and audience reach; (ii) storing the selected digital music files in a memory; (iii) receiving from the consumer a request for digital music files; and (iv) providing the consumer with the requested digital music files, wherein each digital music file includes data corresponding to music title, artist, genre, era, mood/tempo, and audience reach.

In still another aspect, the present invention provides a method of operating a subscription music service over the Internet, comprising the steps of: (i) storing on an Internet server a plurality of digital music files, each file including indicia of music title, artist, genre, and audience reach; (ii) receiving a subscription payment from a consumer; (iii) receiving from said consumer an Internet request for a digital music file; (iv) if the subscription of said consumer is current, downloading over the Internet the requested digital music file from the Internet server to said consumer, the downloaded digital music file including the indicia of music title, artist, genre, and audience reach; and (v) if the subscription of said consumer is not current, prohibiting the downloading of the requested digital music file.

In still another aspect of the present invention, a two or three-click method of Internet-downloading music files to a consumer, comprises the steps of: (i) identifying with a first click a memory capacity of a consumer's portable music player; (ii) identifying with a second click a predetermined library of music files the consumer wishes to download; and (iii) following said second click, downloading to said consumer over the Internet the requested library of music files. With a third click, the consumer can side load the downloaded songs to his/her portable music device.

In another aspect of the present invention, a method for providing a music-subscription service customer with a portable music device that has been preloaded with customer-selected music, includes the steps of: (i) a music-subscription service provider receiving a customer order to purchase a portable music device; (ii) the music-subscription service provider receiving the customer's selection of less than all of the music available on the music-subscription service provider's music database; (iii) the music-subscription service provider using a computer to download the customer-selected music to the portable music device ordered by the customer; and (iv) the music-subscription service provider providing to the customer the portable music device that has been preloaded with the customer-selected music.

In still another aspect of the present invention, apparatus for providing a music-subscription service customer with a portable music device that has been preloaded with customer-selected music, includes at least one music-subscription service provider computer configured to: (i) receive a customer order to purchase a portable music device; (ii) receive the customer's selection of less than all of the music available on the music-subscription service provider's music database; and (iii) download the customer-selected music to the portable music device ordered by the customer.

In still another aspect of the present invention, apparatus for providing a music-subscription service customer with a portable music device that has been preloaded with customer-selected music, includes at least one computer configured to (i) receive over the Internet a customer order to purchase a portable music device, (ii) receive over the Internet, the customer's selection of music available on a database of the music-subscription service provider, (iii) configure a media player for the customer based on the customer's selection, (iv) use the media player to download the customer-selected music to the portable music device ordered by the customer, and (v) cause the portable music device that has been preloaded with the customer-selected music to be provided to the customer.

In still another aspect of the present invention, a method for ordering a portable music device that has been preloaded with customer-selected music, from a music-subscription service provider, includes the steps of: (i) ordering a portable music device from a music-subscription service provider; (ii) selecting less than all of the music available on the music-subscription service provider's music database, for loading onto the ordered portable music device; and (iii) receiving the portable music device that has been preloaded with the selected music.

BRIEF DESCRIPTION OF THE DRAWINGS

FIG. 3 is a more detailed flow chart that illustrates the preferred method for filtering and classifying songs, according to a preferred embodiment of the invention.

FIG. 4A is a diagram that illustrates a preferred set of media sources used in the second filtering stage of FIG. 3.

FIG. 7 is a diagram that illustrates the contents by genre and artist for a 510-song set of 5-star songs as rated in the method illustrated in FIG. 3.

FIG. 8 is a diagram that illustrates a star ratings forced curve fit for an exemplary 14,000 song playlist.

FIGS. 9A and 9B illustrate an exemplary list of channels (preselected playlist options) which the consumer may use to generate playlists from the song library or libraries resident on his/her PC and/or portable music player, while FIG. 9C is an example of a Raters Work Assignment Sheet.

FIG. 10 is an illustrative table of device size versus song libraries for various types of listeners.

FIG. 12A illustrates the first screen that the consumer will see at the PushButtonMusic™ website.

FIGS. 13A-13I are screenshots for the first option from FIG. 12B.

FIGS. 14A-14J are screenshots for the second screen from FIG. 12A.

FIGS. 15A-15E are screenshots for the third screen from FIG. 12A.

FIGS. 16A-16L are screenshots for the fourth screen from FIG. 12A.

FIG. 19 is a diagram showing descriptions for the popularity or audience-reach ratings.

DETAILED DESCRIPTION OF THE PREFERRED EMBODIMENTS

1. Introduction

Figure 1:
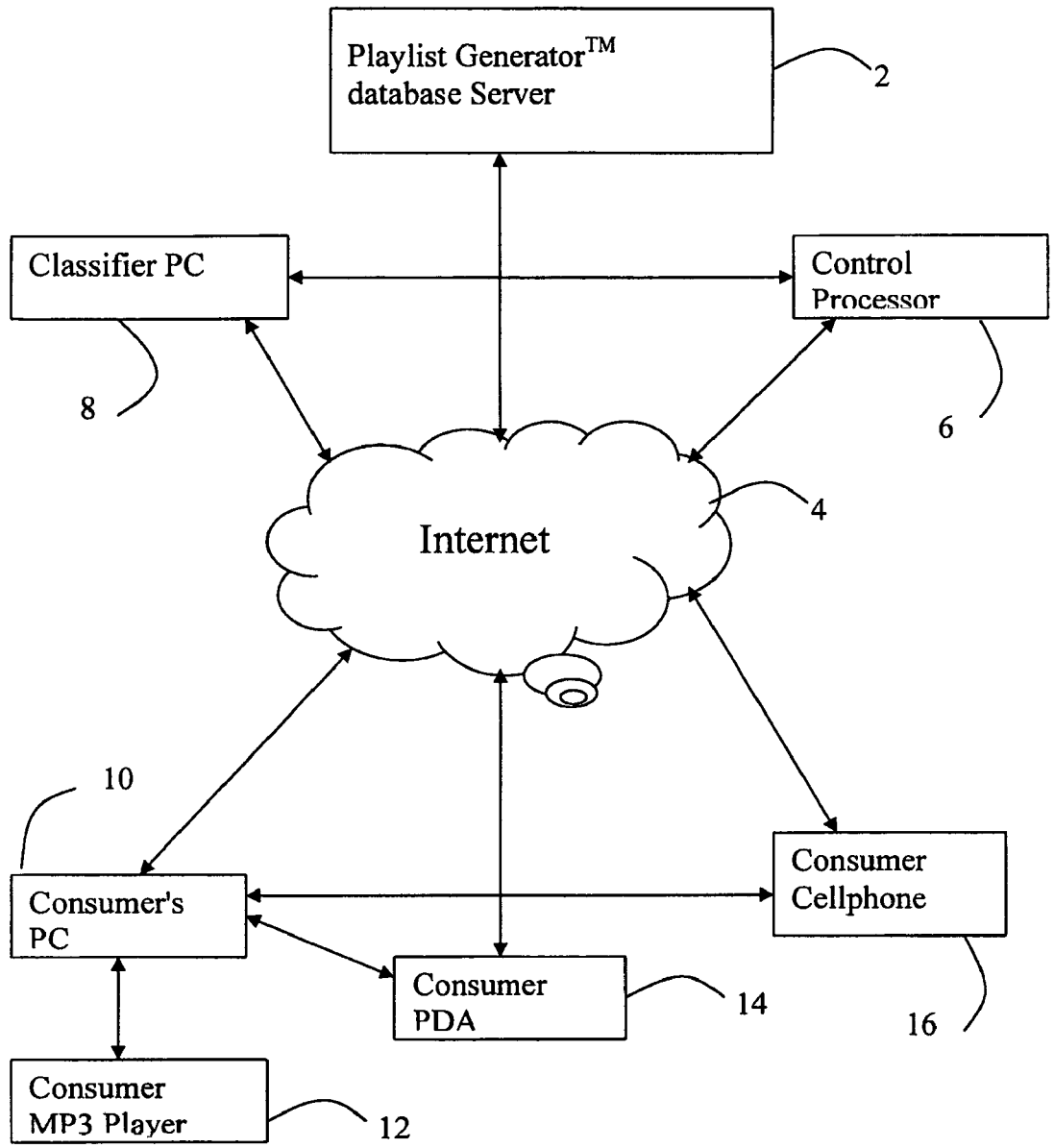
FIG. 1 is a block diagram of the structural details by which the preferred embodiments generate and update the Playlist Generator Database™, and allow consumers to download pre-categorized song libraries

The present invention relates generally to apparatus, methods, and data structures that facilitate the generation of playlists from a database of pre-selected, pre-categorized, and rated songs. While the below description involves generating an approximately 30,000 song database housed on an Internet server, from which consumers first download selected pre-categorized song libraries to their PCs, and then side load the libraries and/or playlists their portable music players, the invention is equally applicable to: (i) direct downloading such libraries and/or playlists to music players such as iPods™, MP3 players, cellular telephones, laptops, PDAs, etc.; and (ii) housing one or more such song databases on one or more servers resident on public or private local or wide area networks. The preferred embodiments allow entire libraries (as opposed to piecemeal songs and playlists) to be pre-loaded and/or fully loaded onto PCs and portable music players.

Generally, the preferred embodiments provide methods and apparatus for consumers to easily download multi-song libraries, on-demand, from an on-line database of highly selected, pre-filtered, pre-categorized songs to their PCs, and then generate predetermined or self-determined playlists which are side loaded onto their portable music players. As described in greater detail below, this Playlist Generator™ database may be updated with current material on a daily basis. The goal of the system is to provide consumers with a digital music player (such as an MP3 player) that is fully-loaded with thousands of songs and thousands of possible playlist combinations, without spending a significant amount of time doing it themselves on a PC.

In use, a service (subscription) provider like PushButton-Music™ selects, filters, categorizes, stores, and maintains a music database of songs on one or more on-line servers. Consumers that subscribe to the service, and have music-enabled PCs, can then go to the provider's website and download specific playlists, one of nine predetermined song libraries, or the entire 30,000 song Playlist Generator™ database. While many consumers will only want a Playlist Generator™ song library that can be stored on their portable device, many will choose to download a library for their PC that is much larger than what their portable device itself can hold. This is especially true of owners of small capacity MP3-enabled mobile phones. One reason is that 30,000,000 listeners use the PC itself as their receiver/stereo. Once on his/her PC, the consumer can use a plurality of the five criteria discussed above to generate specific playlists of songs to side load to his/her portable device. Or alternatively, he/she can simply choose to go to the website and choose an entire Playlist Generator™ database and/or a number of pre-selected playlists that is "recommended" for a portable device of that size. This is a true "one key stroke" or passive download solution. In each case, the Playlist Generator™ song database will allow consumers to generate a variety of playlists to fit the criteria selected by the consumer. In this manner, even a tiny Playlist Generator™ database can generate hundreds of playlists. By loading a Playlist Generator Database™ instead of a loosely compiled group of songs and playlists, the consumer can better retrieve what they want. Imagine the Library of Congress with no uniform classification system for the books.

The present invention may also be used by MP3 manufacturers to pre-load devices in a system that is passive to the consumer. In particular, portable music player manufacturers may pre-load their products with one or more playlists downloaded from the Playlist Generator™ database, in order to offer consumers a wide variety of preloaded music players. After purchasing a pre-loaded device, subscribers would then utilize the company's website as detailed above to add music or update their library and/or playlists on a daily basis. For example, a 10 Gbyte blue-colored MP3 player may contain 2,000 Blues songs; a 30 Gbyte red-colored MP3 player may have 7,500 Rock/Pop songs, and a 5 Gbyte MP3 player with yellow crosses depicted thereon may contain 1250 Gospel songs. Thus, the present invention provides many channels through which to provide the most interesting music to the most consumers without the tedium of endless Internet hours searching for and choosing songs to download. The ability to offer a predetermined number (e.g., 115) standardized device libraries allows an entire product line of portable devices to be pre-loaded or fully loaded to address specific consumer tastes, and device capacities, from a single database.

2. The Structure of the Preferred Embodiments

With reference to FIG. 1, the Playlist Generator Database™ resides one or more server(s) 2 that is/are preferably coupled to the Internet 4. A control processor 6 is used (in a manner to be described below) to control the upload to and download from the server 2. The control processor 6 may be a part of the server 2, or may be a separate server connected to the server 2 directly or through the Internet 4. A classifier Personal Computer (PC) 8 is used by paid raters (to be described below) to categorize songs uploaded to the server 2. The classifier PC 8 may be coupled to the server 2 and the processor 6, directly and/or through the Internet 4. The consumer typically uses a PC 10 to access the server 2 through the Internet 4, although direct connections may be offered. Song playlists downloaded to the consumer PC 10 may be side loaded to the consumer's MP3 player (or iPod™) 12. Direct download of song playlists from the Internet 4 may also be provided to the MP3 player 12, a consumer Personal Digital Assistant (PDA) 14, and/or a consumer cell phone 16. Various alternative connection schemes are possible as technology advances. All of the connections depicted in FIG. 1 and described above may be wired or wireless connections using the most current technology, such as, for example, an Ethernet connection, an RS-232 connection, 802.11 protocol, or the like.

The server 2 is preferably implemented by the use of one or more general purpose computers, such as, for example, a Sun Microsystems F15k. Each of the processor 6 and the PCs 8 and 10 are also preferably implemented by the use of one or more general purpose computers, such as, for example, a typical personal computer manufactured by Dell, Gateway, or Hewlett-Packard. Alternatively, each of the server 2, the processor 6, and the PCs 8 and 10 can be implemented with a microprocessor. Each of the server 2, the processor 6, and the PCs 8 and 10 may include any type of processor, such as, for example, any type of general purpose microprocessor or microcontroller, a digital signal processing (DSP) processor, an application-specific integrated circuit (ASIC), a programmable read-only memory (PROM), or the like. Each of the server 2, the processor 6, and the PCs 8 and 10 may use its processor to read a computer-readable medium containing software that includes instructions for carrying out one or more of the functions of the respective element, as further described below. Each of the server 2, the processor 6, and the PCs 8 and 10 can also include computer memory, such as, for example, random-access memory (RAM). However, the computer memory can be any type of computer memory or any other type of electronic storage medium that is located either internally or externally to the respective element, such as, for example, read-only memory (ROM), compact disc read-only memory (CDROM), electro-optical memory, magneto-optical memory, an erasable programmable read-only memory (EPROM), an electrically-erasable programmable read-only memory (EEPROM), a computer-readable medium, or the like. According to exemplary embodiments, the respective RAM and/or ROM can contain, for example, the operating program for any of the server 2, the processor 6, and the PCs 8 and 10. As will be appreciated based on the following description, the RAM and/or ROM can, for example, be programmed using conventional techniques known to those having ordinary skill in the art of computer programming. The actual source code or object code for carrying out the steps of, for example, a computer program can be stored in the RAM and/or ROM. The database stored in server 2 can be any type of computer database for storing, maintaining, and allowing access to electronic information stored therein.

In the following, the generation and updating of the Playlist Generator Database™ will be described first, followed by a description of how consumers can access and download desired playlists.

3. Generation and Updating of the Song Database

A. Initial Upload

The generation and updating of the Playlist Generator Database™ uses the Music Content Management System™ to be described below. Initially, the universe of 4,000,000 known songs must go through a filtering and classification process so that the Playlist Generator Database™ may be populated with a small, but manageable number of the most popular songs. Thereafter, the Playlist Generator Database™ will be updated on a periodic basis (perhaps daily, weekly, monthly, etc) to infuse the database with new and listen-worthy songs. Generally, the initial uploading process first filters out roughly 30,000 songs from the roughly 4,000,000 digital music files now available. Each song is then individually classified and rated using five additional criteria. Thus, each song in the server 2 has data appended thereto indicative of these five criteria, in addition to data designating the artist, album, and song name. Of course, more or less than 30,000 songs my be selected as the core of the song database. For present market conditions, it is believed that at least 20,000 (more preferably, 25,000, even more preferably 30,000, or 35,000, or 40,000) songs will comprise the database. Many more songs will not restrict the database to only the best songs, while many less songs will not provide enough variety for most listeners. Presently, the most preferred embodiment allows only the top 30,000 songs (based on estimated audience) reach to remain in the Playlist Generator Database™. This "forced curve" limitation will avoid allowing the database to grow and grow and become less meaningful. Older songs that are classics will always have some current audience reach/appeal. But, a lot of songs will not have enough remaining appeal to remain in the top 30,000. Each month those songs with "near zero" current audience reach will be removed from the Playlist Generator Database™ itself. While subscribers can access them on their PC, they will not appear in the most current PC or Device libraries.

Figure 2:
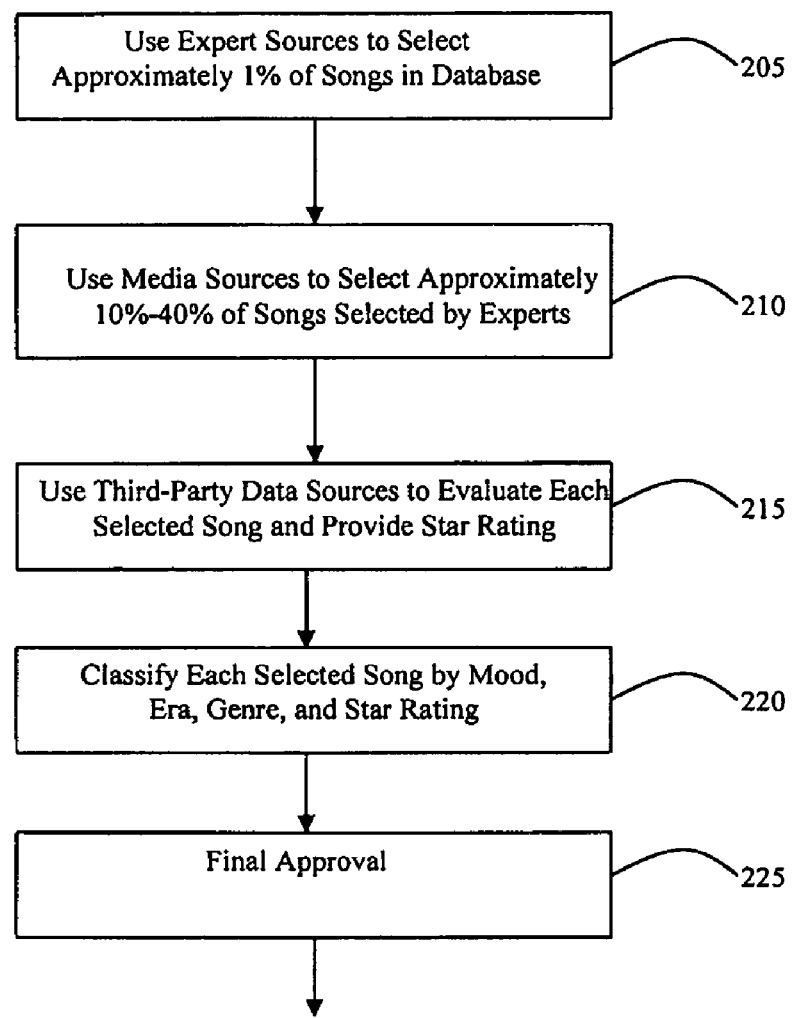
FIG. 2 is a flow chart that illustrates a preferred method for generating and updating the Playlist Generator Database™, according to a preferred embodiment of the invention.

Referring to FIG. 2, the flow chart 200 illustrates a preferred method of initially uploading the 30,000 songs into the Playlist Generator Database™ server 2. Each step in FIG. 2 will be discussed in greater detail below. In the first step 205, Filter #1 uses expert sources (e.g., the songs broadcast by terrestrial radio disc jockeys) to select a portion of songs in the overall song universe, thus providing a first subset of approximately 4,000,000 of the most played/listened-to songs. Then, in the next step 210, media sources (e.g., the songs broadcast in Cable Music playlists) are used in Filter #2 to select approximately 10% to 80% (and more preferably, 35% to 75%) of the songs surviving Filter #1, to provide a second subset of approximately 30,000 songs. In this manner, the number of songs has been reduced in Filter #2 by a factor of approximately 99.2%-99.6%. In the third step 215, third-party data sources (e.g., CD sales) are used to score or weight, each of the remaining selected songs. This scoring assists raters to assign audience reach in Filter #4 as discussed below. For the initial song upload, it is possible to delete Filter #3 since the great majority of the previously-released 30,000 songs that survive Filter #2 will most likely satisfy the Filter

3 processing. In the fourth step 220, a staff of raters utilizing a set of carefully determined guidelines in Filter #4 rates each song with five separate criteria in addition to artist name, album, and song name. These five additional criteria preferably include five "Star" levels of Audience Reach ranking, four Mood/Tempos, six Eras, and any combination of 28 genres. Finally, at step 225, the last Filter #5 is used by the provider's senior staff to approve/disapprove the classification and ratings of all songs which are candidates that survived Filter 4 processing prior to inclusion in the Playlist Generator Database™ server 2.

Now, in more detail, FIG. 3 presents a detailed overview of the song filter and classification process according to a preferred embodiment of the invention. Filters #1, #2, and #3 are designed to dramatically narrow the universe of songs considered as candidates for inclusion in the final database. In Filter # 2, the Music Acquisition System is designed to identify the relevant songs from hundreds of Internet-based and traditional sources of music. Filter #3 then systematically integrates information regarding consumer preferences, listening and purchasing habits. As a result, there is no need to involve individual users in this process. With respect to individual tastes and preferences, these narrowing techniques are based on the invention disclosed in U.S. Pat. No. 4,843,562, in which it is found that there is a surprising consensus among individuals regarding which songs are most desirable. As it turns out, a very small subset of the 4,000,000 song universe makes up 98% of all the music listened to or purchased either over the Internet or from traditional sources.

The filtering and classification system of the present invention is designed to choose a narrow universe of approximately 30,000 songs and individually classify and rate those songs by five separate criteria. In a preferred embodiment, for an 80 Gigabyte device, 19,000 songs and 500 "channels" (predetermined playlist criteria) are downloaded, and the channels are displayed on the menu of a portable MP3 player as a convenience to consumers. Because the system allows the listener to carry the entire recommended song database on an 80-gigabyte portable MP3 player, the consumer can select any one of the channels to quickly and easily listen to a desired playlist. However, active listeners can generate up to 1.8 billion different playlists on demand from the same 30,000 song database on their PC, to determine what playlists are side loaded to their portable device.

Smaller subsets of this database are also maintained to address small capacity devices that provide, for example, only 500, 2,000, or 5,000 songs. As described above, the system also provides 500 (or up to 1,000) of the most likely song combinations or playlists in a numbered fashion similar to cable TV or satellite radio. These channels may be stored on the MP3 player as noted above, or may be used on the consumer's PC to narrow the 14,000 to 30,000 song library to a smaller size library or playlist to be side loaded to a smaller-memory portable device. This allows the consumer to choose from hundreds of playlists on-demand to be side loaded to the portable device. However, less common combinations, selected by the consumer, can also be chosen on the consumer's PC and side loaded to the portable device. While the consumer is not required to choose a single song or artist in order to enjoy the entire 30,000 song collection or the pre-programmed channels, he/she is free to do so. Moreover, the same song may appear in numerous different playlists on the same portable MP3 player. Referring to FIG. 3, the preferred embodiment provides a database of individual songs by utilizing a five stage process to select, acquire, classify, rate, and retrieve songs.

(1) Filter #1: Five Experts Choose the Music

It is estimated that roughly 4,000,000 songs are now available via the Internet, and 2,700,000-song libraries of properly licensed music are common among major online music portals such as Apple iTunes, MTV/Urge, AOL, Music, and Rhapsody. Meanwhile, community sites such as MySpace and others now boast of hundreds of thousands of bands and songs, most of which do not appeal to a significant audience. These huge numbers are irrelevant to a passive music listener, because most of this music is simply bad and of no interest to a wide audience of passive listeners. Unfortunately, existing systems for recommending and retrieving music search 2,000,000 to 4,000,000 songs to identify potential candidates. These systems therefore include songs that were never, and will never, be considered worth listening to by a significant audience simply because their digital fingerprint or compositional elements match according to some mathematical algorithm or "similar artist"-type formula.

Fortunately, nearly all the music heard or purchased anywhere in the world has already been screened by one or more of the five expert sources noted below. Thus, PushButtonMusic™ takes advantage of this work in Filter #1 to exclude those songs not found worthy of publication by the experts. If it is not published by one of the five expert sources, PushButtonMusic™ need not consider a song further. According to the preferred embodiment, PushButtonMusic™ staff or hired contractors review the output (manually or electronically) of the below-listed expert sources to conduct further screening of songs in Filter #2:

The A/R departments of record label companies. These include four major label groups, 100 reasonably respected independent ("indie") labels, and Internet-only labels.

The program directors of terrestrial, satellite, and Internet-radio networks, and local disc jockeys.

Soundtrack editors of movies and television programs.

Live venue owners and managers. These include major concert amphitheatres as well as respected bars and night spots in college towns.

Editorial staff members of major music industry periodicals, as well as the charts and listener activity published by those same periodicals (i.e. the Billboard charts).

The five experts described as Filter #1 all play a slightly different role in deciding what music will be made available to consumers through normal commercial channels. For example, the Artist Relations (A/R) of the four major label groups and thousands of "internet only labels" hear hundreds of artists they do not sign or promote. Most of the 135,000 artists with websites on MySpace never clear that hurdle. Broadcast programmers (P/D) must then choose a very narrow set of what the major and indie labels promote to them to play for their own targeted audiences. Editors from music magazines, such as Billboard and Rolling Stone, then chart this small universe of songs and often recommend their favorites. Most soundtrack editors pick an extremely narrow list of artists and songs to fit a particular movie and present huge "breakout" opportunities for new arties. Live music venue owner/managers give many lesser known acts a chance to show off their stuff and earn a little money. By relying upon the most respected experts, the candidate song universe is dramatically narrowed, and a consistent and high quality list of songs with no irrelevant or unfavorable songs is generated. Of course, greater or fewer than these five expert sources may be used, depending upon the number and type of songs desired in the Playlist Generator Database™.

Thus, after the Filter #1 processing (Step 205 in FIG. 2), approximately 4,000,000 of the most popular and listened-to songs published as far back as 1928 are identified for further processing.

(2) Filter #2: Music Acquisition System

Unfortunately, even the expert sources of Filter #1 produce, promote, and even broadcast a lot of really bad music. One reason is the label's desire to sell an album containing 10 songs, when all the consumer cares about is one or two. In fact, many existing methods for retrieving music have failed to account for the fact that albums are largely dead. In the digital music age, consumers cherry-pick the singles they want. For example, music consumers now download roughly 1.5 million songs per month on illegal file sharing networks—they rarely bother with whole albums. The days of consumers buying an album costing $9.99 or $15.00 to put one or two songs in their personal library are ending much faster than industry experts anticipated only two years ago. Broadcasters, however, have adapted to these simple realities for years when addressing a passive audience. They play songs, not albums. Accordingly, the system of the present invention incorporates this reality into its own music retrieval system by further limiting the number of songs resident in the Playlist Generator Database™ server 2.

Figure 4B:
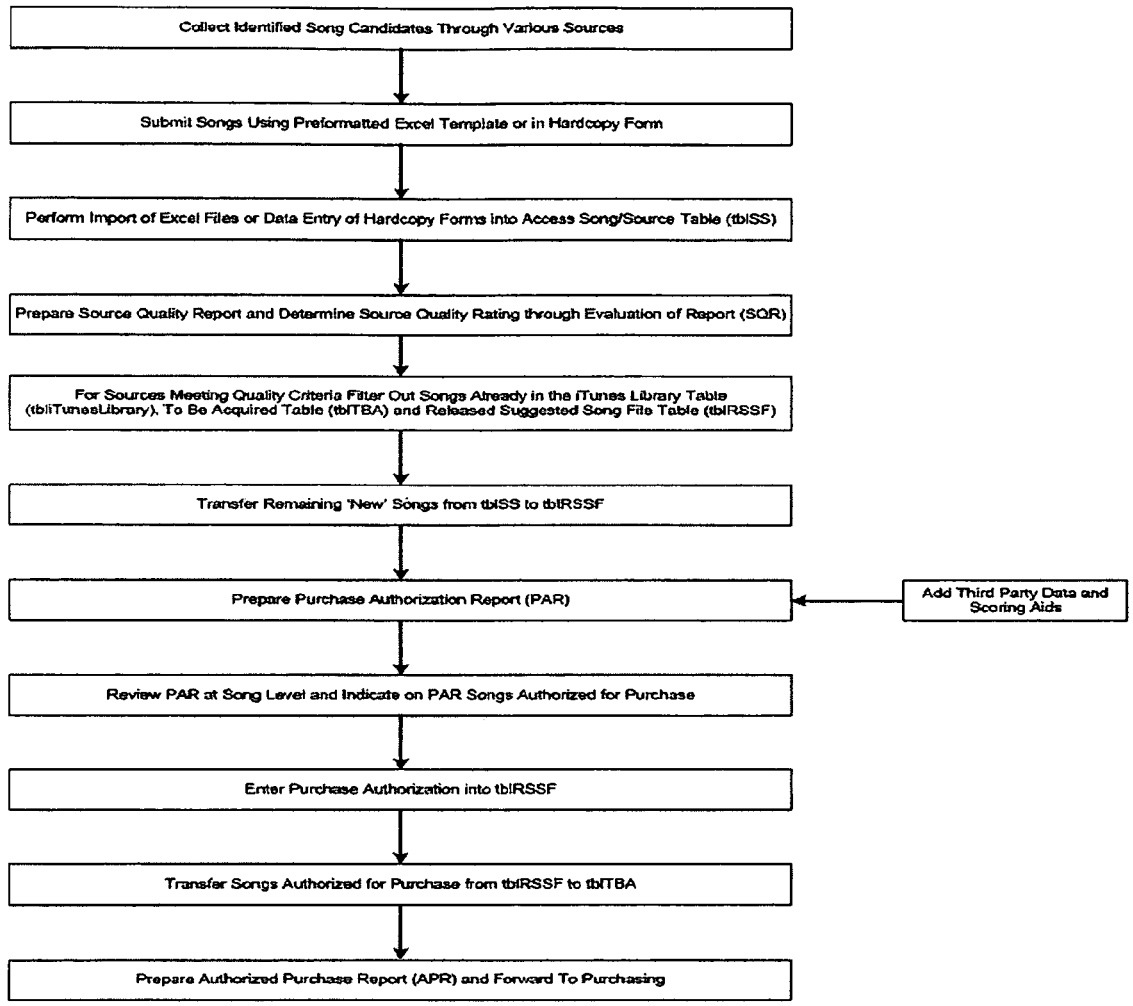
FIG. 4B is a flowchart illustrating Filter #2 processing.

Accordingly, referring to FIGS. 3 and 4, in order to populate the Playlist Generator Database™ with only the most sought-after of the 4,000,000 songs surviving Filter #1, the preferred embodiment integrates information from selected media sources into Filter #2 (step 210 in FIG. 2). Filter #2 is preferably subdivided into two parts: Third Party Sources; and Proprietary sources. Third Party Sources preferably include eight different sources (see FIG. 4A), while the Proprietary Sources preferably include two different sources. Of course, Filter #2 may include any number of sources currently available to further limit the song database to a manageable number of perhaps 30,000 songs.

In Filter #2, PushButtonMusic™ staff or hired contractors electronically and physically research eight sources of media information that reflect the opinion of a subset of the Filter #1 experts. These are shown in FIG. 4A. "Suggested Song Files" from these media sources are then merged with "Suggested Song Files" from the remote Contributor network (to be discussed below) to create a combined list of suggested songs for further processing. A preferred Access-based computer platform that controls the entire Content Management System then automatically scans this Suggested Song List and removes about 80% of the duplications. Table 1 below depicts the steps required to process these suggested songs, prior to Filters 3, 4, and 5, as described below.

TABLE 1

| Steps For Processing Suggested Song Files |  |
|---|---|
| Song Source File AfterComputer De-Duplication | |
| CO-III-5 | Perform Manual De-Duplication |
| CO-III-6 | Load Songs to TBA File<br>To Be Acquired (TBA) File |
| CO-III-7 | Purchase Songs/Update TBA Status One Song At A Time |
| CO-III-8 | Post Purchase Clean-Up Procedure/Update Unavailable File Purchased Songs On iTunes Purchase Computer |
| CO-III-9 | Conduct Artist Assignments As Required |
| CO-III-10 | Transfer Songs to iTunes Library |

TABLE 1-continued

| Steps For Processing Suggested Song Files |  |
|---|---|
| iTunes Main Library | |
| CO-III-11 | Import Current iTunes Library Into Access |
| CO-III-12 | Conduct WAS and iPod Loading Procedure |
| CO-III-13 | Review Submitted Ratings For Errors |
| CO-III-14 | Enter Initial Ratings |
| CO-III-15 | Conduct WAS and iPod Loading Procedures For Senior Rater |
| CO-III-16 | Enter Senior Ratings |
| CO-III-17 | Load: Final Needs Approval iPod |
| CO-III-18 | Enter Final Approval |
| CO-III-19 | Load Full iPods |

The thus-located songs are purchased, updated, and entered into the Playlist Generator Database™ server 2 by the staff for further filtering. Alternatively, software may be written to automatically access electronic output from these sources to automate the input of songs into the server 2. The automated embodiment is preferred since, as will be described below, new songs will be filtered and added to the server 2 on a periodic basis in extremely large volumes from all the sources described in Filter 2 below.

(2a) Filter #2: Third Party Sources

Preferably, the Third Party Sources (Media Sources) of popular music used in Filter #2 include (i) Periodical Review and Extraction, (ii) Monitor Top 60 Web Based Sources, (iii) Acquire and Enter Motion Picture Sound Tracks, (iv) Monitor Satellite and Cable Broadcaster Playlists, (v) Mobile Phone Radio Playlists, (vi) Review Major Label Suggestions, (vii) Review Indie Label Suggestions, and (viii) Review Internet Label Suggestions.

(i) Periodical Review and Extraction. To filter songs in the Playlist Generator Database™, PushButtonMusic™ staff or independent contractors may physically review music industry periodicals and extract lists of the most popular songs. Many of these sources are extracted automatically in step CO-III-I as shown in Table 1. For example, PushButtonMusic™ staff or independent contractors may consult such Media Sources (for Single Songs) as Radio Airplay Charts, CD Sales Charts, Internet Airplay Publications, and Internet Download Publications. PushButtonMusic™ staff may also consult Historical Media Sources such as published Past Charts and Data and Retrospective Collections. Finally, the PushButtonMusic™ staff may consult Editorial Media Sources (for Singles and/or Albums) such as Highly Rated or Reviewed Top Picks, Recommended Playlists, and/or Famous People Playlists.

Examples of Periodical Media Sources reviewed for this portion of Filter #2 are shown in FIG. 4A and include: BPM; Bender; Billboard; Blender; Buddyhead.com; Comes With A Smile; EW (Listen to This); Filter; Harp; Jam; NewMusicWeekly.com w/STS; No Depression; Notion; MixMag; Paste; Pitchforkmedia.com; R & R; Relix; Res; Rolling Stone; Spin; The Big Takeover; The Source; Uncut; Vibe; XLR & R; XXL; Wire; etc. Of course, sources may be added or deleted as they gain or lose in relevancy over time.

The review and extraction of the identities of popular songs from periodicals is preferably automated via appropriate software interfacing with electronic output from the relevant periodical sources.

(ii) Monitor Top 60 Web Based Sources. PushButtonMusic™ staff or independent contractors may also physically review the top 60 (or any convenient number) of web-based sources to identify songs that will be added to the song database. Again, such review may be automated through simple software code. Such web-based sources may include: the top songs downloaded over the Internet for a given week, month, year, or ever, etc.; new artist recommendations; and playlist recommendations, from any of the sources noted in FIG. 3.

Preferably, the 60 web-based sources are chosen from among the following, although this list will change over time:

18 Diversified Subscription Services (Incl. Playlist Recommenders)
  AOL Music Now
  Amazon
  Cdigix
  HMV
  iMesh
  EMusic (Dimensional Fund/Indie Focus)
  iTunes—Mostly Download/Not Subscription
  Napster—Roxio (Pressplay)
  MSN Music (with GarageBand)
  MTV
  MusicNet—1999 Consortium, Infrastructure, Baker Capital
  RealNetworks—Rhapsody
  Target
  Transworld Entertainment
  Virgin
  Yahoo—LAUNCHcast
  Yahoo—Music Match (Auto DJ)
  Yahoo! Webjay (Playlist Sharing Website)
22 Web Based New Artist and Playlist Recommenders
  Acclaimedmusic.net
  Allmusic.com
  ArtistServer.com/Electronica
  BuddyHead.com
  CDBaby.com—CD Retailer
  Clear Channel New Artists
  Fresh Tracks
  GarageBand/MSN
  MP3 Unsigned.com
  Magnatune.com
  Metacritic.com
  Music.MySpace.com
  MusicStrands
  MyMixedTapes.com
  Muze.com
  PitchforkMedia.com
  Planet of Sound
  Players Music IP
  PureVolume.com
  RedButton.com
  Sire Systems
  Sugaroo.com
20 Webcaster/Podcaster Playlist Creators & Recommenders
  AOL Radio Network (Free and Paid)
  Backbeat Podcast Network—Commercial
  Clear Channel Radio Web Sites
  Clear Channel—Premier Radio
  E-Music Radio
  Live365.com—5,000 hosted Podcasts (Free and Paid)
  Mecora.com IM Radio—Allows Downloads
  MSN Radio Plus (Free and Paid)
  Napster/XML—Radio (PressPlay)
  Pandora Radio—Create Your Own Streaming Radio Station
  Radio 365 Web Cast—Auto Request System
  Radio@Netscape Plus: (Spinner.com)—150 Stations
  iRadio/Motorola—400 Stations
  Rhapsody Radio—100 Stations Subscription/25 Free/Provider to Comcast, Sprint)
  Rule Radio.com
  Shoutcast.com—Free, Will Play Through itunes
  VH1.com Radio—Has Themes—Moods
  Yahoo! LAUNCHcast Radio Service (also Music Match) (Free and Paid)
  Yahoo! Radio Network (2.6 million listeners)
  Yahoo! Webjay (Playlist Sharing Website)—
15 Web Based Song Matching or Customized Playlist Generators
  Amazon.com
  Grace Note
  Last FM—People with similar playlists
  MOG.com—Social network recommending songs
  Music Genome—Song Matching Software
  Music IP
  MusicStrands
  MyStrands.com—tracks songs you play
  Pandora—Algorithm
  Rhapsody—Playlists Based on Favorite Artist
  Rhapsody—Playlist Central Sharing Lists
  Siren Systems
  Yahoo—LAUNCHcast—Construct Your Own Playlist
  Yahoo—Music Match—People With Similar Tastes Like This (Juke Box 10)
  Yahoo—Webjay (Playlist Sharing Website)
9 Mobile Music Infrastructure Sites
  36U Upload (acq. Mophone)—Mobile Entertainment Portal—4,000,000 users
  Amp'd Mobile
  Groove (Sprint)
  Hands-On-Mobile (was MForma)
  Helio—MUNO (For "Hero" and "Kickflip" devices
  InfoSpace
  Music Waver Mobile Music Download Services
  Verizon V-Cast
  Virgin Mobile USA—
12 Smaller Music Sites
  About Music
  AudioLunchBox.com
  Drowned in Sound (Foreign Acts)
  Live Music Archive (archive.org/audio/ETREE.PHP)
  Mix and Bun
  MuchMusic.com
  Passalong.com
  People Sound/Vitaminic Music Network
  Secondhandsongs.com
  SongConnect/Sony
  Soundtrack.net/trailers
  Whatsthatcalled.com
15 P2P File Sharing Sites
  ArtistServer.com
  BitTorrent
  eDonkey
  FastTrack
  FreeNet
  Gnutella
  Grokster
  Kazaa
  Limewire
  MashBoxx
  Mecora
  Morphers (Steamcost)
  Qtrax (ad supported)
  SoulSeek
  WinMX
11 Online Digital Music Infrastructure Sites
  CDBaby.com—CD Productions for Indies Entrig—Protect, Monetise, Publish
IODA (iodalliance.com)—Aggregator Indie Music
Loudeye.com—Digital Music Services
Musicane—Content Payment Processing
MusicGenome—Song Matching Software
MusicGiants.com—Super Quality Audio Downloads
Music IP—Song Matching Software—Acoustic Discovery
MusicNet
Passalong Networks P2P Revolution Platform
PumpAudio—Licensor of Digital Music to Show Television Producers
7 Download Only Sites
BuyMusic
Buy Music
Download Punk
Music Now
OnDemandDistribution (OD2, Europe)
SonyConnect
Wal-Mart
5 PodCast Infrastructure Sites
Audible—Spoken Content for iPods
iPreppress—books for Podcasts
Odeo
PodCastReady
Yahoo! Webjay (Playlist Sharing Website)

(iii) Acquire and Enter Motion Picture Sound Tracks. PushButtonMusic™ staff or independent contractors may also physically review all released Motion Picture Sound tracks for songs to be added to the song database. Again, this process may be automated with appropriate software.

(iv) Monitor Satellite and Cable Broadcaster Playlists. Again, PushButtonMusic™ staff or independent contractors may review selected satellite and cable music broadcasters to identify those songs that are to remain in the song database. Sources such as Sirius, XM, Music Choice, MTV, VH-1, DMX, etc., may be monitored physically or automated on a periodic or continual basis.

(v) Mobile Phone Radio Playlists. The PushButtonMusic™ staff or independent contractors may also review selected mobile phone playlists to locate songs to add to the song database. For example, the carrier 3 London; Axcess Radio Alltel; iRadio Motorola—435 Stations; Sprint (Groove Mobile); and V-cast Verizon (Amp'd/Mobile) may be physically monitored or monitored electronically with appropriate software code to add to the songs which will added to the song database at the end of Filter #2.

(vi) Review Major Label Suggestions. The PushButtonMusic™ staff or independent contractors may see song releases of the major music label companies by watching the release schedules on their websites. Popular songs are easily obtained this way. This process may be automated.

(vii) Review Indie Label Suggestions. Similarly, the websites of the independent labels may be reviewed by the PushButtonMusic™ staff or independent contractors for suitable songs to be added to the song database. Again, this process may be automated.

(viii) Review Internet Label Suggestions. The PushButtonMusic™ staff or independent contractors may likewise monitor or review the websites of the companies which release songs through the Internet. Since the songs themselves can easily be obtained through the Internet, this process can also be automated.

(2b) Filter #2: Proprietary Sources

Also included in Filter #2 are two proprietary sources, as shown in FIGS. 3 and 4. The first proprietary source preferably includes a network of hundreds of (preferably 500) trained part-time Remote Contributors. These contributors preferably undergo rigorous training and online examinations concerning all aspects of the Rated and Classification Guidelines in order to be admitted to, and then remain, a Remote Contributor. Preferably, such contributors are music-savvy such as local and/or professional musicians, local music venue employees, college kids, bartenders, amateur music buffs, local music press reporters, DJs, radio station program directors, etc. This network of Contributors covers local music venues, local music night clubs, college radio stations, and the local music press (and their websites). Contributors are used to find out what the Venue Managers and other "experts" are playing in their local clubs, etc. This provides an early detection system for artists that have not yet received a record contract and are therefore unlikely to show up in the third party sources discussed above. In practice, these Contributors forward to the PushButtonMusic™ staff lists of songs which are deemed worthy of inclusion in the song database. Since these locally-discovered songs are not likely to be derived from the Media Sources shown in FIG. 4A, they will be added to the existing song database by PushButtonMusic™ staff.

Preferably, the trained Contributors work on a part-time basis via the Internet. As stated above, these Contributors cover sources not well represented in the eight Media Sources described above. In addition, they are constantly blogging and surfing the net for song suggestions that the preferably automated web search system described above may miss. These include certain locations within major music portals and community websites such as MySpace. These Contributors preferably will be required to pass a number of online examinations and training exercises to be qualified as a PushButtonMusic™ Contributor. As a result of this training, the Remote Contributor Network produces a large volume of highly desirable song suggestions, many of which are still unknown to the experts and media sources described earlier. Preferably, these Contributors are paid only for songs the song database does not already have, for example, on a per-star basis (to be described below). For example, simply suggesting a song not already on the song database that achieves a 5-Star audience reach (in Filter #4 to be described below) pays $10.00 to the Contributor. If the song is from an artist that is new to the system, it could pay, for example, $35.00.

The second proprietary source in Filter #2 is PushButtonMusic™ staff or independent contractors who monitor the websites, tour schedules, and release schedules of artists that have already been detected and have songs already in the song database that are rated highly. This includes many younger artists without major label contracts. This second source informs the Contributor Network of the first proprietary source of activity regarding the rated artists assigned to them. This unique source provides valuable information to assist the remote Contributors discover new artists and songs.

The next step in Filter #2, is a preferably automated method for determining whether or not a suggested song is already in the database, as shown in Table 1. Given that hundreds of songs enter the system daily from the wide variety of sources described above, this automated de-duplication system is helpful. The system then generates a Source Quality Report™ (SQR) that shows what rating was assigned to the duplicated songs already in the system. This tends to suggest what rating level can be expected from a particular source. Later, the staff reviews the classification and rating achieved by the new suggested songs from a particular source to further determine if the source is delivering the quality and type of music needed in the song database.

In greater detail, since Filter #2 generates song suggestions acquired from both non-proprietary and proprietary sources, this means that hundreds of playlists, charts, and lists of favorites from the Contributors will be coming in every day. Sorting through thousands of songs per day is very difficult. To alleviate this problem, the preferred Duplication and Source Quality Control System™ has been adopted. This system provides the SQR™ briefly discussed above. This system is preferably automated and includes a number of steps. In Step #1, an internal Source Editor software module identifies a particular song source from one of the five experts discussed above with respect to Filter #1. This could be a music website, a community networking site, or a hard-copy periodical available online. A number of different automated methods may be adopted to obtain the music, depending on the communication protocol required. The identified songs are then put in a Suggest Song File™ (SSF™). Alternatively, the network of remote Contributors may directly submit Suggest Song Files over the Internet using, for example, an EXCEL© File format.

In Step #2, within seconds, another software module determines which songs the system is already aware of. Preferably, this will identify songs and artists even when the spelling and title format are slightly different. Another software module then gives the Source Editor (or Remote Contributors) four pieces of information:
A. The number of duplications submitted and the "duplication ratio" of songs submitted by that source.
B. What genres the duplicated songs fell into.
C. The audience reach/popularity ranking (star level) of the duplicated songs.
D. A composite SQR™ score based on the current ratings of the duplicated songs
A source with a high duplication ratio, SQR above 2.5 stars means that the source is providing a good number of songs with an estimated audience reach above the weighted average in the Playlist Generator Database.

Step #3 of the SQR system begins after the new songs have been classified, rated, and approved in Filters 4 and 5 described below. Theses results are then added to the original duplicate songs and a new cumulative SQR™ is run. A new source or Remote Contributor that does not maintain a cumulative SQR™ above 2.5 will eventually be dropped. This quality control system has three major benefits: 1) It insures that the Rater team, in the second part of Filter #2, does not get overwhelmed with poorly suggested songs. 2) It gives the Source Editor feedback on new sources, within minutes. 3) Hundreds of sources with thousands of song suggestions can be processed in a fully automated fashion.

As shown in Table 1, the Filter #2 process preferably uses an Access-based computer system (see FIG. 4B) for sorting through many thousands of song suggestions per day (during daily updating, to be described below) to eliminate duplication from all eight Media Sources as well as song suggestions submitted by remote Contributors over the Internet. This is done by first creating a Suggested Song File in a standardized format from each source. In some cases, these Suggested Song Files are created by extracting song lists from the source in an automated fashion. In other cases, the Suggested Song File is hand-created by the PushButtonMusic™ staff. This system also carefully tracks the source and time of every song suggestion file received by the system, as shown in Table 1, and accepts them on a "first-in" basis. This automation is preferred in the design of Filter #2.

The above-described preferred embodiment of Filter #2 produces numerous advantages in creating a Playlist Generator Database and playlist generation system. 1) This filter eliminates a significant amount of overhead required by traditional music programmers to recommend songs and prepare playlists for broadcast. 2) Aggregating song recommendations from qualified Third Party sources and Contributors eliminates the need to involve consumers or programming staff in the music selection process. 3) Currently, no other music programming system includes a full review of so many Third Party and Contributor sources on a periodic (daily) basis, including a wide array of Internet sources. Even the most active music listeners, including professional programmers, cannot accomplish this on their own. Note that the preferred embodiment does not rely upon the unstructured random opinions of individuals on social networking or community web sites such as MySpace or Mog.com. That is the approach of many of the "song recommender" systems described above in the Background. Rather, the preferred embodiments according to the present invention provide a disciplined, wide-ranging approach which monitors hard data such as actual sales, actual broadcasts, and listening habits.

(3) Filter #3: Integrate Third Party Data Sources

In Filter #3, songs that survive Filter #2 are then provided with information available from third party data sources. Specifically, data is acquired from third party providers to assist the Raters in Filter #4 (to be described below). Such data includes information regarding terrestrial airplay, internet airplay, file sharing activity, traditional retail sales, and download activity over sites such as Apple iTunes™. This information is inserted onto a Work Assignment Sheet (WAS) that will be sent to the Raters in Filter #4. This gives the rater a number of quantitative estimates of a selected song's Audience Reach and sales activity. The primary objective of Filter #3 is to provide helpful information to the raters in Filter #4, described below, as opposed to reducing the number of songs.

The song database created by this 5-stage filtering system is large enough to include all the highly rated music found on a set of principal sources, which includes the following:

The most discussed songs/bands on MySpace and other music oriented community sites.

The top choices from 60 music websites, including iTunes and E-Music;

Almost every song on every playlist recommended by all eight music subscription portals (e.g. MTV/Urge, Yahoo, AOL, Napster, and Rhapsody);

All songs from Billboard Top 100 Lists for the last 40 years; and

Nearly all of the songs played by R&R "Reporting Stations" over the last 10 years.

In Filter #3, PushButtonMusic™ staff or independent contractors review the information available on a particular song from at least the following five sources to help the Raters in Filter 4 (described below) assign an estimated audience reach to the songs already stored in the song database based on: (i) Terrestrial Airplay Activity, (ii) CD Sales, (iii) Internet Airplay Activity, (iv) File Sharing Activity, and (v) Internet Downloads.

(4) Filter #4: Initial Classification and Rating System

In general, Filter #4 implements the Music Classification & Rating System™ (part of the Music Content Management System™) to categorize the songs in the Playlist Generator Database™ according to five criteria in addition to artist, album, and song. Judging the so called "quality" of a given song candidate is not the purpose of the Music Classification & Rating System™. Filters #1 and #2 have already identified the top 1% of the 4,000,000 song libraries now available. Rather, in Filter #4 a group of highly-qualified and trained Raters reviews each song in the database and assigns to each song data indicative of (i) that song's "Star" level (estimated Audience Reach), (ii) one of four Mood/Tempos for that song, (iii) one of six Eras for that song, (iv) any combination of 28 genres for that song, and (v) the raters break apart song compilations such as "Best of Bill Withers" or "Rock of 80's" and then look up and assign each individual song with its correct initial release date. Compilations make up roughly 40% of all albums sold both in physical and digital form. However, other services show only the release date of the compilation, not that of the songs themselves. These original release dates in turn allow the end-user to select an entire playlist of songs across 20,000 artists and all 28 genres for a particular year of group of years. These pre-categorized songs, then, become the basis upon which consumers have unparalleled flexibility in generating and downloading any of 1.8 billion possible combinations of playlists.

This system preferably utilizes a group of part-time private contractors willing to make from $10 to $20 per hour listening to and rating music on their PC, working at home over the internet. Most are professional musicians looking for day jobs or former radio station programmers. To make the process more efficient and to improve consistency, a particular artist will normally be assigned to one Rater who is particularly experienced with a particular genre. Artist familiarity cuts the time required to rate and classify music by almost ⅔. Many of the Raters also belong to the network of Filter #2 Contributors, which further insures quality and speed.

Preferably, the Raters are trained to ensure uniform categorization of the database songs. To become a Rater, an individual must first pass an examination, and then be subject to constant training and quality review. A Rater candidate first submits his/her own top 100 songs for review by the PushButtonMusic™ staff. If a high portion of these top 100 songs are resident in the song database, the Rater candidate will then receive the most recent Rater/Contributor Guidelines and an MP3 player with samples of songs already in the database. The candidate will then categorize these sample songs and return their work to the PushButtonMusic™ staff. The Rater candidates are then evaluated to see how closely their categorization of the sample songs matches the existing categorization data already in the database. The Rater candidates whose categorizations most closely match those of the database are selected as Raters. Raters receive on-going training to ensure high quality, uniform application of standards across the entire database. Periodic (perhaps weekly) conference calls and online seminars may be used for training purposes.

Filter #4 thus preferably applies five distinct criteria to each song in the database: (i) that song's "Star" level (estimated Audience Reach), (ii) one of four Mood/Tempos for that song, (iii) one of six Eras for that song, (iv) the song's Original Release Date, and (v) any combination of 28 genres for that song. The criteria and the methods of applying them will be described in more detail below.

(i) "Star" level (estimated Audience Reach). In the absence of a consistent and uniform method to evaluate a subjective criteria such as "quality," the system uses popularity, which is referred to herein to as audience reach. This allows the purely quantitative information assigned in Filter 3 to help determine a song's current or potential audience reach. This method is consistent with how many consumers think about popular music. Specifically, songs that make the top 40 or the Billboard Top 100 got there from airplay and sales both physical and digital. The first challenge in developing a uniform classification system across many genres is what to do about the "small audience" genres. For example, a very popular jazz song is still unlikely to make the Billboard 100 because its audience reach is too small. Table 2 below shows the audience share by format (or genre) for terrestrial radio in late 2005.

This table shows just how different the audience share is among major formats (genres) and tiny formats. Most of the preferred 28 genres fit into these music formats, but many do not. As a result, terrestrial radio cannot offer the diversity available from internet radio platforms such as PushButtonMusic™. PushButtonMusic™ creates libraries of a fixed size that in some cases, represent the best picks across the entire music universe. In this library, a top Jazz song may still receive only a 2-star audience reach despite being recognized by Jazz aficionados as very high "quality." That is because its overall popularity with other music audiences is still very small. Thus, the preferred embodiments provide a uniform rating system for both small audience and large audience music contained in that library.

TABLE 2

National Format Shares from R&R Survey Fall 2005

| Format | Share |
|---|---|
| Miscellaneous | 1.0% |
| Adult Standards | 1.0% |
| Classical | 1.3% |
| Adult Hits | 2.3% |
| Smooth Jazz | 2.8% |
| Religous | 2.8% |
| Alternative | 3.7% |
| Classical Rock | 4.1% |
| Oldies | 5.7% |
| Rock | 8.2% |
| Country | 9.0% |
| Urban | 9.9% |
| Latin Formats | 10.2% |
| CHR | 11.0% |
| AC | 14.0% |
| News/Talk/Sports | 18.0% |

A principal goal of the PushButtonMusic™ star rating system is to allow a mass audience of listeners to sample music across many different genres and time periods using a single database or library of songs. This allows subscribers to discover great music from genres, time periods, and artists they are not very familiar with. This type of cross-over programming is not available on either satellite or terrestrial radio which, for the most part, follow traditional radio "format" guidelines. This requires consumers to channel surf in order to find cross-genre music and most of the time, music from small audience genres is just not available.

The problem with a uniform system is that it will include music from both large and small audience genres. While Jazz, for example, has less than a 3% share, it represents a huge repertoire of songs covering many decades. Since the preferred embodiment will deliver a 14,000 or 30,000 song library, only a select group of those small-audience songs, which actually have an audience reach estimate or "crossover" potential above 2-stars as described below, will be included in the song database. The preferred embodiment provides two solutions to this problem. First, lovers of a particular small genre, such as Jazz, World, Reggae, Bluegrass, Folk, etc. can select a library with a song count heavily weighted to these genres. To that end, the best song list available in those genres from the 4,000,000 songs available have been chosen for inclusion into the song database. Therefore, it is really not necessary for this small audience of listeners to rely upon the star system to find great music in these categories. They simply select "1 star and above" and get everything in that genre. Secondly, for a mass audience with little exposure to small audience genres, they can still rely upon a ranking system based on estimated audience reach. While aficionados can choose jazz music with one or two stars, or by a favorite artist or era, the mass audience will likely select only songs rated 3-Stars or above.

Another problem with existing systems based on individual consumer "quality" scores is that they usually create over 500,000 5-Star songs, making them useless as a search tool. In the present invention, on the other hand, songs that can or do appeal to a larger audience receive a higher star rating than songs that do not. This means, by definition, that very few of the carefully selected Jazz or Bluegrass songs in the preferred embodiment will actually receive an Audience Reach rating higher than 2 stars. As shown on Table 3 below, a 3 star song, should reflect a medium size audience appeal and a "50% Crossover Potential". That means that one can expect that 50% of the users with this song in their chosen library, will not skip it when it comes on. The result is that users can choose a 3, 4, or 5 star list and hear a few songs from small audience share genres. That is what one would expect from genres commanding less than a 5% audience share. At the same time, small genre lovers can simply click on 1 star and above and hear a much deeper list of songs. The same is true for a particular artist. If the user wants a deep list of songs including those with relatively small mass audience appeal, he/she merely includes 1 star songs in the list. This arrangement thus has nothing to do with quality per se, but creating a single library of songs to cover all genres. Fortunately, this creates a star rating system that still makes sense to a mass audience.

TABLE 3

| | Crossover/Skip Potential | Share of Rated Songs | Culmative "and Above" Share |
|---|---|---|---|
| 0-Star: | Processed But Omitted Songs | | |
| 1-Star: | Deep Playlist Songs | Bottom 20% | 100% |
| 2-Star: | Favorite Songs By That Artist Favorite Songs In That Genre | Next 25% | 80% |
| 3-Star: | 50% Crossover Potential Medium Audience | Next 35% | 55% |
| 4-Star: | 75% Crossover Potential Large Audience | Next 15% | 20% |
| 5-Star: | 95% Crossover Potential Mass Audience | Top 5% | 5% |

Choosing a given star rating means all songs at that rating or higher.
Super songs in a small audience genre may receive only 2 or 3-Star due to limited Audience Reach.
For the best songs in a small audience genre, pick 2-Star and above.

Consumers that choose to do so can download the entire 30,000 Playlist Generator Database to their PC and then select from 115 Device Libraries, ranging from 250 to 25,000 songs to side load to their portable device. In creating a practical embodiment, it must be recognized that a 80 GB MP3 player will only hold 19,000 songs, and many subscribers will request Device Libraries that are far smaller. Therefore, to create these libraries, a narrow universe of music should be selected with the broadest appeal possible to roughly 90 million owners of MP3 players. As a result, the initial 30,000 song Recommended Song File will preferably represent less than 1% of the song universe now available. On an on-going basis only about 13% or 125 songs of the roughly 982 released daily will even be submitted for rater review. Theoretically, all of the songs that are submitted for classification and rating are, by definition, the most appealing from an audience reach standpoint from any artist and any genre. Within this narrow universe any attempt to establish "quality" ratings per se would be almost entirely subjective. Instead, stars are assigned based on estimated Audience Reach or "Cross-Over Potential." In this regard, a song's star rating should generally reflect the current or potential audience for that song. Fortunately, there is already a broad consensus among the listening public about what constitutes the best music to listen to in every genre. In most cases, these songs will already have demonstrated airplay and sales on the internet or via traditional channels. To assist the Raters, the most current information available from Internet, satellite, and terrestrial airplay, will appear on the Raters Work Assignment Sheet (WAS). This information is a good proxy for both quality and audience size.

Obviously, one could fill an entire 19,000 song Device Library with only the most popular songs from one or two mass audience genres. (That is, in fact, what most radio broadcast networks do.) However, even the most passive listener in the digital music age has come to expect far more diversity and a higher "discovery ratio" than they can find on the narrow playlists of terrestrial and satellite radio programming. Therefore, the 19,000 Recommended Song Device Library according to the present embodiment will include what is currently believed to be the most popular music from 28 different genres. To accomplish that, a strict forced curve is applied to the entire database, based on the size of the audience that would enjoy at least some exposure to the song, even for listeners unfamiliar with the genre. This creates some challenges:

Subscribers interested only in small audience genres such as Children, Christmas, Jazz, Gospel, Rap, Dance, World, and Latin can still select that specific genre to listen to. A "1 or 2-Star" rating will give them what is currently considered the best music in that specific genre. A "1 or 2-Star" rating or above therefore includes the Raters' top picks among the thousands and thousands of songs available in that genre. Therefore, the best 15 songs by a jazz genius such as Billie Holiday or Miles Davis will generally receive a 1 or 2-Star rating, not a 5-Star. This is a mechanical not an editorial issue. Do not think quality, think "Audience Reach" and "Cross-Over Potential."

3-Star, 4-Star, and 5-Star ratings are based on the "crossover potential" or the size of the audience that will be attracted to a song. Songs in very popular genres such as Country, Rock, Pop, or R&B will therefore make up the vast majority of the songs 3-Stars or above. For example, this system allows subscribers to pick "all 3-Star and above" and hear a huge universe of songs across all genres. However, this will include only the songs from small genres that have at least some large audience appeal. Table 3 above presents the general guidelines that are applied. These guidelines may be based on specific quantitative assumptions based on third party listening, sales, and download data.

A 0-Star rating simply means that the Rater listened to the song and does not believe it qualifies for further consideration. Any song with 1 or 2 stars or above is considered to be part of the "rated" music database and included in the 30,000 song Playlist Generator Database. So, as will be discussed in more detail below with respect to Table 3, on a cumulative basis, "1-Stars and above" includes 100% of the rated music for that artist, genre, or playlist combination. "3-Stars and above" includes 55% of all the rated songs; "4-Stars and above" includes the top 20%, and "5-Stars and above" includes the top 5%.

A 1 or 2-Star song can be found by selecting a genre-specific or artist-specific playlist, or by selecting the song itself. To conserve space, very few 2-Star genre playlists will appear among the set of pre-selected playlists (to be discussed below). However, when portable MP3 capacity exceeds 60 gigabytes, "2-Stars and above" playlists may become more common. Because well-known artists will often have lots of music at the 3-Star, 4-Star, or 5-Star levels, the 2-Star rating is used sparingly for these artists. Nevertheless, the preferred embodiment is the only song retrieval system in the world that hand selects the best songs by a particular artist. If a subscriber chooses Bob Dylan, he/she will see 109 songs from 13 different albums, not a listing of 31 albums and re-issues with hundreds and hundreds of irrelevant choices. This is a big convenience for consumers. The same applies to genres. In this regard, the subscribers expect playlists from PushButtonMusic to contain only highly recommended songs, and even a 1-Star song is considered to be among the top approximately 0.0048% of all the music available.

Preferably, 3-Star songs have a 50% chance of not getting skipped by a large audience. When a consumer selects 3-Star music of a particular mood/tempo, the consumer typically wants a lot of diversity (not just the hits) across all genres. However, that does not mean that the consumer wants to hear obscure small-genre music catering only to a very unique niche of listeners. 3-Star music must have popular appeal with significant crossover potential. This means that a 3-Star Jazz, Folk, Bluegrass, etc., song would therefore represent the highest rated music in that genre from a popular audience standpoint. A 4-Star or 5-Star Jazz song is therefore extremely rare.

The 4-Star and above rating represents the top 20% of the carefully selected list of 30,000 songs in the database, based on estimated audience reach. These songs should have a 75% chance of not being skipped by a large audience. Preferably, a rater guideline for the 4-Star rating is this: If the Raters want to fast forward before he/she hears the whole song, it is not 4-Stars.

A 5-Star rating is the top 5%. The rater guidance for this rating is this: To be 5-Star, the Rater will want to listen to the entire song twice in a row. The fact that multiple trained Raters normally agree on a song's assigned ratings is evidence these guidelines can be applied uniformly. This uniformity is important in creating the Playlist Generator database and song retrieval system.

Refinements to the Audience Reach embodiment described above may include listing a maximum Star rating for each of the 28 genres and/or micro ratings (e.g. 2.1, 2.2, and 2.3) for small audience material such as Jazz, with little or no crossover potential.

To help consumers better understand a Star Rating System based on Audience Reach instead of subjective quality evaluation, the preferred embodiments will use the following star description, which may change over time:
5-Stars: Solid Hits
4-Stars: Mass Audience Appeal
3-Stars: Discovery/Diversity
2-Stars: Artist Favorites
1-Star: Deep Playlist As well as biasing the Star-assigning process for the different genres as discussed above, the Star rating system should be normalized so that, for example, 95% of the songs are not assigned a 5-Star rating. Many music websites now feature long lists of the "Highest Rated Music", such that there are very few lower-rated songs. Such criteria are meaningless as a method to retrieve music. To ensure that the Playlist Generator Database™ will include what is believed to be the most popular music from 28 different genres, a strict forced curve is applied to the entire database based on the size of the audience it is believed would enjoy at least some exposure to the song. As a rule of thumb, a 3-Star song should appeal to 50% of all MP3 player owners; a 4-Star song should appeal to 75% of all MP3 player owners; and a 5-Star song should appeal to 95% of all MP3 player owners. To implement this rule, a strict forced curve is applied, as illustrated in FIG. 8. By using a forced Gaussian "Bell" curve, only the top 5% of the narrow universe of selected songs is allowed a 5-Star rating for audience reach (4-Star ratings add another 15%). This disciplined approach gives customers a highly effective way to separate the very best music based on its Internet and terrestrial airplay, download, file-sharing, and sales data. This is implemented by applying the curve to the songs already stored in the database with their "initial" star ratings from the Raters' inputs. Alternatively, the curve can be applied by each Rater to their own songs before their inputs are provided to the song database.

Figures 5, 6:
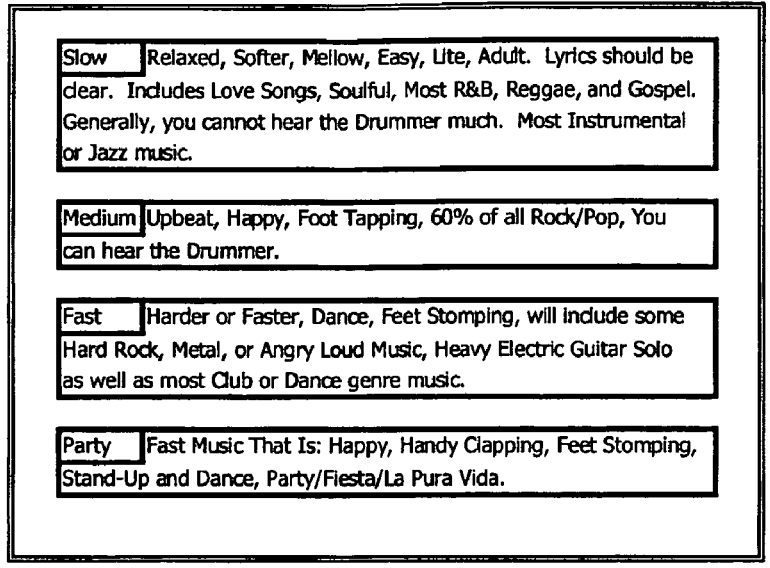
FIG. 5 is a diagram that illustrates a set of moods and tempos used in the stage of classifying songs in the method illustrated in FIG. 3.
FIG. 6 is a diagram that illustrates a set of genres used in the stage of classifying songs in the method illustrated in FIG. 3.

(ii) Mood/Tempos Referring to FIG. 5, the entire rated song database has also been categorized into four Mood Groups. The consumer can then select a playlist solely based on Mood Group, or choose one that combines a certain Mood Group with a star level as described above (i.e. "Medium-4 star"). As shown in FIG. 5, each of the four Mood Groups can be characterized by key words that help to determine what Mood Group is assigned to a song. In general, it is expected that approximately 30% of the songs are assigned to the "Slow (or Soft)" group, which will normally include slower tempo, relaxed, mellow, easy, lite, adult songs. Typically, the lyrics will be clear and drums will not be heard much. Songs in this mood will include love songs, soulful songs, most Rhythm & Blues songs, most instrumentals, and easy Jazz. Songs should be categorized in only one mood group (Slow, Medium, Fast (or "Hard") with a portion allowed to have the "Party" assignment as well. By requiring songs to be preferably classified in only one of four simple mood groups, this distinction is highly effective as a retrieval mechanism. Systems that allow dozens or even hundreds of moods or themes as a basis for retrieving songs are confusing and ineffective by comparison. Optionally, songs may be categorized in a second or even third tempo/mood.

Approximately 60% of the songs are assigned to the "Medium" group, which includes upbeat, happy, foot-tapping songs where the drummer is distinctly heard. Such songs include approximately 60% of all Pop and Rock songs. About 10% of the songs are assigned to the "Fast (or Hard)" group, which includes harder, foot-stomping dance music, such as Rock, Metal, Angry Loud Music, and Heavy Electric including Guitar solos. In most cases, if the Rater can hear the drummer or if the song has solo electric guitar riffs, it will be assigned to either the medium group or the fast group. About 30% of the songs are assigned to the slow (or soft) group.

Some of the songs will also be assigned to the "Party" group. This includes soft, medium, and hard songs that make people want to dance, get happy, and/or celebrate. This includes fast music that is Happy, Hand-Clapping, Foot-Stomping, Stand-up-and-dance music.

(iii) The Era classifications shown below are used to further define the music to be retrieved from the 28 genres (to be discussed below) such as Pop, Rock, or Country. For example, "Recent" Country and "Classic" Rock are two era classifications within large genres. The six eras preferably used for classification according to the preferred embodiments include the following:

Newly Released in the current calendar year (e.g., 2007);
Recent: Released or discovered in the previous three calendar years (e.g. 2004, 2005, 2006);
Modern: Released after 1983 (previous twenty years);
Classic: Released prior to 1983;
Oldies: Released prior to 1965; and
Archive: Released prior to 1950.

Exceptions to these guidelines may include newly discovered or pre-label artists that may be classified as "Recent" even though the material was actually first published a while ago. In these cases, "Recent" actually means "largely unknown." Many "recent" artists may have been touring and releasing demo-like albums long before they get a major label contract or are noticed by one of the Third Party data sources discussed above. In these cases "recent" means "newly recognized". Finally, in some cases, "Recent" will include bands enjoying new attention by a large audience. Consumer's willing to utilize the "active user" portion of the website can also choose a single year or make up their own collection of years (e.g. 1968 through 1972 only).

Re-Rating Recent Music. In the case of "Recent" or "New Released" material from new bands submitted by remote Contributors, the star rating may require some degree of guesswork. That is because they are too new to have reliable third party data (Filter #3) as described above. In other cases, a super pop hit may decline in audience reach very quickly from its release date. To address these problems, "Recent" songs are preferably re-rated once they have been in the system for three calendar years. Typically, a song with a recent star rating of 4-Stars or 5-Stars will then face much tougher competition in the "Modern" era. In addition, there will be significantly more factual data available for objectively determining the Audience Reach by that time.

The fifth Era "New Releases" preferably includes only songs released in the current calendar year. However, if Recent is selected, the New Release songs should automatically be included. Future embodiments may also include a Just Added classification so the subscriber can go straight to new releases in the last 30 days only. The Just Added list may also include older material that has just been added to the library.

(iv) Genre. Referring to FIG. 6, the classification system of Filter #4 provides a condensed list of 28 primary genres, which preferably include: Alternative/Punk; Bluegrass; Blues; Children; Christian; Christmas; Country; Dance; Electronica (includes Techno); Folk; Funny; Gospel; Instrumental; Jazz; Latin; Metal; Pop; R&B (includes Soul and Funk); Rap; Rap (Explicit); Reggae; Rock; Movie Scores; Swing; World. While FIG. 6 shows only 26 genres, other genres such as Party, Dirty, Rave (and others) may also be added periodically. Thus, genres may be added or subtracted as music tastes change. However, genres preferably will not include odd titles or micro-fads that most consumers care nothing about, or cannot understand instantly, such as "post-punk Screamo," "patio," "alternative," "latte," "love of the ages," "dance hall reggae," "indie," or "garage." For other examples, the LIVE365.com Internet radio site offers 285 "genres". However, it is presently believed that very small sub-genres are unnecessary, too limiting, and generally confusing to a passive listening audience.

Most music services today, such as Apple iTunes™ apply only what they (or the label) perceive to be the primary genre for a song or artist. In the preferred embodiments, on the other hand, individual songs are placed into as many genres as they apply. This insures that a top song will appear on several genre-specific lists as well as on the "all 4-Star songs" or "all fast songs" lists.

To classify a song in multiple genres, the Rater simply uses a slash in the genre field. For example: Latin/World/Dance/Pop. One important question to be answered by the Rater is: "Is it Rock or Pop?: Generally, songs should not be categorized as both Rock and Pop. This distinction is one of the toughest, and typically can be solved by asking whether or not the song is "hard enough" to be a rock song. Pop is a genre that covers a broad spectrum of music. Some songs from smaller Genres such as R&B, Blues, Bluegrass, World, or Rap have a high potential for popular appeal as well. These songs are therefore included in the Pop Genre playlist in addition to their "primary" Genre. For example, Nora Jones is usually Recent Jazz/Pop. This adds diversity to the most listened to Pop playlists that is not available from other broadcast sources. In some cases playlists are offered that combine similar types of genres. These include:
Pop/Rock
Country/Bluegrass/Folk
World/Reggae/Latin
R&B/Rap.

(5) Filter #5: Final Approval Process

The Final Approval Process of Filter #5 is intended to be a simple verification process performed by PushButton Music™ senior editorial staff. The purpose of this filter is largely to ensure that songs were uniformly classified when entered so that they are played on the correct lists. This final approval process has two steps. First, both the songs and predetermined playlists (to be discussed below) will eventually be evaluated by consumers on an ongoing focus group basis using Internet-based and other market research firms. This function is similar to the quantitative research now performed by traditional programmers. Songs that may be "burned out" or demonstrate low appeal will then be re-rated appropriately by the Senior rater staff. Secondly, a small staff of senior editors reviews the final changes and discusses possible exceptions. These individuals may add/delete songs, change stars, change genres, etc. This step may also include a Composite Scoring System identical to or similar to that described above. At the end of this filtering process, the song library contains a plurality of song files, one for each song. Each stored song file comprises data corresponding to the song, the artist, the album, the mood/tempo, the era, the genre (or genres), estimated audience reach, and the year of original release.

B. Updating the Database

After the Playlist Generator Database™ has been initially uploaded using the methods and apparatus described above, the song database will be periodically updated (daily, bi-weekly, weekly, bimonthly, or monthly) to keep the database fresh and provide consumers with new song choices. This updating process uses the Music Content Management System™ filters described above. According to the Recording Industry Association of America (RIM), 60,331 albums were released in 2005, of which 16,580 were in digital form only. When re-issues are removed, that comes to roughly 992 songs per day from the Filter #1 sources. By comparison, MySpace now hosts websites on 135,000 artists, and MusicNet lists 110,000. Therefore, the actual total number of songs created on a daily basis is much larger than 992 songs per day. Thus, an objective of the system of the present invention is to scout all of the song sources available for music that subscribers are likely to care about. In order to meet this objective, several hundred broadcasters and web-based music sources are preferably tracked on a daily basis.

As shown in FIG. 3, the updating process works exactly the same as the initial upload, only the song volumes will be smaller on a daily basis. That is, approximately 992 songs per day may be expected to emerge from Filter #1, while 125 songs per day may be expected to emerge from Filter #2. Filter #3 does not really reduce the database in a significant way for periodic updates. The updating process will likely produce approximately 65 songs per day from Filter #4. Filter #5 will likely not reduce the database in a significant way, leaving perhaps 65 songs per day added to the database. With the proposed star rating system, this translates into approximately thirty 3-Star and above songs being added to the database every day. Consumers will thus have the best of the new songs to download and enjoy on a daily basis.

4. Preselected Playlists

As will be described in more detail in Section 5 below, a notable feature according to the preferred embodiments is that consumers will preferably be offered a variety of predetermined "full-download" libraries from the Playlist Generator Database™ website, together with 600 or more predetermined playlists organized in accordance with various combinations of the selection criteria discussed above. As shown FIG. 14A, nine libraries will be offered for download to the consumer's PC. The consumer first selects an entire library to be downloaded to their PC and then selects a Device Library to be side loaded to the portable device. The songs in these libraries then populate the pre-determined playlists shown on the PC and portable device menu. The number of songs in each predetermined playlist or library will vary. The playlist menu is preferably standardized. In most cases, the nine libraries available to download to the consumer's PC will be much larger than the Device Library or libraries they chose to side load to their device. Each of the sided loaded device libraries will be configured with a predetermined number of songs based on portable device size, as depicted in FIG. 10. From these PC and Device Libraries, approximately 600 pre-programmed and recommended playlists are generated and offered, as shown, for example, in FIGS. 9A and 9B. As a result, a wide selection of playlists will be available from a portable device with limited storage capacity. Alternatively, the consumer is allowed to pick only certain playlists shown on the PC (instead of entire libraries) for side loading to the device. For example, a consumer with a 1 GB portable music player and desiring to side load a Jazz song library will select "channel" 230 for side load to his/her portable player. This gives the consumer 121 pre-programmed Jazz songs to listen to from the portable device depending on the size and type of library chosen. By revisiting the website, the consumer can change the PC Library they downloaded originally or change which playlists or artists to side load to their portable device. For listeners, this creates a live broadcast-like listening experience from a huge personal collection of songs stored on a portable device, and those songs can be easily changed. And, due to the "fully-interactive" license with content owners, consumers have the ability to skip songs as they do when listening to their personal CD or MP3 file collection. This song-skipping capability in turn allows the consumer to avoid searching for music by changing stations to find a different song. In addition, in the further embodiment, consumers may be able to download and purchase songs they like, on demand, and have them stored on a personal music player.

Much like what cable TV providers did to television, the Satellite content aggregators (i.e. XM/Sirius) have already introduced the concept of numbered channels or stations to the public. Consumers remember channel numbers better than they do the confusing and vague titles used by XM/Sirius. For that reason, the menu of numbered playlists according to the preferred embodiment is designed to find exactly what the consumer chooses by Audience Reach, Mood/Tempo, Era, and Genre. Vague stylistic titles for playlists such as "Latte," Adult Patio Party," are not used. Luckily almost all recent MP3 players, including the iPod™, allow the listener to scroll through a numbered playlist menu quite easily.

FIGS. 13H-I show 480 pre-selected station playlist selections which may be on the PushButtonMusic PC and portable device menu. Note that the song counts shown will increase as the categorization process proceeds. While 480 predetermined playlists are presently preferred, any convenient number may be adopted. For present market conditions, it is believed that at least 100 (more preferably, 150, even more preferably 200, even more preferably, 250, even more preferably 300, even more preferably, 350, even more preferably 400, even more preferably, 450) predetermined playlists will be adopted. Of course, the number of predetermined playlists, in the future, may grow above 480.

Combined Genres: A few pre-selected station playlists are also available which combine one or more of the primary Genres described above. For example, a customer who just wants the most Recent Rock and Recent Pop music of 4-Star quality would choose Station 0417 "R-Pop/R-Rock-4," which stands for "Recent Rock" and "Recent Pop" at 4-Star or above. To help consumers better understand these station titles, subscribers may receive a hard-copy menu as well.

The Master Artist List (MAL): The MAL is a file maintained by PushButtonMusic staff to insure that every artist is assigned to a particular Rater. Normally, those assignments are made based on genre expertise. This is because the rating of songs goes much faster (and with less errors) for artist and genres the Rater is familiar with.

The Work Assignment Sheet (WAS): Every few weeks the Rater receives a list of unrated songs on a Work Assignment Sheet as shown in FIG. 9C. This list will be identical to the playlist found on the MP3 player that accompanies it. All five criteria are reviewed and entered onto the WAS, as shown. Note that the genre shown on the WAS is what the record label companies and service providers such as iTunes™ or MusicNet™ use. PushButton Music genres will be chosen from the list in FIG. 6.

Playlist Rotation for Small Capacity Devices. Most consumers will enjoy a library on their PC that is much larger than their portable phone or MP3 player allows. In addition, consumers with large capacity devices such as 60 GB or 80 GB MP3 players can load very large libraries of songs (i.e. 14,000, 20,000) all at once. This means that nearly all of the 480 pre-selected playlists according to the preferred embodiments will have lots of songs to choose from. More importantly, the preferred embodiments can offer an extensive Artist Favorites list on the roughly 20,000 artists in the song database. The preferred Playlist Rotation™ system delivers a similar listening experience on a much smaller portable device. Fortunately, there is only so much music a person can listen to in a day. With that in mind, according to this alternative, all 480 pre-selected playlists are broken into small subsets of songs that change on a daily basis. For example, the "3-Star and above" Class Rock playlist that appears on the "Day 1" Library subset may have only 20 (or any number such as 40, 60, 80, or 100) songs versus the 528 songs available on the 19,000 song library. However, the "Day 2" list has 20 different songs. The size of the daily subset for a particular playlist is determined by which library option was chosen for the portable device (see the below description). In this manner, the consumer is exposed to the entire 528 song collection over time. Frankly, it's just as if a listener was "shuffling" through the entire collection all at once. But, in reality they are only pulling from the subset of 20 songs available on any given day. To implement Playlist Rotation™ system, the entire library chosen for the smaller devices is entirely changed every night. Fortunately, the "sync" functions of many media players allow this. And, a small library does not take long to replace either on the PC or the device. The different songs are selected by PushButtonMusic staff or automatically by computer. The selection may be random, semi-random, or organized by any of the selection criteria discussed above.

Consumers May Customize the PushButtonMusic Playlists To Their Own Taste: The newest generation of media player/device systems can track when a listener skips a song or even wants it omitted from their PC or portable device library altogether. These media player/device systems also allow a listener to flag a song to be included in their own favorites list. This "on-the-go" editing function allows each PushButtonMusic subscriber to customize any one of a number of the standardized libraries or pre-selected playlists. For example, when the user skips over (or deletes) a song on his/her portable music player, the next time the player is coupled to the PC, the PushButtonMusic player will detect the skipped (or deleted) song(s), and permanently delete that song from the playlist resident on the PC. Of course, the user may be given a software prompt to confirm/deny the deletion(s). In a sense, PushButtonMusic is providing consumers with 480 pre-selected playlists of recommended songs for them to use to develop their own playlists. In operation, consumers will heavily edit at least their top 10 favorite lists. The result is that these subscribers will be very unlikely to change services.

The preferred menu of predetermined (and numbered) playlists depicted in FIGS. 9A and 9B is designed to find exactly what the consumer wants, based on a combination of estimated Audience Reach, Mood/Tempos, Era, and Genre. This eliminates the confusion and mystery regarding what a playlist contains that is created by current theme titles such as, for example, "Latte Music," or "Love Songs of the 80's," or "Best of the 90's," etc. The system allows the consumer to enjoy unprecedented diversity and discovery. For example, a consumer could select "all 3-Star and above" songs and hear a huge universe of songs across all Genres, Eras, and artists in a single playlist of, in this example, 5,209 songs. Thus, the consumer can download the maximum number of songs for their individual device, and then select certain "slices" of those stored songs, based on predetermined playlists. This allows the consumer to generate a practically limitless number of playlists from the songs resident on his/her PC and/or portable music player.

A few pre-selected playlists are also available which combine one or more of the era and primary genres described above. For example, a consumer who just wants the most Recent Rock and Recent Pop music of 4-star quality could choose Channel 0417 "R-Pop/R-Rock-4" (See FIG. 9B), which stands for "Recent Rock" and "Recent Pop" at 4 stars or above.

As one example, of the Device Libraries discussed earlier, referring to FIG. 7, all 510 songs in the predetermined Device Library for a 2 GB device for a passive listener (see FIG. 10) are rated 5 stars. This represents the top 5% of the top 0.048% (19,000/4,000,000) of the universe available. Even with this tiny library, 18 of 28 genres are represented, and the diversification with respect to era and mood/tempo is quite wide. Furthermore, without using artist name or Audience Reach rating, this 510 song database still theoretically allows 58.9 million playlist combinations. By allowing only one primary genre to be used for each list, 4,590 playlist combinations are possible.

Referring again to FIGS. 9A and 9B, to further illustrate the diversity and convenience of the predetermined playlists, a menu of the 480 most popular playlists that would automatically appear on the consumer's PC and/or portable MP3 player along with song count for each playlist. The ability to display this many playlist choices in a coherent fashion from the menu of the portable device is a notable benefit of the method of the preferred embodiment.

The preferred embodiments may be modified to also recommend individual songs or entire playlists that will "match" the users indicated song preferences or listening habits. One existing method, for example, is to share playlist information with a "friend" or published source that has stated at least a few shared preferences in their own playlists or song libraries. Other methods are related to the "Music Genome Project" whereby songs are carefully dissected for their composition traits as a basis of finding similar songs. These "preference matching" schemes suffer from many problems. First, is the fact that they attempt to filter and select song candidates from a song universe with millions of potential candidates. The result is that lots of irrelevant or just plain bad music is "discovered." Second, they rely upon the consumers past music collections that typically represent an extremely narrow sub-section of the variety now available. And, third, the recommended songs are not individually classified in a uniform manner greatly reducing the playlist options available to retrieve the songs. The Playlist Recommender System™ (according to a modification of the preferred embodiments described below) presents an entirely new approach to recommending entire playlists that addresses these problems, and may utilize the above-described known methods in combination with the embodiments according to the present invention described herein.

The Playlist Generator™ database described above "recommends" entire libraries of rigorously filtered and rated songs that collectively represent less than 0.075% (30,000/4,000,000) of the available song universe. From this database, passive users may simply select a pre-programmed playlist and active users can make-up their own. For passive listeners, this still requires a fair amount of trial and error with the currently preferred 480 playlist menu (which may eventually reach 1,000 predetermined playlists). To assist this process, the subscribers may benefit from the Playlist Recommender System™.

This Playlist Recommender System™ relies upon the highly selected Playlist Generator™ Database and generally works as follows: The songs played by the subscriber either on his/her PC or portable device are already tracked by the music licensing platform (e.g., MusicNet) in order to properly compensate the right content owners. In one embodiment, the subscriber can ask the system (via the music provider server website/media player) to identify which of the preferred libraries and specific playlists most corresponds to his/her recent choices. Multiple playlists are then displayed and ranked for match. Skipped songs will not be included in the users "target sample." The user can also decide how many days back they want to include in this "target sample." Such a system can even identify what level of audience reach or popularity (star system) the consumer prefers within a highly specific set of songs. For example, 2-Star/Classic Country/Slow versus 3-Star/All Country/Medium.

In another embodiment, the user scrolls through the entire database which has been downloaded to his/her PC and indicates what songs he/she wants in the target sample. Songs can also be added to this target sample or "favorites" playlist at any time by simply indicating that the song is to be saved from the portable device (iTunes/iPod already has this feature).

In yet another embodiment, the user can create the target sample by simply downloading his/her existing song library, in its entirety, into the PushButtonMusic media player on their PC. (By automatically merging their current library they can also enjoy both the PushButtonMusic service and their current library on the same media player.) This will allow the Playlist Recommender System™ to rank the PushButtonMusic playlists by their match to the person's pre-existing library. Because that user's library will contain unknown or unrated songs not in the PushButtonMusic database, they will not be merged into the Playlist Generator™ database itself. Rather, they will be kept separately on the media player. This system, in all three embodiments described above, allows users to receive specific playlist recommendations based on past preferences or recent listening habits, when they choose to do so.

Subscribers can customize their PushButtonMusic playlists in a number of ways. For example, the subscriber can hit the skip button twice in a row to delete a song from one of the pre-programmed playlists. Over time, their favorite playlists will become more and more customized. They can also create their own favorites list on-the-go, as described above.

Currently, digital music service (e.g. iTunes™) do not include the original release date of the songs included in a compilation, only the album compilation of release. As a result, the metadata displayed on portable music players rarely includes any information regarding date of release. Only song title, album, and artist name are displayed. The PushButtonMusic database, on the other hand, preferably includes the original release of every song, even if it is part of a compilation (about 40% of songs) on the portable device. To display it on the portable device of a PushButtonMusic subscriber, the downloaded digital song files will include original song release date data. This will cause the portable device of a PushButtonMusic subscriber to display the song's release year, preferably in front of the abbreviated album name.

While the album name may be displayed in an abbreviated way on the subscribers device, preferably it will appear in full on the artist look-up section of the device menu and on the subscriber's PC. And, in most cases even an abbreviated title is plenty to identify the album. However, subscribers who do not like this feature can remove it.

The preferred embodiments offer an easy and attractive method for displaying the contents of a particular library or playlist on the PushButtonMusic website/media player. To accomplish that, the PushButtonMusic website/media player preferably will display tiny album covers for all the album/artists included in a library or playlist.

5. Consumer Access to the Playlist Generator Database™

The below is a detailed description of how the consumer accesses the Playlist Generator Database™ through their PC (or portable music player) according to the preferred embodiments. This is the process by which the consumer selects, downloads, and side loads song libraries and predetermined playlists to their PCs and portable music players For ease of use, PushButtonMusic has developed nine pre-programmed song libraries for loading to the subscriber's PC. These range in size from 30,000 songs to 12,000. Smaller libraries for the PC may be added. Fortunately, since a subscription model is used, the user avoids purchasing the songs individually. And, should a subscription temporarily lapse, PushButtonMusic maintains the user's file on their server 2 for 12 months. This is to address concerns that music the consumer does not actually own will suddenly disappear if the consumer misses a subscription payment or changes devices, etc. For an additional fee, the consumer may purchase the song(s) outright, and the purchased song files may be exported to a number of other platforms.

Each of these nine PC-libraries comes with 480 (or more preferably, 600) of the most popular playlist choices installed on a numbered menu similar to cable TV channels. Meanwhile, the subscriber's "Favorite" playlists appear at the top of the menu, and additional playlists can be added at any time. This entire collection of pre-programmed playlists is updated on a daily basis.

To initially install the chosen PC-library, the subscriber will have a number of options. First, they may receive one or more DVDs including music released from 1925 to 2003. These DVDs of the libraries may be packaged and sold at stores or other convenient outlets. More recent material as well as daily updates of the entire library are then preferably downloaded over the Internet. Secondly, these libraries may be pre-loaded onto the device by the device manufacturer or the retail location from which the device was purchased. Thirdly, for consumers with faster Internet portals, the initial song libraries may be downloaded in their entirety. For Internet download (which may take many hours for the entire 30,000 song database), the user may schedule the download in plural sections at regularly scheduled times, such as every night between 1 and 3 AM, or every Saturday night from 2-6 AM, etc. After the download of their chosen PC Library, for a fixed price per month, subscribers can: 1) listen to any of the 480 (or more preferably, 600) recommended playlists from their PC or home stereo, 2) customize these playlist to their own liking as they listen to them, 3) download rented songs to a favorite's playlist as they hear them, and 4) add their own playlists constructed on the PushButtonMusic Playlist Generator™ using the criteria described above.

Once the PC-library is installed, the subscriber will be asked to identify his/her portable MP3 player. Under most current licenses, three different devices can be loaded for the same subscriber (e.g. phone, PDA, MP3 player). It is estimated that roughly 60 such devices are now compatible with Microsoft's Plays-For-Sure DRM system. This allows subscription music to be side loaded to a portable device. These devices can be anything from a mobile phone with a 200 song capacity to an 100 gigabyte portable hard-drive allowing for 22,000 songs. The user will then be asked what size of library they wish to side load, leaving plenty of room for their other media files. The subscriber can then choose from dozens of libraries designed for their size of device and side-load them with the click of a single button. Each library will contain up to 480 (or more preferably, 600) recommended playlists which are numbered and will appear under the playlist menu on their portable MP3 device. For a fixed fee per month, the device will be updated on a daily basis by simply hooking the device to the PC to charge. This will allow them to enjoy PushButtonMusic playlists and songs from the car, the gym, or anywhere.

Downloading a very large song library (e.g. 80 gigabytes) to a subscriber's PC can take several days, even at DSL speed. As compressions and bandwidth utilization schemes (e.g. Bit Torrent) continue to improve, this will be less and less of a problem. In the meantime, subscribers will be offered a variety of options to install their chosen PC library over the Internet. For example, in all cases, the subscriber may be able to receive the highest rated 500 songs immediately so they can begin enjoying the playlists immediately.

i. As stated above, they can purchase an MP3 player that has been pre-loaded by the manufacturer with everything but the most recent material, and upload it to their PC. Similarly, they can buy an empty device and have the retailer load it for them at the store. Or, they can order the device online loaded to their specifications and have it shipped to them.

ii. They can use a package of one or more DVDs (sold at the store or mailed separately) containing their chosen PC library and install it themselves. With any of these options, more recent material and daily database updates will be sent over the internet.

iii. Once the subscriber has chosen what library they wish to download on the website/media player and their internet access speed or method, they will be given an estimate of the download time available. They will then be given a number of choices in terms of when the downloading will occur. For example:

My PC is available from 1:00 A.M. to 5:00 A.M. only.
My PC is available from 8:00 P.M. to 8:00 A.M.
Anytime I am not using it.
Continuous download, starting now.

Figure 11:
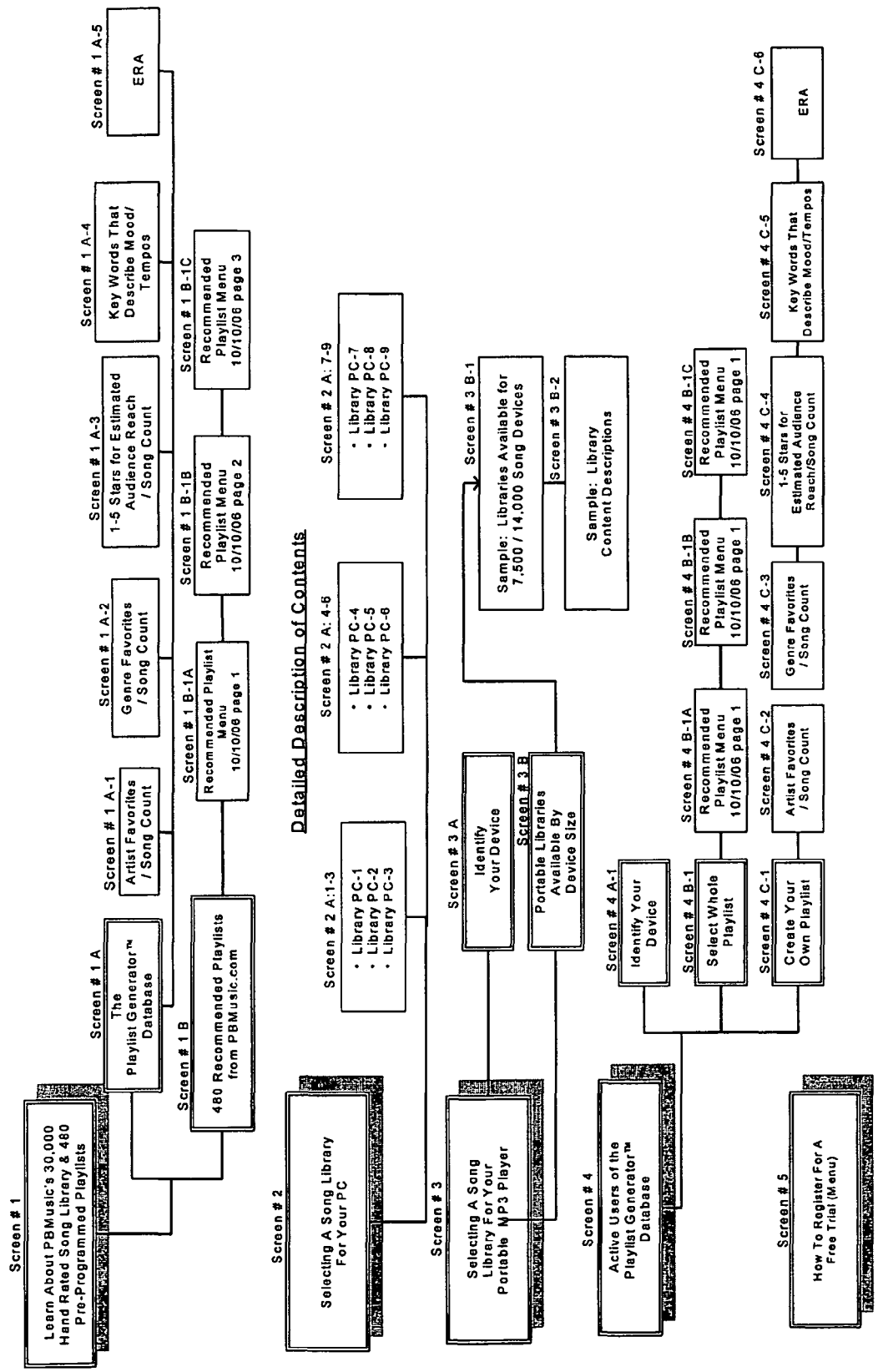
FIG. 11 is a screen shot of the PushButtonMusic™ website table of contents.
Figure 12B:
FIG. 12B illustrates the screen the consumer sees when he/she selects the first option in the FIG. 12A screen.

FIG. 11 shows the organization of website screen shots according to the preferred embodiments, while FIG. 12A depicts the preferred opening screen. The consumer begins by accessing the Playlist Generator Database™ website through their PC or portable music player (e.g., music-enabled cell phone, etc.). In FIG. 12A, the user can choose any one of Screens #1-5: Screen #1—Learn About PushButtonMusic's 30,000 Hand Rated Song Library & 480 Pre-Programmed Playlists (see FIGS. 12B and 13A-13I); Screen #2—Selecting A Song Library For Your PC (see FIGS. 14A-14J); Screen #3—Selecting A Song Library For Your Portable MP3 Player (see FIGS. 15A-15E); Screen #4—Active Users of the Playlist Generator™ Database (see FIGS. 16A-16L); or Screen #5—How to Register For A Free Trial (Menu) (see FIG. 17).

Figure 13A:
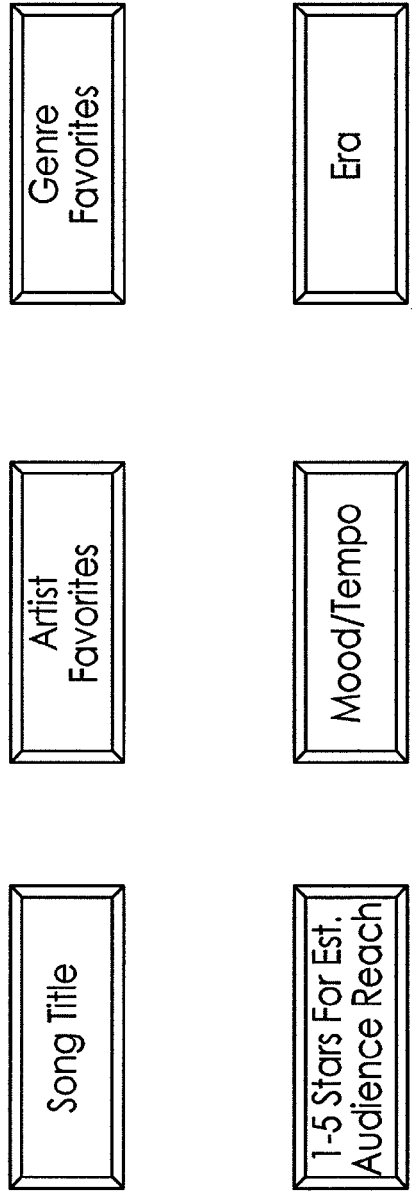

In FIG. 13A, Screen #1A, the user can choose one playlist selection criteria: Song Title; Artist Favorites; Genre Favorites; 1-5 Stars for Estimated Audience Reach; Mood/Tempo; and ERA (and/or original release date). For example, in FIG. 13B, Screen #1A-1, the user may choose Artist Favorites. Note that, for exemplary purposes only, FIG. 13B depicts only one of fifty-one pages of artists. The number of songs for each Artist will be depicted where the ### symbol is in all of the Figures.

In FIG. 13C, Screen #1A-2, the user may choose Genre Favorites, such as the Primary Genres: Alternative/Punk, Bluegrass, Blues, Country, Dance, Dirty, Electronica (inc. Techno), Folk, Funny, Gospel, Jazz, Latin, Metallica, Oldies, Pop, R&B (inc. Soul), Rap (inc. Hip Hop), Explicit Rap, Reggae, Rock, Swing, World, Christmas; or the Combined Genres: Rock/Pop, Country/Bluegrass/Folk (C/B/F), World/Reggae/Latin (W/R/L), R&B/Rap. One song may be classified in several different genres. This approach allows additional song combinations (or playlists) without taking up additional space on the MP3 device.

In FIG. 13D, Screen #1A-3, the user may choose 1-5 Stars for the desired Estimated Audience Reach, as described in greater detail above. Briefly:

5-Stars: Solid Hits
4-Stars: Mass Audience Appeal
3-Stars: Discovery/Diversity
2-Stars: Artist Favorites
1-Star: Deep Playlist Choosing a given star rating preferably means all songs at the rating or higher. Super songs in a small audience genre may receive only 2-Stars or 3-Stars due to their limited audience reach. For the best songs in a small audience genre, the consumer will pick 1-Star and above.

In FIG. 13E, Screen #1A-4, the user may choose one or more Mood/Tempos, as described in greater detail above. Briefly:

Soft: Slower Tempo, Relaxed, Softer, Mellow, Easy, Lite, Adult. Lyrics should be clear. Includes Love Songs, Soulful, Most R&B, Reggae, and Gospel. Generally, you cannot hear the Drummer much. Most Instrumental or Jazz music.

Medium: Upbeat, Happy, Foot Tapping, 60% of all Rock/Pop, You can hear the Drummer.

Hard: Fast Tempo, Harder, Dance Feet Stomping, will include some Hard Rock, Metal or Angry Loud Music, Heavy Electric Guitar Solo.

Party: This includes: soft, medium, and hard songs that make people want to dance, get happy, and/or celebrate. This includes fast tempo music that is Happy, Hand-Clapping, Foot-Stomping, Stand-up-and-dance music.

Figure 13F:
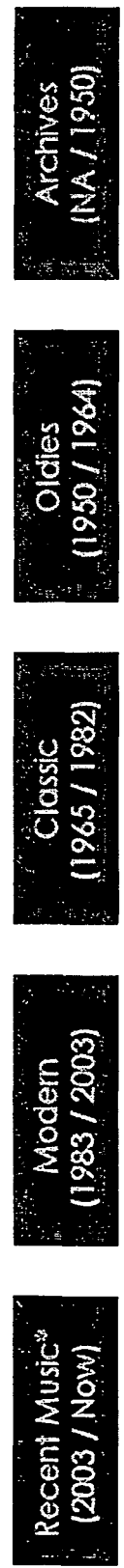
Figure 13I:
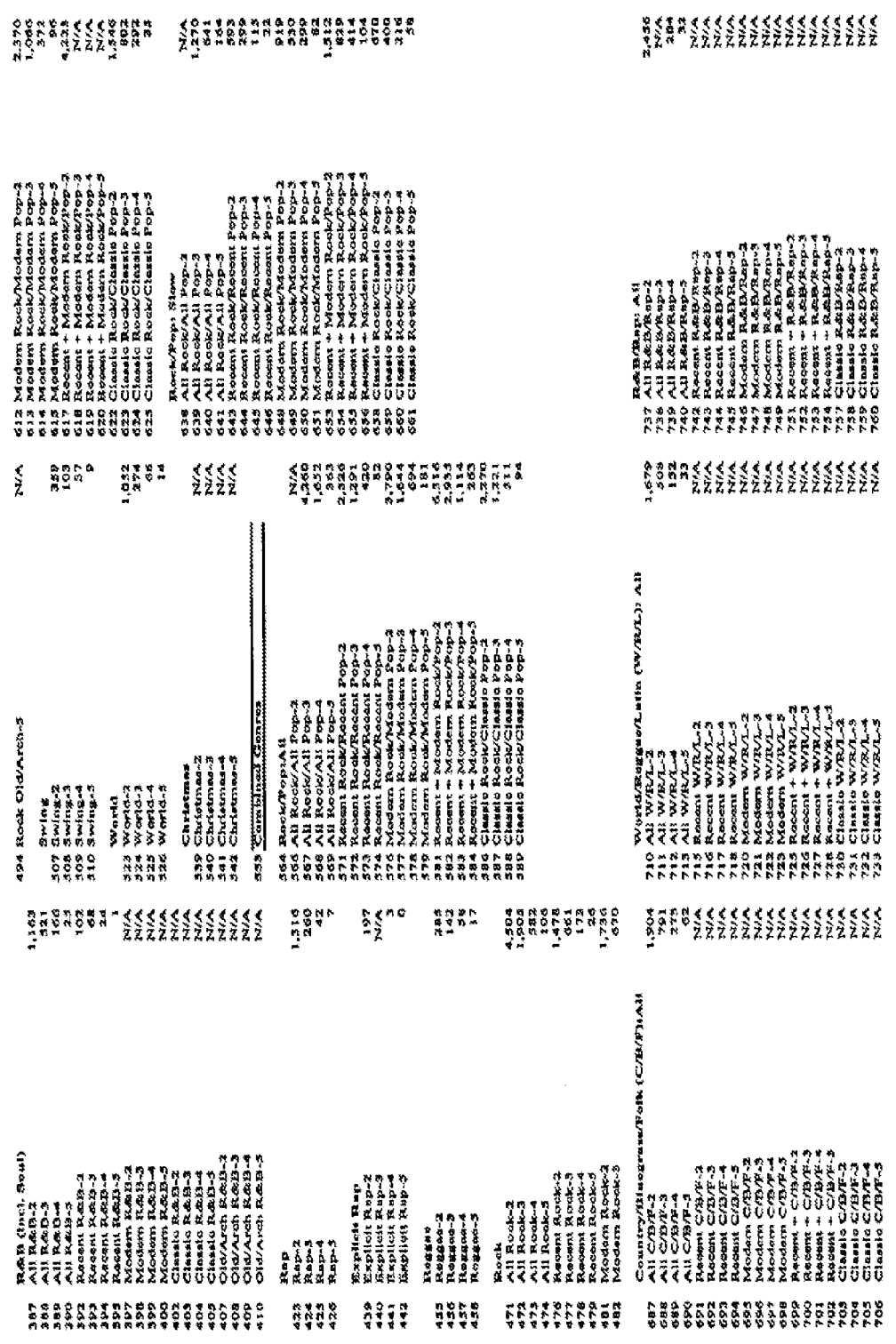

In FIG. 13F, Screen #1A-5, the user may choose the Era or the original release date itself, as described in greater detail above. Briefly:

Newly Released (in the current calendar year [e.g. 2007]);
Recent: Released or discovered in the previous three calendar years (e.g. 2004, 2005, 2006);
Modern: Released after 1983 (previous twenty years);
Classic: Released prior to 1983;
Oldies: Released prior to 1965; and
Archive: Released prior to 1950.

Or they can choose a precise year and hear music released only in that year or combination of years across all 28 genres and approximately 20,000 artists.

As noted earlier, the consumer is offered a Full-Download Portable Service™, in which two or three clicks may be used to download and/or side load a predetermined library of the highest rated songs in the song database, depending on the memory capacity of the consumer's portable music player. In FIG. 13G, Screen #1B, the user may observe the 480 predetermined and recommended "full download" playlists from PushButtonMusic.com, as was described in greater detail above. Subscribers that choose to do so can visit the Active Listener area of the website discussed below and use the five criteria above to generate over 1.8 billion different song combinations (playlists). However, for ease of use, PushButton-Music has pre-selected 480 of the most popular playlists. These will appear in numerical order on the subscribers PC and/or portable device (see Playlist Menu, Screen #1 B-1 and #1 B-2, FIGS. 13 H-I). To avoid scrolling through the entire playlist menu, subscribers may enter their top 10 playlist choices at the top of the menu list, as shown in FIG. 13H. This may also include playlists recommended by the Playlist Recommender system described above. FIG. 13G depicts how many of these 480 playlist options appear in each of the search criteria described above. Note that Artist-specific playlists may be too numerous to include on the playlist menu. For those, the user may use the "artist" button on their portable device menu. Next to each category of playlists shown is the number of 1-Star and above songs and the number of artists that appear in each playlist.

In FIG. 13H, Screen #1B-1A, the user may choose from among the currently most-preferred Recommended Playlist Menu shown. The "channel" numbers, the predetermined playlist descriptions, and the song counts are preferably shown to the consumer. These playlists choices will appear on the subscribers PC and/or portable device. These predetermined playlists may also be provided in a separate hard-copy brochure for subscribers.

In FIG. 14A, Screen #2, the user may choose Selecting A Song Library For Your PC. Subscribers can choose from one of the nine libraries shown to download from the website to their PC and/or to their portable device. The consumer is also offered the SemiFull-Download Portable Service™, in which multiple clicks may be used to eliminate from the 14,000 to 30,000 song Full-Download library certain categories of songs the consumer is not interested in downloading. As discussed above, music from the Modern, Classic, Oldies, and Archive eras may also be provided to the subscriber on a preloaded device, a DVD, or any other convenient medium. Preferably, this will mean that only the Recent Era music will be automatically downloaded via the internet to the subscriber's PC upon connection. Updates to the chosen library, including newly released material and changes to the classification and rating of particular songs, will be made on a daily, weekly, or monthly basis. The estimated download time to install the recent songs and update the chosen library is indicated, assuming DSL speed. The lists includes Library Number (PC-1 through PC-9), Library Title, Description, Song Count, Artist Count, Total PC Storage Required, Size of DVD Install, Size (e.g., speed) of Internet Install. The number and types of libraries will evolve over time. Preferably, the consumer can choose from among:

Library # PC-1: All 2-Star and Above Songs, which include all songs with a 2-Star rating or above rating.

Library # PC-2: All 3-Star and Above Songs, which include all songs with a 3-Star rating or above rating.

Library # PC-3: All 4-Star and Above Songs, which include all songs with a 4-Star rating or above rating.

Library # PC-4: Recommended Full Download (RFD), removes 2-Star songs by Artist in High Audience Genres such as Rock, Pop, Country, and Rap.

Library # PC-5: RFD Without: Rock/Pop/Dance/Electronica/Misc, this includes no Rock or Pop songs or miscellaneous genres. All other 2-Star songs are included.

Library # PC-6: RFD Without: Country/Bluegrass/Folk/Misc, this includes no Country, Bluegrass, or Folk songs or miscellaneous genres. All other 2-Star songs are included.

Library # PC-7: RFD Without: World/Reggae/Latin/Misc, this includes no World, Reggae, Latin, or miscellaneous genres. All other 2-Star songs are included.

Library # PC-8: RFD Without: R&B/Rap/Explicit Rap/Misc, this includes no R&B, Rap, Explicit Rap, or miscellaneous genres. All other 2-Star songs are included.

Library # PC-9: RFD Without: Jazz/Swing/Oldies/Archive/Misc, this includes no Jazz, Swing, Oldies, Archive, or miscellaneous genres. All other 2-Star songs are included. Miscellaneous genres include Dirty, Funny, or Christmas.

FIG. 14B, Screen #2A-1, depicts the contents of Library #PC-1, ALL 2-Star and Above Songs. FIG. 14C, Screen #2A-2, depicts the contents of Library #PC-2, ALL 3-Star and Above Songs. FIG. 14D, Screen #2A-3, depicts the contents of Library #PC-3, ALL 4-Star and Above Songs. FIG. 14E, Screen #2A-4, depicts the contents of Library #PC-4, Recommended Full Download (RFD). FIG. 14F, Screen #2A-5, depicts the contents of Library #PC-5, RFD Without: Rock/Pop/Dance/Electronica/Misc. FIG. 14G, Screen #2A-6, depicts the contents of Library #PC-6, RFD Without: Country/Bluegrass/Folk/Misc. FIG. 14H, Screen #2A-7, depicts the contents of Library #PC-7, RFD Without: World/Reggae/Latin/Misc. FIG. 14I, Screen #2A-8, depicts the contents of Library #PC-8, RFD Without: R&B/Rap/Explicit Rap/Misc. And FIG. 14J, Screen #2A-9, depicts the contents of Library #PC-9, RFD Without: Jazz/Swing/Oldies/Archive/Misc.

In FIG. 15A, Screen #3, the user may choose to side load (or download directly from the website) the selected songs/libraries/playlists to the portable music player in Selecting A Song Library For Your Portable MP3 Player. In more detail, once the selected library is loaded to (preferably) the Push-Button Music Media Player™ on the subscribers PC, they can begin the process of side loading their portable MP3 player. This is a two step process. In the first step, the user must decide how much of their device capacity they wish to load with pre-programmed music from PushButtonMusic™. In the second step, subscribers can choose between three levels of involvement in selecting music for their MP3 players. 1) "Passive" users can simply select the Recommended Full-Download for their device size. 2) "Semi-Active" users can use the SemiFull-Download Portable Service™ to browse among a variety of libraries designed for their device size similar to the way they selected their PC Library. 3) "Active" users can use the MyChoice Portable Service™ to select songs/playlists using any combination of the five selection criteria discussed above to generate a series of totally unique playlists. Whatever combination of playlists or entire libraries chosen by the user, those choices may be updated on a daily, weekly, or monthly basis. In Screen # 3A, the user selects Identify Your Device; and in Screen # 3B, the user can select Portable Device Libraries Available By Device Size.

In FIG. 15B, Screen #3A, the user may Identify Your Device from a list of Windows Plays-For-Sure compatible devices. Devices utilizing other subscription based services and software such as Napster-To-Go, RealNetworks, and the new Zune Music Marketplace Service from Microsoft may be available options as well. The user may select MP3 Enabled Mobile Phones, PDA's, and then choose among: 1 GB, 250 Songs, 2 GB, 500 Songs, identifying the particular device by name. The user may also select MP3: Flash Memory, and then choose among: 1 GB, 250 Songs, 2 GB, 500 Songs, 5 GB, 1,250 Songs, 10 GB 2,500 Songs. Finally, the user may select MP3: Hard-Drive, and then choose among 10 GB 2,500 Songs, 20 GB, 5,000 Songs, 30 GB, 7,500 Songs, 60 GB, 14,000 Songs, 80 GB, 19,000 Songs, and 100 GB 25,000 Songs. The user is asked to identify his/her device and indicate the amount of song capacity they wish to load with pre-programmed music (song number).

In FIG. 15C, Screen #3B, the user may choose Portable Libraries Available By Device Size. The user chooses one device size to view library options, as shown. Creating a large number of playlists from a very small library will result in just a few songs per playlist.

In FIG. 15D, Screen #3B-1, a sample of a recommended Full Download Library Available for 7,500/14,000 Song Device is shown. The lists include Library Number, Library Title, Description, Song Count, Artist Count, Total PC Storage Required, Size of DVD Install, Size of Internet Install. Recommended Full Download For Passive Users: Library # PC-4: Recommended Full Download (RFD), includes all songs with a 2-Star rating or above rating. Selection of Full Downloads for Semi-Active Users: Library # PC-2: All 3-Star and Above Songs, which include all songs with a 3-Star rating or above rating. Library # PC-3: All 4-Star and Above Songs, which include all songs with a 4-Star rating or above rating. Library # PC-5: RFD Without: Rock/Pop/Dance/Electronica/Misc, this includes no Rock or Pop songs or miscellaneous genres. All other 2-Star songs are included. Library # PC-6: RFD Without: Country/Bluegrass/Folk/Misc, this includes no Country, Bluegrass, or Folk songs or miscellaneous genres. All other 2-Star songs are included. Library # PC-7: RFD Without: World/Reggae/Latin/Misc, this includes no World, Reggae, Latin, or miscellaneous genres. All other 2-Star songs are included. Library # PC-8: RFD Without: R&B/Rap/Explicit Rap/Misc, this includes no R&B, Rap, Explicit Rap or miscellaneous genres. All other 2-Star songs are included. Library # PC-9: RFD Without: Jazz/Swing/Oldies/Archive/Misc, this includes no Jazz, Swing, Oldies, Archive, or miscellaneous genres. All other 2-Star songs are included.

In FIG. 15E, Screen #3B-2, whether the user selects a library from the Full-Download Portable Service™ or the SemiFull-Download Portable Service™, or constructs their own on the MyChoice Portable Service™, the contents of their portable library will be displayed. In this way, users can click on a library choice and see what it contains. For example, this Figure shows the metrics for Library PC-4: 14,000 Songs.

FIG. 16A, Screen #4, shows the opening screen for the Active Users using the MyChoice Portable Service™ of the Playlist Generator™ Database. The screen shot shows that the PushButtonMusic™ Playlist Generator™ Creates a New Tool For Active Listeners To Develop Millions of Playlists Options. For ease of use, several different methods are provided for "Active Listeners" to create a library of songs to side load to their portable device. Regardless of the method a Music Fuel Gauge preferably appears at the top of the screen indicating the song count in the chosen library and the room left on the device. In Screen 4 A-1, the user is asked to Identify Your Device; in Screen 4 A-2, the user is asked to Select Whole Playlists; and in Screen 4 A-3, the user is given the option to Create Your Own Playlists.

In FIG. 16B, Screen #4A-1, the user is asked to Identify Your Device from a list of Windows Media Player/Plays-For-Sure compatible devices, as described above in connection with FIG. 15B.

In FIG. 16C, Screen #4B-1, the user may choose Select Whole Playlists. The Music Fuel Gauge will give the user the Current Song Count and Indicated Song Capacity. The gauge will show: E, 25%, 50%, 75% and F. To utilize this method, the user simply clicks to the next screen to find the Recommended Playlist Menu. By clicking on the playlist number desired, that list will automatically be dropped into the library. Duplications across the playlists will be automatically eliminated and then the music fuel gauge will be adjusted appropriately.

In FIGS. 16D-F, Screen #4B-1A, the user may choose the Recommended Playlist Menu, as detailed above with respect to FIGS. 13H-J. These screens display the numbered playlists that will appear on the subscribers PC and/or portable device.

In FIG. 16G, Screen #4C-1, the user may choose Create Your Own Playlist. The Music Fuel Gauge will give the user the Current Song Count and Indicated Song Capacity. The gauge will show: E, 25%, 50%, 75% and F. If the user hits full, the site will give the user the option to make global reductions. For example, to construct or reduce their customized library, the user may select individual artist and/or primary genres from the directories found on the next two screens. After selecting an "Artist" or "Genre" name in the indicated space, the user indicates which Star Rating, Mood/Tempo, or ERA to be included for each Artist or Genre selection. (Note: The user should check the box for each group of star ratings desired. For example, if the user wants 2-Star songs and above, he/she must check 2-Stars only, 3-Stars only, 4-Stars only, and 5-Stars only.) Once the user has completed a particular artist or genre selection, he/she clicks continue and starts over. When the Music Fuel Gauge gets full the continue button will stop working.

In FIG. 16H, Screen #4C-2, the user may choose Artist Favorites, as described above with reference to FIG. 13B.

In FIG. 16I, Screen #1C-3, the user may choose Genre Favorites, as described above with reference to FIG. 13C.

In FIG. 16J, Screen #4C-4, the user may choose among the 1-5 Star Rating for Estimated Audience Reach, as described above with reference to FIG. 13D.

In FIG. 16K, Screen #4C-5, the user may choose key words that describe Mood/Tempos, as described above with reference to FIG. 13E.

In FIG. 16L, Screen #4C-6, the user may choose the ERA, as described above with reference to FIG. 13F. In the preferred embodiment, the user may also choose a particular year or group of years and include songs originally released in that year across all 28 genres.

Figure 17:
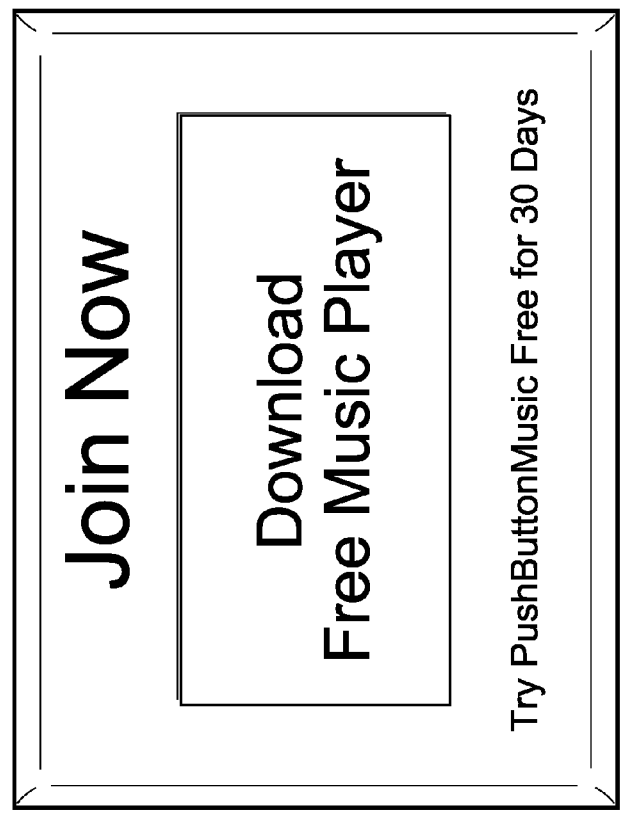
FIG. 17 is a screenshot for the fifth screen from FIG. 12A.

In FIG. 17, Screen #5, the user may choose How To Register For A Free Trial (Menu).

The present embodiments, while currently envisaged for use with a dedicated Push Button Media Player, may be adapted for use in the Apple iPod™ and iTunes™ systems. Like all media players, iTunes™ keeps track of the: song name, album, artist, release date, a personal star rating, the genre (as assumed by iTunes™), and lots of smaller facts such as bit rate and file size. The present embodiments may use some of the fields available on the iTunes™ screen. Specifically: 1) the "Comment" field may be used to store a song's Mood/Tempo (e.g. fast, slow); 2) the "Grouping" field may be used to store the source of the song (e.g. BB=Billboard); and 3) the "Composer" field may be used to store the initials of the person assigned to classify and rate the song initially. None of these inputs require any significant changes in the iTunes™ media player itself. As long as there are several fields available that can be used as smart-list criteria, their titles are irrelevant.

Regardless of the music player and it's music service, the preferred embodiments will likely transfer the following data elements to the music service server and the media player used by subscribers.

1. Song Name
2. Artist Name
3. Album Name
4. The Assigned Genres
5. The Assigned Audience Reach (Stars)
6. The Assigned Mood/Tempo (preferably in the separate field on the Media Player)
7. The Assigned Era which is included in the "Genre" field (e.g. Recent/Country)
8. Original Release Date (not the Re-Issue Date often found in iTunes™)

Each song in the Push Button Music (PBM) Media Player includes an MP3 file with the music and another file with metadata, directions for playlist searches, and certain text information. These MP3 files also contain some text information, such as the star ratings. Therefore, to transfer or back-up the music library, this other information should be transferred or backed-up as well.

6. Advantageous Features Achieved by the Preferred Embodiments

Relying upon a database of individually classified songs to generate playlists on-demand is a radical departure from traditional methods for creating playlists. Existing methods will only generate a playlist automatically from the Artist name, or in some cases a single primary genre. Additional playlists are created by hand selecting songs according to some format, subject, or theme. These subjects or themes can range from an individual's personal preferences to a variety of categories, for example, the Billboard Top 100, Songs of the 90's, The Best of Elton John, Favorite Reggae Songs, etc. In all cases, the individual songs within these playlists can only be retrieved by using the title of the playlist compilation, just as you would select a terrestrial satellite or Internet station today.

In contrast, the method of the preferred embodiment does not program or develop playlists of songs to follow a particular format, subject, or theme. Instead, in Filters #4 and #5, each individual song is listened to, classified, and rated based on separate criteria preferably including artist name, multiple genres, era or original release date, mood/tempo, and star rating. This applies a uniform classification and rating system to each song. This allows the consumer to select songs by using any combination of the search criteria described above. For example, one could combine 3-Star/Fast/Recent/Metal with 2-Star/Slow/Archive/Jazz. Furthermore, the system enables the generation of pre-selected song combinations or playlists for consumers who do not want to create their own. These most popular lists appear on their PC and/or MP3 player in easy-to-understand numbered playlists.

The mathematical implications of this approach, and, its impact on the variety of playlists consumers can generate on their PC and then enjoy from a portable device with fixed capacity, is quite astounding. As shown in Table 4 below, the Playlist Generator Database™ of the preferred embodiment can create up to 1.8 billion different song combinations per artist. With a 30,000 song library available, there are thousands of playlist choices that each includes over 100 songs. Finally, the top 480 to 600 playlists which appear numbered on the portable device may range from 55 to 5,071 songs.

TABLE 4

|  | Possible Combinations From Each Criterion | Total Combinations |
| --- | --- | --- |
| 1 Artist(1) | 1 | 1.8 Billion |
| 18 Genres(1) | 262,143 |  |
| 5 Ratings | 31 |  |
| 4 Mood/Tempos | 15 |  |
| 6 Era(1) | 31 |  |

(1)There are approximately 20,000 Artists, 28 Genres, and 6 Eras included in the 30,000 song database.

Of course, with a more limited capacity device capable of holding 500 rather than 19,000 songs, most of these predetermined song combinations would have few, if any songs. However, at any capacity level, the system of the preferred embodiment generates a huge number of playlist options to retrieve, listen, and discover music. As a comparison of the playlist song selection between MTV/Urge and the method of the preferred embodiments, assume that a consumer has a device with 2-gigabyte capacity (i.e., approximately 500-600 songs) that he wishes to load with playlists of music. (MTV/Urge is a subscription service with a 2,500,000 song library.) Table 5 below illustrates a database of 581 songs that was developed by selecting a number of playlists from MTV/Urge. This 581 song file was created by a knowledgeable MTV/Urge user and includes a wide variety of playlist selections.

TABLE 5

| MTV/Urge 581 Song Download - Version Date Aug. 01, 2006 | |
| --- | --- |
| Must Haves: Blockbuster Hits | 17 songs |
| Must Haves: Country Rock | 15 songs |
| Must Haves: 80's Alternative | 16 songs |
| Superplaylist: Rock Hall of Fame | 128 songs |
| Superplaylist: I Love the 90's | 140 songs |
| Superplaylist: New Orleans | 154 songs |
| Superplaylist: Reggae | 95 songs |
| Moods: Rebel Songs | 16 songs |

To fill his device using playlists from MTV/Urge, the consumer first has to choose from over 1,000 playlist possibilities ranging in size from 9 to 500 songs. Many of these playlists have vague or outright mysterious titles, thus making it difficult to guess their contents. A subscription service, such as MTV/Urge, does not allow consumers to create playlists from their song database based on combinations of Audience Reach, Era, Original Song Release Date, Mood/Tempo, or multiple Genres. As a result, in this example, a consumer wishing to listen to these songs has only eight playlists from which to choose. (Like all other music platforms, the consumer can always use artist name, song name, or a single primary genre to retrieve songs.)

Another major difference between the methodology of the preferred embodiment and a typical subscription service is that the known subscription service playlists are not derived from a narrow universe of songs, and the songs themselves are not rated by audience reach or the other criteria described above. In the other song databases now available, the star ratings are not assigned to the individual songs using a common classification system based on audience reach. As a result, for example, MTV/Urge offers 124,502 "5-Star" songs, a large number that effectively renders this criterion meaningless for search purposes.

Several thousand other playlist choices are also available using the system of the preferred embodiment for a 4-gigabyte device (approximately 1000 songs). For example, a full download selection of a category entitled "ALL FAST SONGS/3-STARS AND ABOVE/ALL GENRES" is available. This category includes a playlist of 801 songs of very fast-paced music from 16 of the 28 genres used by the system of the preferred embodiment. The consumer need not select from a long list of playlist possibilities or artist names to fill the device. Rather, the consumer may choose a single library to be downloaded all at once. Obviously, when facing an 80-gigabyte (19,000 song) MP3 player, this is a huge convenience.

The methods described above create a unique database that can be delivered on a private label basis to the subscriber services, device manufacturers, and broadcast platforms now available to digital music consumers. As described above, these services now offer the ability to download an unlimited number of songs from a 2,500,000 song library to a PC and then side load a portable device using a subscriber-based Digital Rights Management (DRM) system.

The system of the preferred embodiment provides a full-download service to enable a consumer to download up to 19,000 songs if the consumer has a 80-gigabyte MP3 device. An advantage of this aspect of the invention is that it provides the consumer with a high "discovery ratio". Discovery ratio is defined herein as being the number of times a consumer hears a new song they really like divided by the total number of songs sampled or listened to in full length. A high discovery ratio requires a lot of content variety. To deliver that variety, the preferred embodiments for both the PC and the portable MP3 player have notable advantages over terrestrial and satellite broadcasters. These include the following:

Time-Shift: The ability to skip songs is important to achieving a high discovery ratio. At a potential sampling/listening rate of 60 songs per hour, everyone will hear something they do not care for, no matter how uniformly it is rated for cross-over potential etc. Many listeners just are not ready for a full crossover discovery-oriented playlist. The SKIP button saves them.

Shuffle: This is important because the listener is not stuck on a particular artist or album. This obviously impacts the variety of music listened to in a given hour.

Playlist Depth: Most forms of broadcast music today, including many satellite and Internet-radio stations, have very narrow playlists. The biggest reason is that playing hits helps to ensure that the targeted listener does not change stations. The result is consumers must do a significant amount of channel surfing, even on satellite, to hear a new song. By contrast, fully loaded MP3 players can provide very deep playlists, hundreds of playlist choices, and time-shift. The result is far greater diversity and a painless way to hear new music.

Crossover: "Discovery" does not always refer to a new artist or album from a familiar artist, genre, or timeframe. This is sometimes referred to as horizontal discovery. A lot of great music can be discovered simply by recommending established hit songs from genres and eras with which the average listener is not familiar. This is sometimes referred to as vertical discovery. Unfortunately, the vast majority of playlists that are broadcast on terrestrial, Internet, or satellite radio tend to be highly genre-specific. Even the so-called "Blend" stations tend to be extremely narrow in both the genre and era offered. While this may be great for a listener that only wants a specific type of music, it represents a greatly reduced discovery ratio.

Simply having hundreds of playlists available for small genres such as Blues, Folk, Rap, Latin, World, Alternative/Punk, and Gospel does not help the problem. Passive listeners who are unfamiliar with or who do not prefer these genres will rarely go there. The fact is that only a few songs from these smaller genres have significant crossover potential from both a genre and era standpoint. Combining entire small genre playlists into a "Super Crossover List" therefore does not work. This is the approach now used by the partial download products offered by the major subscription services.

By contrast, the system of the preferred embodiment ranks songs individually for their crossover potential. In that manner, the system offers playlists at a certain rating level that are indifferent to genre or era. This unique multi-genre crossover capability creates unprecedented variety, especially when the shuffle function is on. This, in turn, allows consumers to enjoy a much higher discovery ratio when they choose to do so. While this approach is far too risky for traditional broadcasters, a fully-loaded MP3 player with a skip button removes the risk.

The Source Selection Process Impacts Variety: As described above with respect to Filter #1, all music bought or heard by consumers is first reviewed by one of five expert sources. Which of these experts are selected (from the thousands and thousands available) will greatly impact the variety and quality of the playlist one recommends. Not surprisingly, the A/R Departments of the four major record labels virtually dominate what is now available on terrestrial and satellite radio. The playlists offered by the eight major Internet-based subscription services also focus on a narrow list of mostly major label artists. As a result, they all tend to play exactly the same songs packaged in slightly different ways. To address this problem, the satellite, and Internet-based platforms have begun to offer playlists directed at small non-label sources. These include: "Indie Rock" or "Garage Band" or "College Campus" playlists. However, just like their small genre lists, these are a harrowing experience for the average listener even with a time-shifted device. By contrast, the system of the preferred embodiment includes only highly selected and rated music from a vast array of experts, including non-label music. Any given playlist will therefore include songs from a wide variety of non-label sources without requiring the consumer to search for them.

Artist Career Stage: The vast majority of "new" artists with a major record label have actually been touring and recording for years. By selecting only artists with a major record contract, the traditional radio programmers automatically eliminate the same quality of artists before they have a contract. However, the system of the preferred embodiment (and specifically the Remote Contributor Network) includes an early detection capability that enables consumers to discover acts that are highly likely to get such a contract in the future.

Including Internet-Based Sources: For decades all five expert sources above were only required to listen to a fairly narrow list of artist names. Now, community sharing sites such as MySpace claim to offer websites of varying quality on over 135,000 bands. Meanwhile, the MusicNet database offers 110,000 artists. Clearly, this volume does not include much material that is of interest to the average passive listener, or the five expert sources they rely on to filter it. Fortunately, MySpace, and another 60 or so of the 300 music websites out there, now publish what these enormous populations are downloading and listening to on a daily basis. However, it is believed that few programmers will admit using these new Internet-based sources today. This is because they have no way of systematically introducing this information into their traditional programming process. By contrast, the system of the preferred embodiment has virtually automated the collection of this data into the system. This will provide professional programmers with a very powerful tool they lack today.

7. Further Embodiments

Recently, a number of industry participants have begun to see that "pre-loading" music devices may provide benefits to both consumers and content owners. Unfortunately, the word "pre-loading" has come to mean many, very different things. Some of these concepts have been around for a long time while others are new initiatives. There are also huge differences in the benefits these ideas offer and their potential for wide spread adoption.

Promotional Pre-Loads: A number of device manufacturers have, in the past, pre-loaded a small and random collection of DRM-free songs in an effort to show off the devices or promote certain artists. These include Zune, Z-Vue/Wal-Mart, Memorex, Sandisk/Rhapsody, and others. The music label companies have agreed to these one-off pre-loads in order to promote their own artists and in some cases, receive a small one-time per-device fee. None of these efforts have created any significant demand for the devices or the artists. Several years ago, PC makers also experimented with pre-loading small libraries of songs (or selected playlists) with similar results. Recent efforts by Sansa include pre-loading specific albums or whole concerts to tiny memory sticks you can buy and insert in your portable music player (i.e. Sansa Fuze).

While DRM-free songs (in MP3 format) could be used to pre-load cards or small devices, someone has to pay $0.99 per song or accept less popular music the labels wish to promote. More importantly, there is no recurring revenue for the content provider (PBM) or the content owners (labels, publishers, composers, artists). In fact, their use may cannibalize subscription-based offerings. The benefits of pre-loading random collections of MP3 files are therefore, very limited.

Pre-Loading Access to a Huge Catalog: New subscription services have recently been announced that provide access to a large unfiltered song universe by pre-loading it on an MP3 player or streaming it to a mobile phone. However, for many years now, consumers have enjoyed free and relatively convenient access to a roughly 8,000,000 unfiltered song universe on their PC through Limewire or similar illegal offerings. Not surprisingly, providing legal access to basically the same unfiltered song universe via iTunes, Rhapsody, Napster, and others, for a fee, is a low margin business with minor volume. In fact, recent estimates suggest that 1 billion songs are illegally shared per month. Meanwhile Apple, the only successful "a-la-carte" store, has sold only 4 billion downloads in 5 years. And, all of the illegal music is already portable by simply side-loading it to an iPod. Note that whether the "access" is free or not, the consumer still has to pick the music, organize it into playlists and load it themselves. Without a properly programmed content solution, pre-loading unfiltered catalogs is unlikely to make much difference.

For consumers, all that the pre-loading of this type accomplishes is temporarily allowing them to skip side-loading, from their PC, the music they want. "Cutting out the PC" is also the justification for a plethora of mobile and wireless solutions, none of which have produced significant usage in the US. This is probably an example of a technology solution looking for a problem. Again, consumers already have free access to this music on their PC and most people (e.g. 85 million iPod owners) now side-load the songs they care about to a portable MP3 player or phone, most do so for free. In fact, recent studies indicate that side-loading is preferred over various less known and more complicated wireless, mobile, and satellite solutions. In short, side-loading is simple and it works. It will continue to improve in speed and simplicity. And again, side-loading illegal music to portable devices comes with no use restrictions.

Pre-Loading Internet Radio Stations: Both Sansa/Rhapsody (the e200R Series) and Slacker, a new internet radio platform, are attempting to make a small selection of their playlists available pre-loaded on their portable devices.

There are now several providers of streaming music onto the PC on a subscription basis or via "ad-supported" models. Some of these, such as Napster, Rhapsody, and Zune offer access to millions of unfiltered songs in addition to channel programming. They are also fully interactive. Other "streams" are from Internet Radio platforms, also referred to as web casters. All of internet radio operates under the Compulsory License with content owners. This severely limits or eliminates users' ability to replay, skip, save, or omit songs. Specifically, you are only able to skip 6 songs per hour, per station. Since this is "radio," one must listen in the order the songs are "broadcast." This means one cannot use an internet radio service, in any form, to search for specific artists or songs from a library or song catalog.

There are two methods to choose a streaming station from any source. First, one can scroll through the 5,000 or so themed playlists available from a web platform such as Live 365. The second method is to type in the names of one or more preferred artists or songs and listen to a list of songs with a similar digital fingerprint, in the order it is broadcast. Pandora, MyStrands, LastFM, Slacker, Rhapsody, Napster, and many others all provide some form of preference matching. Slacker recently began calling this retrieval method "Personalized Radio," but the idea has been in practice for several years. Another common method to achieve "personalized radio" by Slacker, PBM, and nearly everyone else is to simply stream a pre-programmed playlists and have the customer indicate in real time what they don't like and have it forever omitted.

In order to reach a broader audience, Slacker set out in 2004 to "free internet radio from the PC". They spent many years and much money on a portable radio receiver able to receive satellite (KU band) and wireless signals. What they ended up with is certainly not free of the PC. To preload the device, the customer must first go to the Slacker website and construct 40 channels on the customer's PC. This requires a real music buff to construct such "preferences." Or, the customer can pick from a small selection of themed playlists (explained later) and omit what they do not like. The omissions can be performed wirelessly, but so what? With other products, the customer just tags them for omission and revises the list when the music is synced. Instead of wirelessly loading these to the device, Slacker side-loads them and mails it to the customer.

In the end, all the customer can do is pre-load up to 40 small customer-created playlists onto a tiny portable device. The first problem, of course, is that this is still Internet Radio operating under a Compulsory License. One must listen to the songs as broadcast, skipping is limited, unless you subscribe, and one can not search for individual songs or artists. If instead, entire playlists are simply side-loaded from any of the existing subscription platforms to the portable player, there are none of these restrictions. The second problem is content management and programming. Like other preference-matching or recommendation services, the recommended songs come from a tiny selection of the 2,000,000 songs available. These are selected by "professional programmers." The fingerprint of the customer's preferred songs allows Slacker to select which playlists of songs they recommend for the customer. This retrieval method, of course, varies according to the preferences entered on a PC and the number of songs in the system for which a fingerprint has been logged. Or, the customer can skip all that and go with a themed playlist organized by the same programmers. Either way, the result is only 40 playlists to choose from on the customer's portable device. Third, Slacker does not offer a pre-loaded song library, only a small collection of themed playlists which cannot be searched by artist or song. Fourth, Slacker pre-loads a tiny encrypted version of the songs found in 40 small playlists. While this allows them to "cache" 4,000 songs on a 4 GB device (versus 1,000), it only replays at 40 KB per second (PC Magazine Feb. 5, 2008). 128 KBPS is now considered a minimum in the digital world. Fifth, the Slacker device capacity is so small that the breadth and depth of their recommended playlists are actually smaller than what Satellite Radio provides. At approximately 70 songs, most of the playlists begin to recycle. Sixth, the "free" service comes with ads, just like every other form of radio. And the Premium subscription service is occasionally interrupted with in-house chatter just like satellite. Seventh, there is no organized channel guide like satellite. The customer can only listen to the music by selecting the 40 playlists he/she chooses. Eighth, like every digital service, Slacker has a match-this-song feature to develop a "personalized station" by requiring the customer to enter preferences on the customer's PC. This is not convenient for most consumers and actually ends up limiting their discovery to the few artist and genres they already know about. In short, pre-loading internet radio stations is unlikely to replace current iPods, seriously hurt satellite radio in the car, or compete with the fully-loaded multi-channel solution offered by the embodiments described in earlier sections.

In contrast to then above-described "pre-loaded" devices, the embodiments described below will deliver pre-loaded devices with an entire filtered song library and 620 music channels that are fully interactive and updated daily. What follows is a summary of the key features of this unique approach to content management and pre-loading services.

Figure 18:
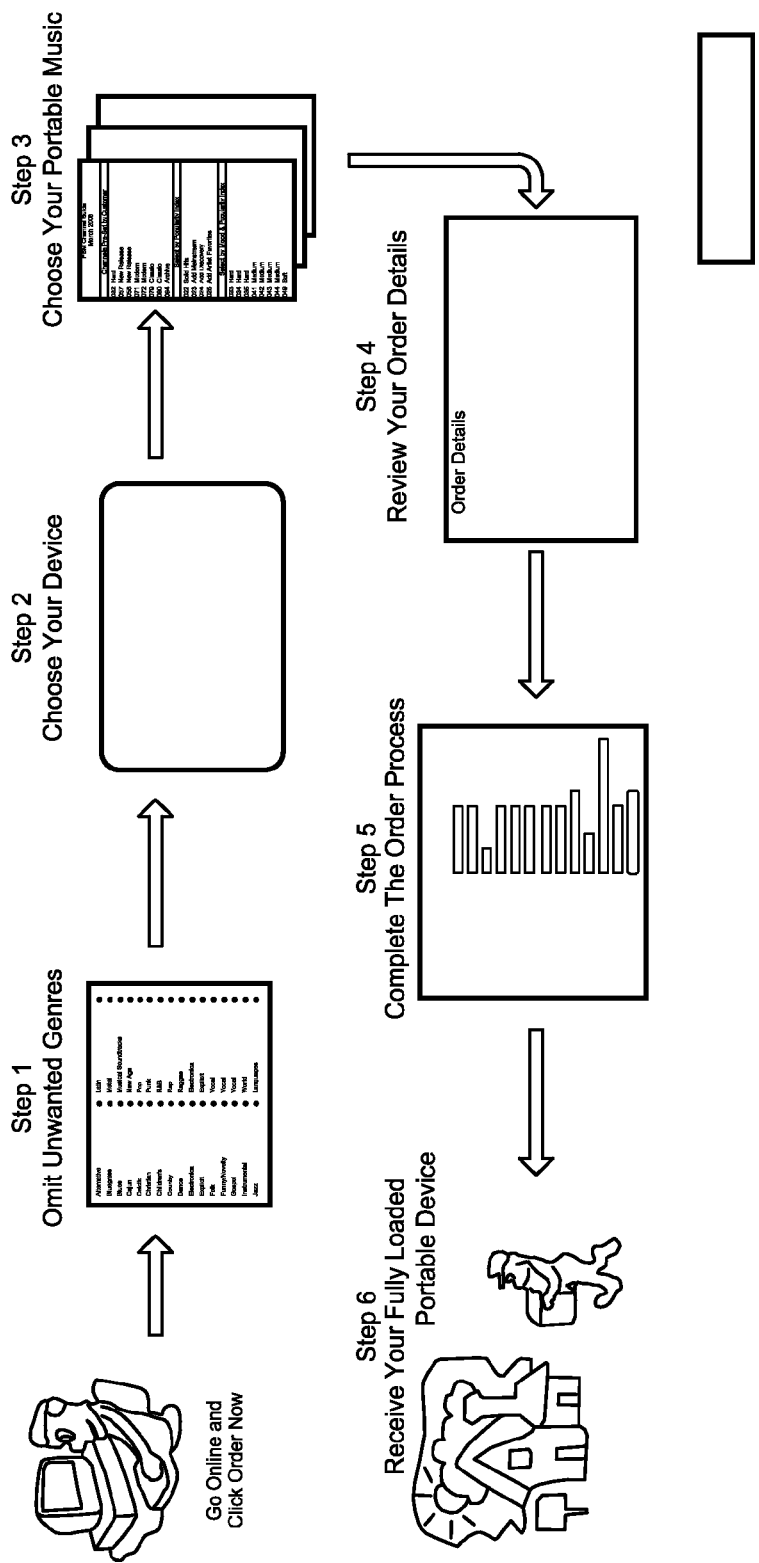
FIG. 18 is a notional diagram of an Express Service embodiment.

The PBM Express Service summarized in FIG. 18 is designed for listeners that do not have the time, expertise, or desire to construct, load and maintain a large song library on their own. For a one-time loading and handling fee of perhaps $50 and a monthly subscription of perhaps $20, PBM will do the following: 1.) Identify the most popular 30,000 songs from an unfiltered 8,000,000 song universe, dating back to 1918, 2.) Classify and file these songs by multiple selection criteria into a well organized and uniform library, 3.) Create 620 pre-programmed music channels and allow any number of customer created playlists, 4.) Pre-load a customized version of the PBM library and music channels to the customer's PC for "streaming" (Internet Radio), 5.) Sell a thoroughly tested PBM-authorized device that can be branded, 6.) Deliver the device, Express-Loaded, with a PBM library and 620 music channels, within 72 hours to the customer's home, 7.) Update the library and channels on a daily basis, 8.) Provide customers access to MediaNet's 4,000,000 song database from their PC, 9.) Allow customers to customize PBM's pre-programmed music by omitting songs on-demand, 10.) Allow customers to skip, omit, replay, save, or purchase songs on-demand, without limitation, 11.) Provide a Crash and Loss protection program in the event the customer's subscription runs out, their PC crashes, or their device is lost.

A Fully Licensed Subscription Platform: Loading an Apple iPod with a DRM-free (MP3) version of the PBM library would cost $30,000 upfront and about $40 per day to update plus many hundreds of hours of work. Selecting the music, classifying and rating the songs, and preparing 620 pre-programmed music channels would require a music expert several years. For this reason, a subscription-based licensing platform and state-of-the-art content management systems are notable features according to this embodiment.

The present embodiment offers consumers 620 pre-programmed music channels, 21,000 artist favorite's lists, and on-demand access to 30,000 songs from a single song library. This convergence of broadcast music channels with a personal song library is a first in the music business. To develop this song library (or database), PBM does not rely upon traditional radio programmers to find, select, classify, or rate individual songs or program its music channels. Instead, a combination of highly automated computer systems, third party data sources, and trained PBM librarians is used.

New digital technology has created challenges traditional programming techniques did not have to deal with. First and foremost is the task of choosing music from an unfiltered universe of roughly 8,000,000 songs that listeners can now access for free on their own. Fortunately, Broadcast Data Systems (and others) have demonstrated that only a tiny portion of this available universe has any relevance to consumers. While there are now numerous methods to gain "access to" or "share" music from this huge unfiltered song universe, the tiny portion of relevant songs are basically the same. This explains why, for example, the top file-shared songs in "rock" still look a lot like the playlists for KIIS FM in Los Angeles. And, the iTunes top 100 lists always look very similar to the corresponding Billboard Charts. In summary, this explosion in technology and access has not really changed what most people want to listen to very much. What it has done is created an enormous need to filter this song universe effectively.

Most consumers do not have the time on their own to search an 8,000,000 song universe for music that is relevant to them. They need someone else to filter it and organize it into a library and pre-programmed playlists so it is easy to use. Many listeners now belong to massive social networks, whose members can obtain illegal copies of songs and share or distribute them to anyone they choose. However, "sharing" random playlists and songs with millions of strangers is a very ineffective and time consuming way to find relevant songs. Popular playlist sharing features such as "iLike" on Facebook simply create exactly the same song universe in tiny pieces (along with a lot of noise). This is too much work for most consumers who just want to listen to good music. The vast majority of discovery still comes from music that is filtered, organized, and broadcast in some form. By way of illustration, there are now nearly 179,000 garage bands on MySpace. Most now have websites offering free MP3s, t-shirts, and rave reviews from their "friends." This does not mean customers want to hear them all. Filtering is very useful to pre-load a library that includes only a tiny fraction of the song universe available. In the present embodiment, it is filtering 30,000 songs out of 8,000,000.

Traditional song selection techniques rely upon expert individuals searching through their best online and offline sources, listening to music and selecting what to include. For terrestrial radio and satellite radio conglomerates, this is pretty simple. That is because they offer extremely narrow playlists aimed at highly specific demographic groups. For them, any "filtering" is basically a daily negotiation with the promotion department of well respected record labels with different specializations. Digital services, on the other hand, normally support hundreds of channels that collectively include from 10,000 to 18,000 songs on average. They then fingerprint these recommended song collections by various characteristics (music genome, etc) so they can match them to consumer preferences. As described above, recommended songs are also assigned to various themed playlists as a second method for consumers to access the same collection. While BDS was the first to apply song-matching algorithms in the music industry, the present embodiment does not use this type of technology to construct libraries or music channels. The present embodiment also does not use traditional programming staff. Instead, the present embodiment relies upon two highly automated proprietary systems. One deals with publicly available sources that primarily include songs from the major labels and a few dozen important indie labels. The second system called the PBM Remote Contributor Network, focuses on artists likely to sign a major label contract within three years.

For publicly available material, the present embodiment identifies and tests over 400 individual experts, charts, and playlists from leading periodicals, music websites, broadcasters, file sharing networks, and selected social network. (See FIG. 4A). These sources are constantly revised. As database aggregators, PBM then monitors these sources for popularity index (explained below), eliminates duplication, and submits song "candidates" to the Song Classification and Rating System (to be described below) on a daily basis. This "source-edited" filtering system is further refined with third party data sources that measure airplay, sales, downloads, and file sharing activity. These processes are preferably automated. In total, five stages of acquisition, filtering, and classification are used. (See FIG. 3.)

These publicly available sources, including broadcasters of every variety, rely primarily upon a tiny catalog of featured artists that are heavily promoted by major record labels and a handful of indies. To address this limitation, a Remote Contributor Network (to be described below) has been devised. This network comprises trained contributors located in the world's largest music markets, who filter and submit song candidates, preferably over the Internet. Their job is not to find "undiscovered" or "indie" artists, per se. Instead, they are looking for artists likely to sign with a major label within 3 years. This "early detection system" covers the top venues, the most respected local clubs, college radio stations, and local music periodicals. Because of this Remote Contributor Network, a substantial portion of the PBM song library content is not available on any other legal digital platform.

Song Classification and Rating System: As mentioned above, current digital services rely upon traditional programming techniques to assign individual songs to "themed" playlists one at a time. These themed playlists can be constructed around a particular Era, Genre, the lifestyle of a particular consumer demographic, or any other theme. In other cases, famous people provide a random collection of their own favorites. There are now literally thousands of professional and amateur "DJs," web-casting themed playlists over platforms like Live365, Slacker, Napster, Rhapsody, Zune, and many others. With the addition of "streaming" capabilities to social networks, it is literally an explosion of music. Selecting playlists with only relevant songs from this "unfiltered" playlist universe has been almost as difficult as finding songs.

On satellite and Internet radio platforms today, themed playlists are often assigned mystery titles like "The Loft", "Patio Blend", or "Love at Sunset." Consumers may retrieve music from these platforms solely by selecting a particular themed list. Duplication of songs across playlists on these platforms is relatively rare since most programmers try to address only the particular audience or genre assigned to them. This limits the number of playlists available from a small library of songs, which is a huge disadvantage when it comes to pre-loading. Large staffs of programmers and administrative support are needed for this type of content management. None of these platforms, including satellite radio, has yet turned a profit.

Instead of assigning songs to particular themed playlists, the present embodiment assigns six separate criteria (or facts) to individual songs in addition to the artist, song, album metadata, and primary genre. A careful review of every digital music platform now available confirms that none are using this approach. In addition to the artist, song, album, and primary genre found on most current systems, the present embodiment assigns Secondary Genres (31), Languages (9), Moods (4), Eras (6), Popularity Level (5), and the date of song release (not album release) to every song in the database. This creates a separate file for each song. All of these criteria can be utilized by the unique retrieval system described below. This extensive per-song classification system analysis would likely be impractical without first filtering the song candidates down to a highly relevant group.

Unlike most existing systems, the present embodiment has no so-called "quality" rating and asks for no opinions from consumers. The MTV/Urge (now Rhapsody America) system is an example of why such ratings are meaningless as a retrieval criterion. Before merging with Rhapsody, MTV/Urge had 124,500 songs rated 5-stars. Instead, the present embodiment utilizes an audience reach measurement now called the "Popularity Index," or simply "Popularity." These principally quantitative assessments are constantly revised with data from the third party data sources as discussed above (see FIG. 2) as well as the listening behavior of the subscriber base itself. Both systems are used to monitor actual consumer behavior, not their "opinions" of particular songs or bands. As this information changes, the audience reach ratings change creating a self-educating closed system. This system allows consumers to basically choose what level of familiarity versus discovery they want using the guidelines shown in FIG. 19. For a connoisseur of a small audience genre such as Jazz or Bluegrass, these ratings have less value since, by definition, they will be pretty low. Only songs with high-crossover potential can achieve a high popularity score from a small genre.

To assign popularity ratings to individual songs, a forced-curve system is employed as described above. (See FIG. 8.) Similar to "grading-on-the-curve", only a certain percentage is allowed an "A" or "B" grade. The same logic is applied to the song library. Only 30,000 are currently allowed. A song's current relative popularity to its peer group provides a more disciplined approach than subjectively evaluating each song for "quality" as in the MTV/Urge example cited above.

In short, the "top 30,000 songs" represent what is presently believed to be the songs with the highest current audience reach across 31 genres and going back to 1918. As a result, a high ranking from the present invention is something that consumers and artists will eventually take very seriously. It is, in fact, the first universally-applied rating system in the music industry.

Figure 20:
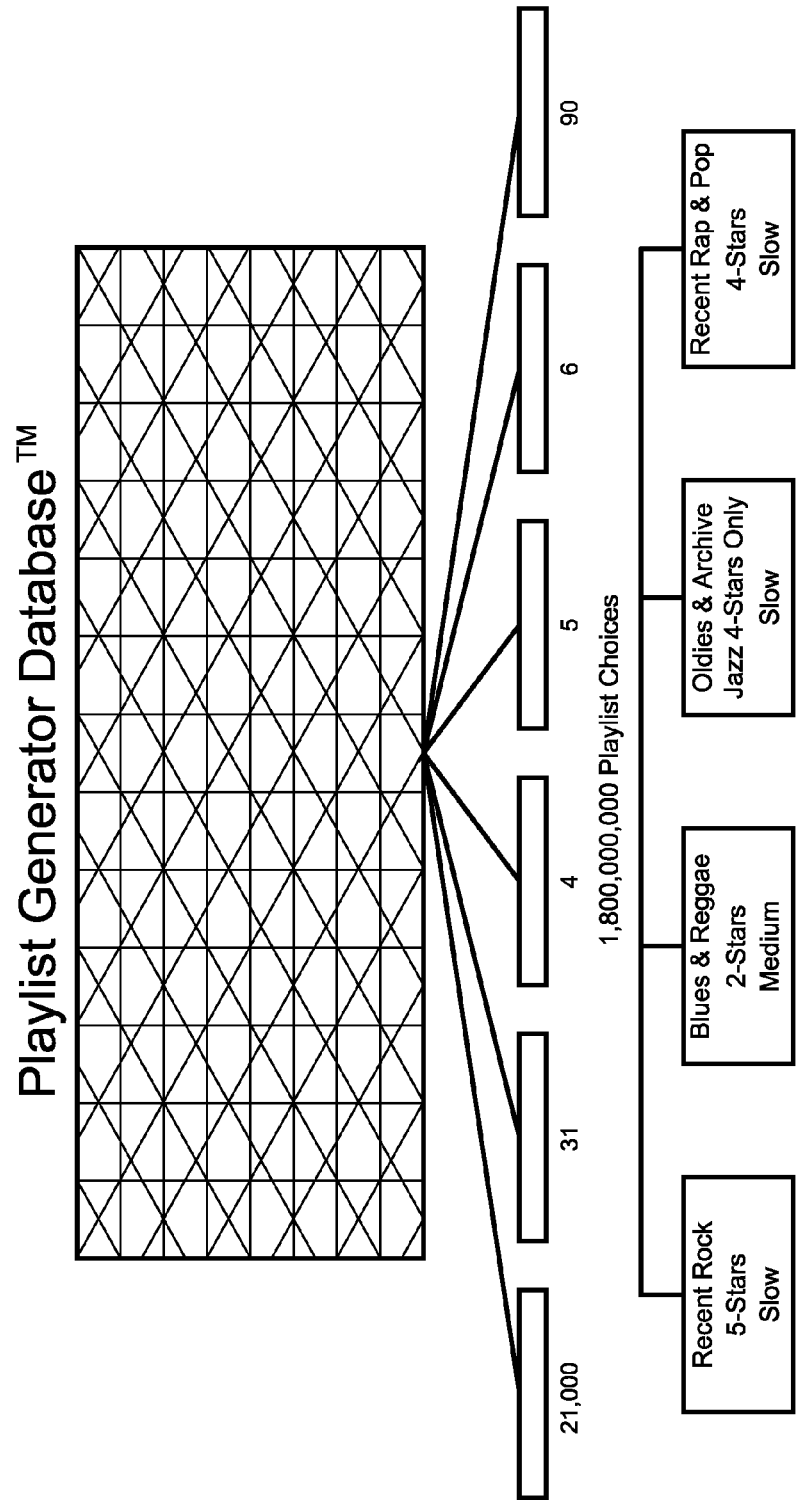
FIG. 20 is a diagram showing the breakdown of the Playlist Generator Database.

Applying these unique content management systems results in a Playlist Generator Database as shown in FIG. 20. Even if every song was written by one artist, in only one year, the database can use the other criteria in combination to generate over 1.8 billion playlists. The most important advantages of this approach for consumers has to do with variety, discovery, and playlist depth. This is because the present embodiment offers numerous playlists that cut across all 31 genres, 9 languages, and 90 years. For example, if the customer wants only songs soft in mood (across all 31 genres and 90 years) he/she will have a playlist with approximately 8,000 songs. If the customer wants only the soft mood songs with a popularity index of 4 or above, he/she will get roughly 1,179 songs. If the customer wants only soft songs, 4.0 and above that are also R&B originally released after 1982, he/she will get only about 73 songs. Most of these will be familiar to R&B fans. If, on the other hand, the customer wants to maximize his/her chance of discovery, he/she might select only New Release and Recent Songs (2005>), with a 3.0 popularity index across all 31 genres and 90 years. The result is roughly 2,400 songs, including many the customer has probably never heard before. In all cases, the customer will hear a playlist of carefully selected songs that is much, much deeper than the themed programmed lists now available on terrestrial, satellite, and Internet radio platforms. This playlist depth automatically increases the chance of both Horizontal and Vertical Discovery without increasing the chance of hearing simply bad music with no audience appeal. While most satellite and terrestrial channels rotate 500 different songs in a month, the majority of channels according to the present embodiment are over 1,000 songs.

Figure 21:
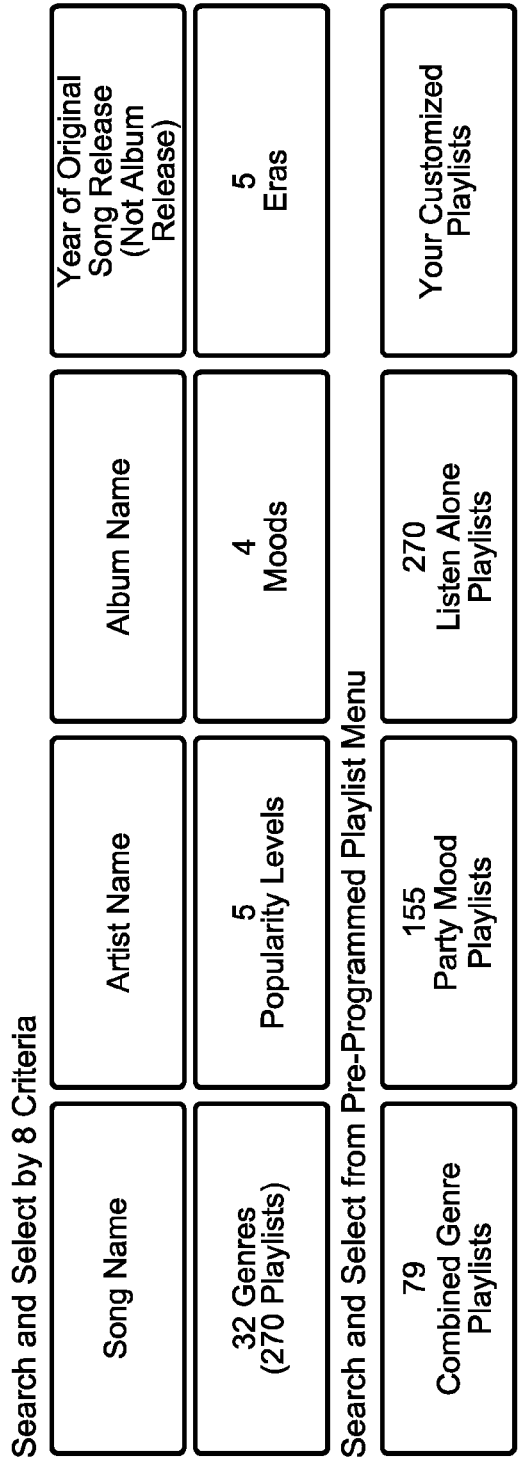
FIG. 21 is a diagram showing the Playlist Generator Menu.

The Playlist Generator Menu: The Playlist Generator Menu allows consumers to simply point and click on the screen shown in FIG. 21 to quickly assemble a customized playlist. Unlike iTunes or other "media players," no complex search algorithms are required, and the customer has nine separate criteria and facts to choose from instead of just four. To this playlist, customers can add music of their own if they want to. Duplications are automatically eliminated and any playlist built on the system is automatically updated with new songs or to reflect rating changes.

The Multi-Channel Internet Broadcasting Service: This embodiment provides a multi-channel broadcasting service preferably comprising 620 of the most popular playlist combinations described above. There is no programmer involved. The customer merely chooses this service and has access to the rated songs in these 620 playlists. Provided consumers can save songs to a favorites list when they hear them, these playlists will be kept up to date. This embodiment is based on the knowledge that most listeners really do not want to fool with creating customized playlists. With 620 predetermined, pre-programmed choices across 31 genres and 90 years, the need to create a playlist is greatly diminished. At 10,000 playlist choices, the present embodiment could virtually automate-away the need to create customized playlists.

Figure 22:
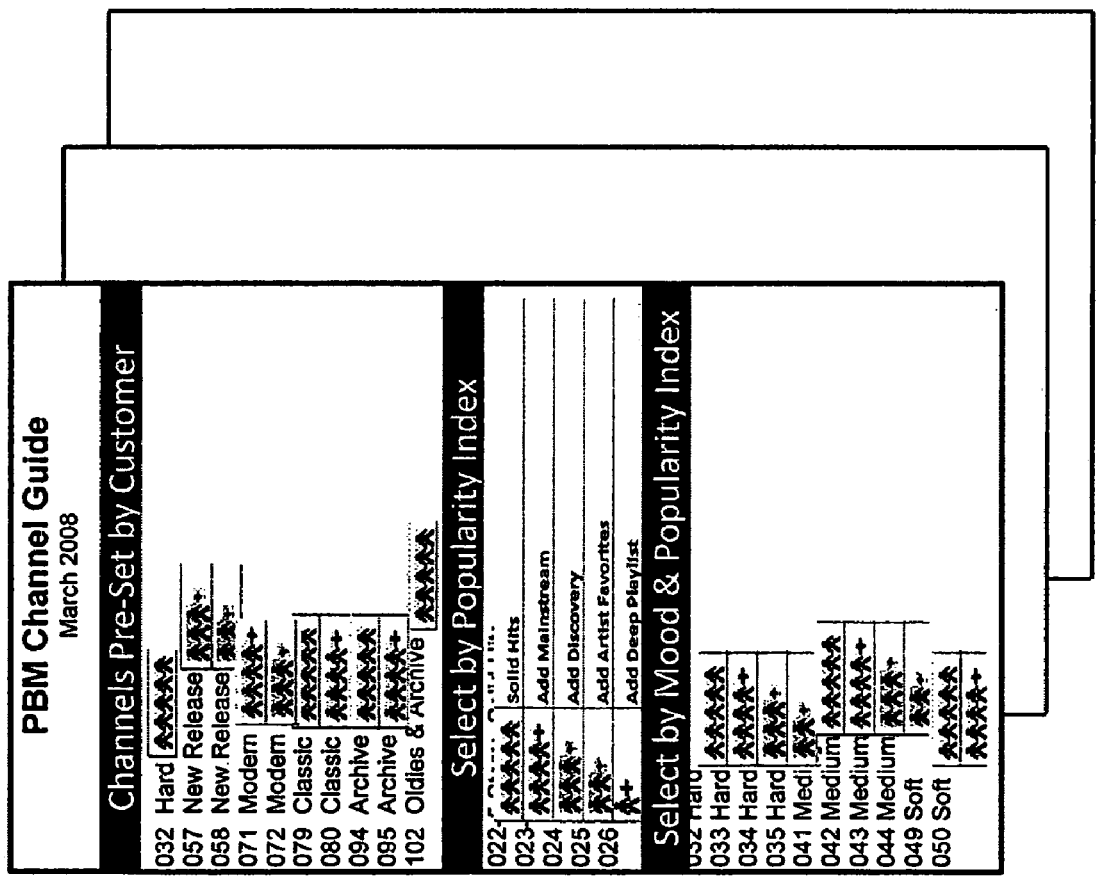
FIG. 22 is a diagram showing the Channel Guide.
Figure 23:
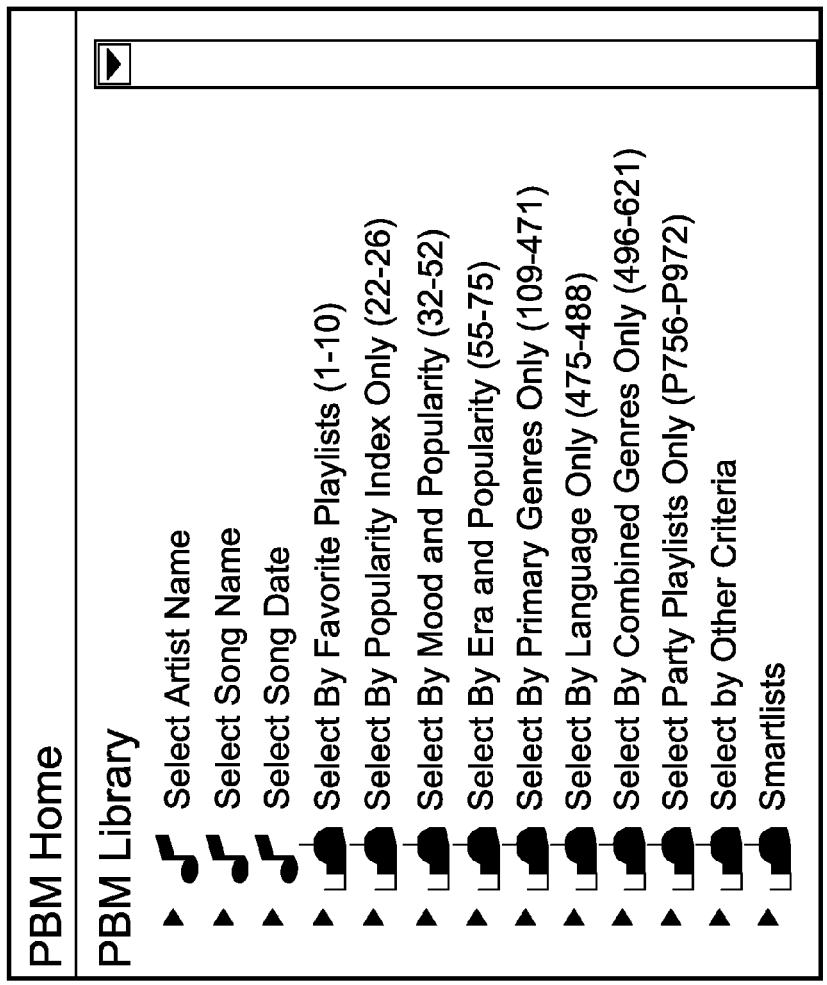
FIG. 23 is a diagram showing the Playlist Menu Sub-directory.

The Channel Guide: When faced with hundreds of channel choices like cable or satellite TV, or satellite radio, consumers are already used to receiving three things as described below. The present embodiment provides all three, as follows: 1.) A customer's favorite stations can be selected and "pre-set" to appear at the top of the channel menu on the PC and the portable device. 2.) A small fold-up channel guide, like the one provided by Time Warner cable or XM radio, is provided with their fully loaded portable player. (See FIG. 22.). 3.) To avoid scrolling through a 620 channel menu on the customer's PC and portable device, the present embodiment will offer a menu sub-directory as shown in FIG. 23.

Pre-loading an entire song library: To provide an acceptable library of artist and songs combined with 620 pre-programmed music channels requires a very large song file. A 30,000 song file, at 4 MB per song, requires 120 GB just for music. This creates a number of problems that have been addressed by the content delivery system, as outlined below. The simplest and most economic way to pre-load content is to have a device capable of receiving the entire 120 GB file all at once. However, until a credit card size, flash-based memory device is available with 120 GB of storage, it is advantageous to pre-load much smaller devices. While few, if any, customers will listen to the entire 30,000 song library, just like few need an FM dial with 20+ choices, device size is an important issue to analyze and take into account.

Simplicity: While no one listens to all 20+ channels available on the car FM radio, manufacturers do not ask people what spectrum to include on their car radio. Instead, consumers just pick the ones they want and listen to and pre-set them, after listening begins.

Discovery: The process of omitting genres described above, allows people to select a sub-section of the entire 30,000 song library so that it may fit within their portable device. However, by omitting genres, they limit their Discovery Ratio, especially for "cross-over artists" from what are considered small audience genres. Variety should include some high popularity index songs from World, Latin, Jazz, or even Electronica. With unlimited skip privileges, and the ability to choose only popular music if they want, the present embodiment gives consumers a chance for Discovery without requiring that they do the exploring on their own. However, if the device size is too small to accommodate them, these small audience genres are likely to be omitted. Once a 30,000 song device is available, consumers can simply omit explicit material and then choose whatever channels fit their taste.

Depth: If people do not find the particular artist or song they are looking for, they will be disappointed. On the PC, the present embodiment automatically searches the entire MediaNet 4,000,000 song universe for a particular artist or song if it's not on the recommended library. However, from the standpoint of a portable personal library, the song library must have the artist and song they want or they are out of luck. Over time, active listeners can correct this problem by creating a customized playlist on their PC and side-loading it. Such playlists will then appear at the top of the pre-set section of their PC and portable device menu. With the potential addition of personalized content, device size is obviously important. Playlist size, which is vital to both variety and discovery, is also ultimately related to device size.

Logistics of Pre-loading: Putting music on a portable MP3 player today is a two step process. First, you must download song files from the provider to your PC. At DSL speeds, this normally takes about 28 seconds per song. Second, you must side-load the songs from your PC to your portable device. This takes about 4 seconds per song (if the "sync" works as planned). At DSL speed, the download of a 30,000 song library to your PC can take 15 days and the side-load another 33 hours. Every song a customer wants from any source, that was not pre-loaded, must go through this time consuming process. And as discussed below, it takes up storage on the customer's PC. However, by pre-loading the library up front, all of these problems are largely avoided. (The new songs being added to the song library are only about 30 per day, which requires relatively little time or storage.)

Storage on Consumer's PC: Every song a customer wants to hear that is not pre-loaded will require 4 MB of storage on their PC. With no pre-loading to the portable device (acting as an external hard drive), this would total 120 GB. While consumer hard-drive prices are falling, this is still a huge number for the average consumer to tolerate on their existing equipment.

Economics of Choice versus Simplicity: The Small Device Management solutions outlined below require choices to be made by the consumer in order to decide what to pre-load. This, in turn, requires a more elaborate user interface to facilitate that choice and the added customer service that comes with choice. Secondly, it requires a customized approach to pre-loading at an Express Loading facility, since each customer is a little different. A 30,000 song device eliminates both choices. This standardization, in turn, allows a two-click process at the user interface as shown below.

Click 1: Do You Wish to Omit Explicit Music?

Click 2: Load Device

The result is the consumer is not required to choose their music until deciding what they want to hear at the moment, from their 30,000 song fully-loaded device. Just like FM Radio, the stations are all there. Secondly, the Express Loading process becomes totally standardized and therefore highly automated. This lowers costs and the turnaround time for consumers. Despite these hoped for advantages of a larger device, small device solutions remain relevant. This is enhanced by two additional alternatives, as detailed below.

Figure 24:
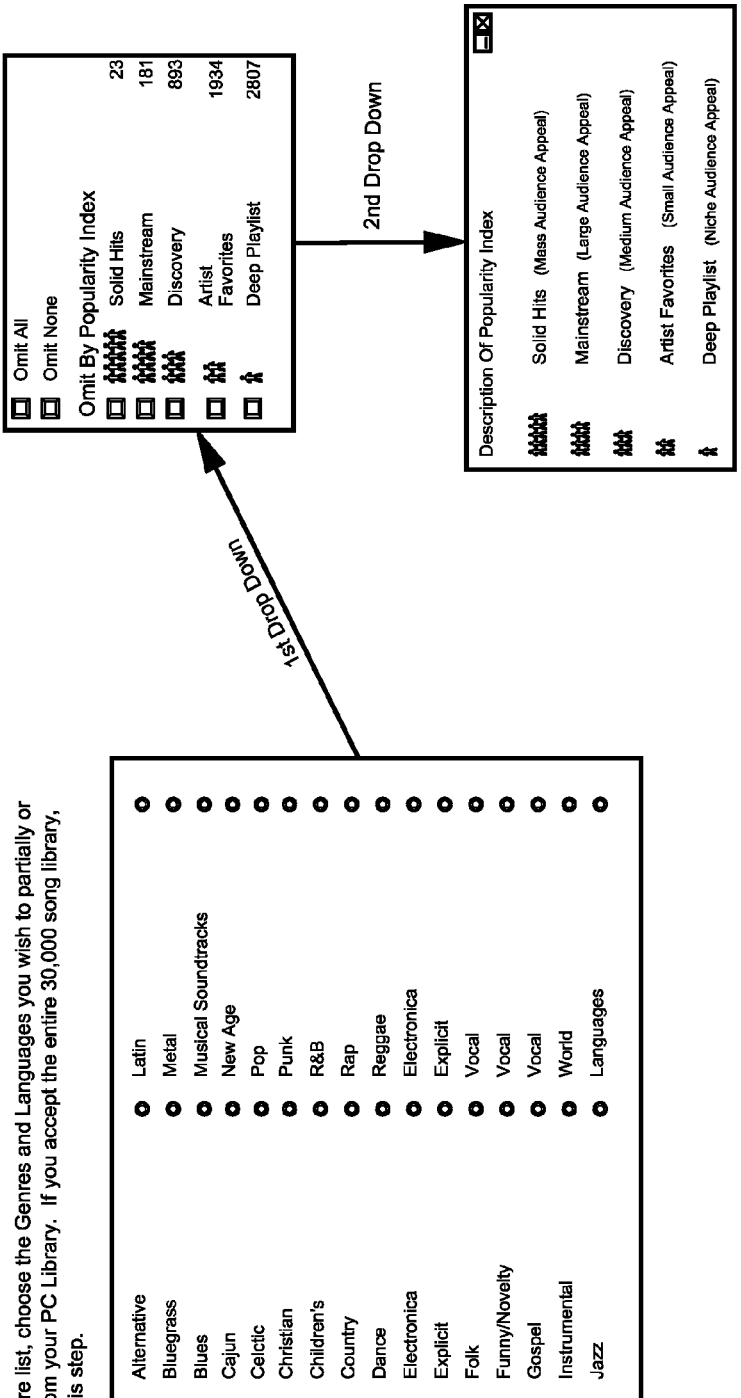
FIG. 24 is a diagram showing the Genre/Popularity Omission Process.

Genre/Popularity Omission Process: The Genre/Popularity Omission Process depicted in FIG. 24 is used in Step 1 of the Express Loading Service, described below. This process does not require consumers to choose their own music to include in the library on their PC or their pre-loaded portable device. Rather, the consumer can simply omit genres they positively do not want. (Of course active customers that want to really customize these libraries are given an excellent and unprecedented set of tools to do so, including the Playlist Generator Database system described earlier.)

The Genre/Popularity Omission Process is used in two places. First, in Step 1 of the order process, a consumer can decide if they want to remove anything from the 30,000 song library that would otherwise be automatically installed, as a text file, when they download the media player. The "text file" of a song is very small, therefore PC storage, device size, and downloading time are not issues. Furthermore, the text file tells the provider's server what song has been chosen to stream. With respect to their PC library, customers will likely not omit anything except perhaps "Explicit." The customer may simply choose to listen to the pre-programmed channels they like rather than categorically eliminating entire genres which will reduce the variety found on Discovery oriented channels (e.g. Station 0023; 4.0 and Above, All Genre, All Era).

In the second application of the Genre/Popularity Omission Process, however, the customer may choose which of the 30,000 songs on their PC get side-loaded to their e.g., 7,000 song device. This occurs in Step 3 of the Express Loading Service shown in FIG. 20. Customers can, however, skip this step and accept the "standard load" for a 7,000 song device. To facilitate this procedure, the Device Optimization Program that will load all 4 and 5 PI (Popularity Index) music and perhaps a random selection from the roughly 10,000 song 3.0 PI collection. That random selection may be changed every time the customer connects his/her device to facilitate variety.

(For the first few times, this may mean downloading up to roughly 1,500 songs per episode until songs titles for the entire 3 PI collection are on the PC.)

Playlist Rotation For Small Devices: Customers will likely want more changes in songs/playlists for very small pre-loaded devices than larger devices. While a 7,000 song library may last a while, a 1,000 song library will get stale quick. For that reason, in-the-car embodiments of the present invention may want a very large capacity device to compete with satellite radio. To simplify and automate this process a two-step playlist rotation system is advantageously employed. As an example, let us assume the customer has only a 4 GB/1,000 song device. In Step 1, described above, the customer had used the Genre/Popularity Process to choose a 7,000 song library. (Of course those that want to, can choose a 1,000 song library by eliminating 29,000 songs or building a customized playlist.) This will still allow several hundred pre-programmed channels to appear on the device. Specifically, a standard 7,000 song load includes over 400 channels, even if Explicit is included.

In Step 2, the media player will automatically reduce the size of each playlist proportionately to adjust to the device size. In this example, all 400 channels get reduced to 1,000/7,000=14.2% of their normal length. This 14.2% is then randomly replaced with a new 14.2% every time the customer "updates" their portable device. While this will require new song downloads, the downloads are minimal in size. The result is a maximizing of the variety and discovery available from even a very small device.

The 30,000 Song PC Library may be Download Automatically: In a particularly advantageous embodiment, the entire 30,000 song library may be downloaded with the PC software (media player) used by most portable music services. Furthermore, the Genre/Popularity Omission process allows that library to be customized in one simple step at the order-process level. This allows all 620 music channels to be streamed from the PC with no additional customer interaction.

Pre-loading the Device Is Very Advantageous When Downloading Large Song Libraries: As discussed above, loading portable devices may be minimized to a two-step process. In the first step, the customer downloads the entire song file (4 MB) in order to then side-load it to a portable device. At DSL speed, downloading the initial library can take up to 15 days and would require a great deal of the customer's PC capacity. Other options available to minimize this download include: packages of high density DVD's; portable external hard drives; memory cards; USB sticks; etc. The initial download may also proceed at night or when the computer is idle to minimize the inconvenience to customers.

Better bit-torrent technology, faster chips, and much bigger pipes will obviously help solve the time and costs associated with downloading large song libraries directly over the Internet. Satellite, mobile, and wireless solutions are also on the horizon. These may eventually accomplish the same result without a PC or the internet. In fact, some embodiments of the present invention involve a variety of these wireless, mobile, and satellite solutions in addition to the Internet download and side-load process.

PBM Express Loading Stations: The above-described Express Service preferably utilizes one or more Express Loading Stations and methodology. By securing the necessary digital rights from content owners, the Express Loading Station(s) provide a unique solution to share a single downloaded library of subscription DRM-protected songs with multiple subscriber devices. This is believed to be an industry first. Since downloading at DSL speed currently requires roughly 28 seconds per song, while side-loading from the PC to the device is only about 4 seconds, the Express Loading Station embodiment represents a 7× improvement over current methods to load portable devices.

Authorized Retailers: The Express Loading capabilities may be placed in major retailers, such as Best Buy, Circuit City, Radio Shack, etc. Authorized Retailers would likely have a variety of fully-loaded floor models to demonstrate to consumers. In fact, these retail locations may have an Express Loading Station at each facility or at the retailer's central service facility or facilities. The buyer would be able to purchase the device and service, and later that same day, pick-up the custom-loaded device at the store, or have it mailed to them. Some retail partners may provide branded portable devices as well.

Configuration and Customization of Devices: One of the biggest headaches now facing consumers is the process of formatting and configuring their portable devices to accept various kinds of playlists and song collections. Prior to pre-loading the customer's device, the present embodiment will see to it that the settings are set properly so the device arrives ready to play right out of the box. In some cases, the device partners may also use one-time firmware updates to facilitate the use of the library and channels. The Express Service ensures everything is installed properly with no inconvenience to the customers.

Testing and Online Sale of Authorized Devices: The present embodiment ensures that specific devices can be properly pre-loaded and operated by the customers, because the loading and testing of devices is performed at the Express Loading Station(s) by authorized technicians.

Finding Music Channels to Listen to: Except for Internet Radio, it is not clear to what extent consumers use the known fully-interactive subscription platforms (e.g. Napster, Rhapsody, Zune, etc.) to listen to pre-programmed music channels or "playlists." Most consumers probably just load songs from the massive unfiltered song universe. They create their own playlists that they update regularly. In general, these are active online music people or they would not fool with these systems to begin with. Consumers who want to listen to playlists or channels over the internet on their PC or portable device have two basic choices. 1.) They can enter the names of "preferred" songs, artists, or entire playlists into their PC and hear a list of similar songs. Or, 2.) They can choose from a list of themed playlists as described above. None of the known platforms offers a well organized song library or numbered channel menu similar to the embodiments described above. Rather, the known platforms offer a random collection of themed playlists with no connection to each other, instead of generating them from a single database using various criteria as described in the embodiments above. Also, since known platforms have no library or database of just their recommended songs, customers cannot look for recommended artists or songs in this small collection.

Traditional Programming Versus Content Management according to the present invention: Not one of the known platforms offers a content management or delivery system similar to that described above. As suggested earlier, all of the services offering either Internet radio or streaming playlist services work from a small collection of recommended songs. In Napster's case, they advertise access to a 6,000,000 song universe but only recommend (via pre-programmed playlists) roughly 12,700 songs. Pandora, LastFM, Slacker, Rhapsody, and the rest are similar in size and all are likely below 20,000 recommended songs. This does not include "user generated" playlists, which in Rhapsody's case includes 20 categories with hundreds of playlists. LastFM is a bit different since one could argue it includes all the playlists of its 20 million members. In contrast, the present embodiments have classified roughly 75,000 songs, but only 30,000 are allowed to survive all 5 filtering stages at any one time.

Figure 25:
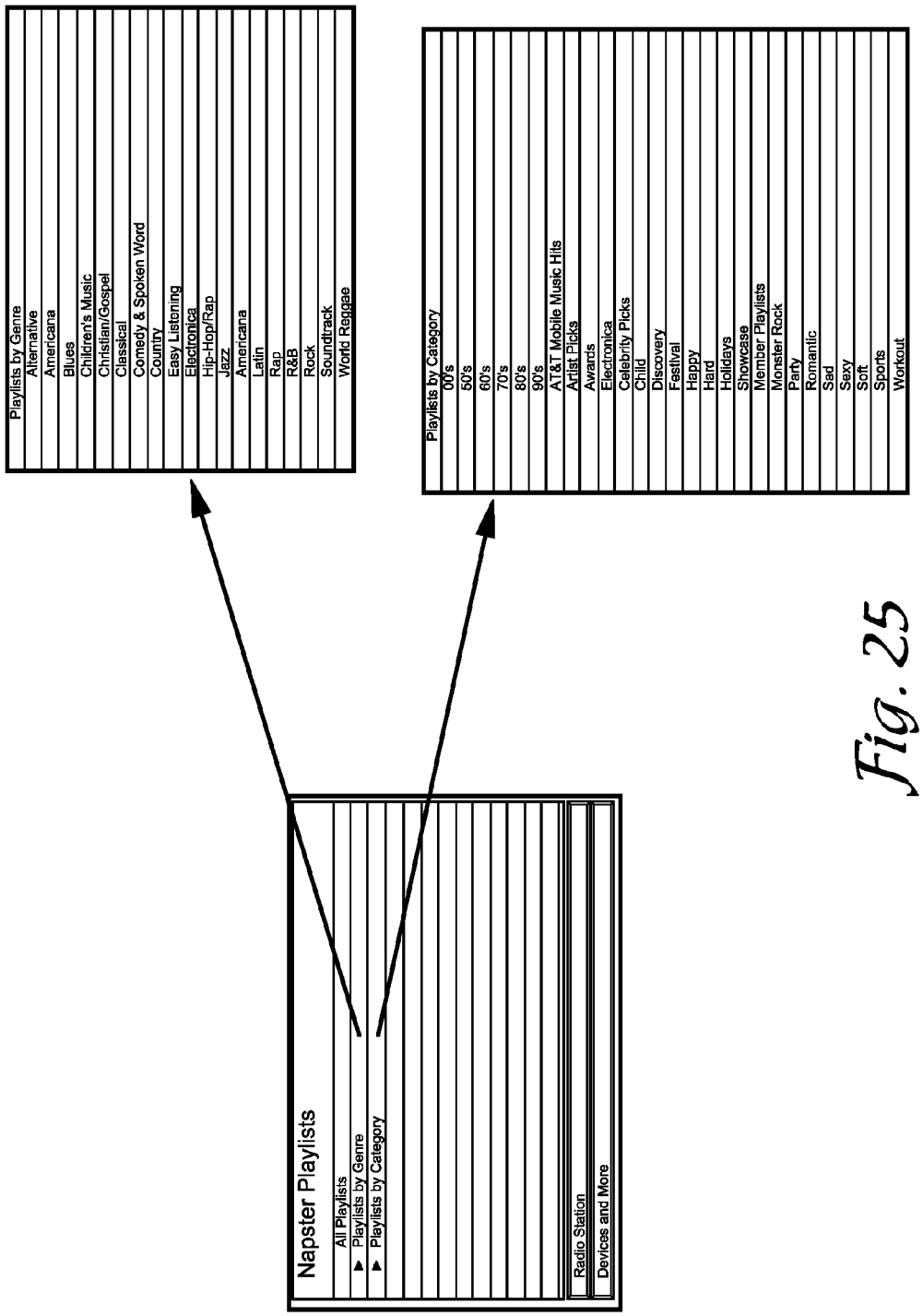
FIG. 25 is a diagram showing Napster Playlists.

Pandora's, Slacker's, Rhapsody's, etc. recommended songs are acquired and listened-to using traditional programming techniques, as described above in the section describing the Filtering and Acquisition of songs. The present embodiments, on the other hand, automatically update the song library from over 400 sources on a daily basis; as well as the only provider operating a Remote Contributor Network. Traditional programmers construct themed playlists from their individual, hand-picked collections. In Napster's case, they offer roughly 878 manually pre-programmed themed playlists. MTV/Urge, now owned by Rhapsody, had roughly 1,000. Of those in Napster, 116 were random song choices submitted from celebrities or famous artists. Seventy were the "best of" for specific artists, and the rest are presumably pre-programmed by their staff. Another 1,344 are simply Billboard charts. Selecting one of these 878 Napster themed playlists can require three steps as shown in FIG. 25. For example, if you choose "Playlists by Genre," you then must choose from 19 genres and then choose from the 744 playlists assigned to specific genres. While songs are not individually classified by multiple genres, their themed playlists are. For example, the "Steel Guitar Genius" playlist is found under genre; American, genre; Blues, and genre; country. 104 playlists representing roughly 3,298 songs are crossed to more than one genre. The present embodiments, on the other hand, use 31 genres and the vast majority of the library is crossed to multiple genres.

On Napster and all other platforms, the songs themselves are not individually classified by multiple criteria. Therefore, there is no way to listen to playlists representing music across all the genres and categories, based on a particular criteria (e.g. mood, popularity, or era). One can only hear songs from one of the 878 themed playlist at a time. This quickly reduces both the variety and discovery for Napster customers. It is also a lot more work.

In fact, on the other platforms, one cannot even select an entire Genre. "Alternative," for example, requires choosing from among 80 different tiny playlists. Except for "decades", the "categories" used by Napster (and the other platforms) include many mystery themes such as "Chillout"—29 playlists, "Happy"—36 playlists or "Sexy" 14 playlists. Finding a relevant list is a lot of work, and the average list has only 18 songs. One reason the playlists are so tiny is that themed playlist programmers do not automatically include songs into multiple playlists, in contrast to the embodiments described above. For example, in Napster's case, all 878 playlists contain 15,179 songs in total from a recommended library of only 12,726 songs. Therefore, only 16% of their recommended collection appears in more than one list. By definition, every song in the 30,000 song library according to the present embodiments appears in 6 to 8 different lists. Those include 1.) artists, 2.) primary genre, 3.) secondary genre, 4.) popularity level, 5.) era, 6.) mood, 7.) year of original song release, 8.) sometimes a foreign language. The result is that most playlists according to the present embodiments have hundreds of songs; lists with only 17 songs (the Napster average) are extremely rare in the present embodiments. Tiny playlists not only limit discovery, but require a far more active listener with constant access to their PC.

Napster, like the other known services, provides a collection of themed playlists, not a library. As a result, they offer an "artist favorites or best of" list on only 70 artists. Requesting other artists creates a massive multi-album dump from their 6,000,000 song unfiltered universe. The library according to the present embodiments, on the other hand, provides a carefully selected favorites list on over 21,000 artists in it's library. This is coupled with the ability to search the 4 million song MediaNet library for more songs/artists/etc.

There is no way of knowing what % of Napster's 743,000 subscribers use the Napster-to-Go option or both download and side-load their themed playlists. Those that do use Napster-to-Go probably create their own playlists for that purpose. Without the Playlist Generator Database technology described above, all of the known services would have a lot of trouble determining which individual themed playlists to pre-load to a device. These songs could then only be retrieved by searching the individual themed playlists that were pre-loaded. The present embodiments, on the other hand, can simply load an entire library at a certain popularity level to fit the device (e.g., 7,000 songs to a 32 GB flash device) and generate several hundred playlist options in a numbered channel menu. Finally, since the playlists on the known platforms are not categorized by searchable criteria, a numbered menu would make almost no sense. This is virtually a requirement if one is designing libraries and music channels to pre-load to portable devices.

The Playlist Recommender System may also provide ranked music channels. By inserting the names of one or more artists or songs into the designated field on the Push Button Music (PBM) media player, the Playlist Recommender System will rank the music channels containing those choices and/or the most similar music. If a customer cannot find a particular song or artist on the PBM recommended library, they may be automatically connected to a 4,000,000+ song library maintained by a music provider, such as MediaNet.

The PBM Express Service may use the following steps to offer such a service. These steps can be performed over the Internet or in-person at a retail location, or a combination of Internet and retail location.

Step 1: Customers will sign-up for the Express Service via PBM's website using, for example, a credit card.

Step 2: At sign-up, the customer will agree to purchase an authorized MP3 player from the PBM online store. Initially, this may include, for example, a 60 GB/14,250 song MP3 player from Creative Labs (HDD), and/or a 32 GB/7,600 song player (flash drive) from the same company. These pre-loaded devices may retail at $399.99 and $349.99, respectfully. Of course, other players may, be offered as well.

Step 3: On the order form the customer will then be asked to OMIT any of the 30 genres offered by PBM they do not want on their PC library or loaded to their portable device (e.g., explicit rap).

Step 4: Acting as the customer's agent, PBM will then register the customer as a PBM subscriber and download a PBM media player to a PBM Express Loading Station (preferably located at one or more PBM company sites). Note that each media player preferably comes pre-installed with a 30,000 song library and 620 pre-programmed music channels. At the PBM Express Loading Station, PBM will then side-load the customer's chosen portable device with the most popular music available from the genres the customer did not omit in step 2.

Step 5: Within 72 hours the customer will receive by priority mail: 1.) A fully loaded MP3 player ready to play. 2.) A hard-copy channel menu for their device (similar to a cable TV menu) and 3.) A simple to read instruction sheet.

Step 6: Using the instruction sheet (also found on the PBM website), the customer will download the media player to their own PC. The instruction hand-out will also tell them how to use the PBM media player to accept daily updates, re-authorize their subscription every 30 days, and make changes to the contents of their portable player, if desired.

Playlist Recommender System A: In a further embodiment, customers may take advantage of PBM's Channel Recommendation Service. The Channel Recommendation Service will allow customers to use their known artist and song preferences to find "similar" music. The customer will submit any number of artist or song titles. The ten pre-programmed channels containing the most of such songs, and artists will then be ranked in order or relevance. Since the songs on these channels were "filed" using the same criteria, they are, by definition, similar. No pattern recognition is required, as described below. The more songs and artists submitted, the more likely the songs/channels recommended will match their preferences. For customers who choose to do so, these recommended channels can then be further refined using the Create Your Own Playlist program described above (e.g., provide only 1948-1955, etc.).

Playlist Recommender System B: Nearly all digital music platforms, including internet radio, subscription services and a-la-carte download stores have some method of recommending songs based on stated user preferences. These include iTunes, MyStrands, Pandora, LastFM, Rhapsody, Yahoo, Zune, and many others. All of these claim that their recommendations help listeners to "discover" new music. Another method is to share recommended songs or entire playlists with your "friends" on social networking platforms such as Facebook (iLike) or MySpace. All of these recommendation services attempt to help the customer sort through an unorganized and unfiltered universe of approximately 5,000,000 songs. There are a few common principles that these first generation systems use, which are rarely discussed. One example that is well known in the broadcast industry, is the fact that over 90% of all listeners only care about a tiny universe of songs. There is, in fact, a surprising consensus regarding the most popular artists and songs, even in tiny audience genres. Broadcast Data Systems proved this reality over many years by detecting almost all airplay over 1,400 stations from all formats, in 33 markets with a song database of only about 10,000 songs. In fact, file sharing data and the iTunes top 100 still match the top station playlists and the charts almost perfectly.

Playlist Recommender System C: Many of these first generation recommendation systems rely upon complex pattern recognition algorithms to "match-up" the fingerprint of the customer's submitted "preferred" songs to their small library of "recommended song" fingerprints. This technology was first applied by Broadcast Data Systems in the 1980s to detect airplay at above 98% accuracy. Now, these song fingerprints are often referred to as song DNA. But, these first generation systems have serious and unnecessary drawbacks. Developing digital fingerprints for both the recommended songs and the submitted preference songs is a time consuming, labor intensive process. Recovering the cost of this process in a world dominated by free music is virtually impossible under any business model. The target audience for the present embodiments includes the vast majority of music listeners that are mostly passive; they have only a few "preference" songs from a very narrow time frame and set of genres. This is supported by the fact that the average iPod library contains less than 300 songs. Using this tiny universe to dictate what the customer wants to hear next is inherently limiting. In fact, asking for songs similar to the few songs one is familiar with, is the opposite of "discovery." Asking for suggestions from large crowds of uninformed casual listeners (i.e., social networks), is a terribly ineffective way to find good music. At best, it will simply replicate the actual listening and purchasing habits of the same crowds. Or, at worst, songs not in the relevant 20,000 will be recommended for the wrong reasons. This is bad "discovery." Furthermore, valuable suggestions from "friends" usually come from someone who simply heard the song on terrestrial, internet, or satellite radio before the customer did.

Playlist Recommender System D: These simple observations are why radio, in all forms, is still by far, the biggest method for effective new music discovery. The existence of competent programming choices is one reason why radio remains the biggest source of new music discussion. In fact, terrestrial, satellite, and internet stations all recommend the same tiny universe of songs with very tight playlists, even in the digital age. Just because new technology is available does not mean people want to change their own habits to adopt to it. And, in many cases it is just irrelevant. For example, before MySpace, there were the same 174,000 garage bands. However, now it is assumed that people actually want to listen to them. They do not. This is why technologies such as Sno-Cap, Qtrax, Spiral Frog, Imeem and others are simply not relevant. And, in a world of free music, will likely fail as business models. Asking a pattern recognition system to identify exactly the correct song from millions of fingerprints is possible and was performed by BDS in the 1980s. Asking it to identify a "similar song" requires human beings to subjectively identify the "important" similarities for both the recommended songs and every user-submitted preference song. The present embodiments do away with this entire process by simply filing the songs as best as possible into a well organized library.

Playlist Recommender System E: The Method of Song Recommendation: The recommendation and discovery system preferably comprises four steps:

Step 1: The best way to "filter out" bad music is to control the sources allowed to suggest music to the system in the first place. In this regard, present embodiments use the above-described filtering and classification system to identify the most popular songs in 30 genres dating back to 1918. This process incorporates actual file sharing, listening, purchase, and download data, not mere opinions. To this, present embodiments add the implied editorial opinions of radio programming, major venue managers, record label A/R departments, and magazine editors going back several decades, as described above. The result is a very narrow song list representing ⅔ of 1% of the 5,000,000 song digital music universe now available. Thus, the entire library is already recommended by both established experts and mass audience behavior.

Step 2: These pre-filtered and recommended songs are then filed in a well-organized library using the above-described classification and retrieval system. This incorporates multiple criteria, in addition to artist name and year of song release. These include Popularity, Mood, Era, Date of song release (not album), Multiple Genres (cross-over) and many others. Note that present embodiments do not offer a "quality" related star system based on popular opinions like every other system now available. The Audience Reach criteria according to the present embodiments is a much better controlled proxy for quality. This is because it can be measured quantitatively and is self-educating as more actual customer data is incorporated into the filters.

Step 3: These criteria then become the backbone of the song retrieval system. This straightforward library system allows people to quickly find 1.) exactly what they are looking for (if they know) or 2.) choose types of music they are less familiar with or 3.) combine both.

Step 4: Finally, for added convenience, present embodiments have 620 pre-programmed music channels that are broadcast (i.e., streamed) over Internet radio to the PC and include in every portable device menu for listening in the car or anywhere. This menu will be updated on a monthly basis, just like satellite TV. As a result of these innovations, the customer never hears the unfiltered music and no ineffective pattern recognition system is required.

Click through to MediaNet: In another embodiment, customers will be given automatic access to one or more web-based song libraries, such as MediaNet's 4.0 million song database. In particular, a customer looking for a particular song, artist, or album will first be directed to the PBM 30,000 song library. If the requested song is not available, the customer will be, preferably automatically, linked to MediaNet's 4,000,000 song database. In a further refinement, the PBM system will then automatically submit frequent "misses" to the PBM song filtering process described above, for possible future inclusion into the PBM song database.

iTunes Conversion Option 1: In yet a further embodiment, the customer will have two options to convert and save their current iTunes library. The vast majority of PBM customers are likely to be iPod owners, and most will likely keep their iPod around for a while. One reason is that the more active users have built small libraries of their favorites averaging about 280 songs. This personal library normally includes music burned from CD's, downloaded from a file sharing site, and a few purchased from the iTunes store. Allowing such customers to access this personal library from the PBM service and device makes the transition to PBM much easier. Therefore, customers will be given two options to save their existing song library. Option 1: They can simply import the iTunes library into the PBM media player and enjoy that library as a separate destination. That is, the customer's personal library will be accessible separately from the 30,000 song PBM library by clicking on a button labeled 'Personal Library'. That button is also located on the "signing spreadsheet" described below. These songs can then be heard on the PC or side-loaded to the portable device, provided they are not restricted. The iTunes songs preferably will not be combined with the 30,000 song library or 620 music channels. However, if the customer's PC crashes or their device is lost, they will still have to rely upon iTunes back-up procedures for iTunes songs, as they do today.

iTunes Conversion Option 2: The customer is given the ability to convert as much of their current iTunes library into PBM subscription-based music as possible. To implement this, PBM will import the customer's iTunes library into the PBM media player. Using a text matching program, roughly 80% of the customer's iTunes songs will be found in the MediaNet 4,000,000 song database and assigned a MediaNet song ID. The customer will then receive a report on the 20% PBM could not find. The customer will also be told what portion of the 80% available from MediaNet is already in the PBM 30,000 song library. If the customer chooses to do so, PBM can duplicate these PBM songs in their Personal Subscription Library as well. To accomplish that, PBM will create a text file containing the MediaNet ID's on the 80% PBM found, and store that on the PBM server under the appropriate user number. However, some customers may choose to reduce their Personal Library to save storage capacity on their PC and their portable player. Songs not available on MediaNet will have to remain in their Personal Library. With Option 2, the customer will have a subscription-based copy of most of their personal library. This "Personal Subscription Library" playlist will load to the same PBM authorized device under the same monthly fee. To save space on the device, the PBM media player will be sure that subscription songs already found on the PBM library will not be side-loaded twice. The side-load total now appearing on the media player will have to account for inclusion of the Personal Library when necessary. A benefit for customers to create a subscription-based copy of their existing iTunes song library is PBM's Crash and Loss program discussed below. Depending on the logistics and expenses involved, PBM may require a fee for the Option 2 conversion service.

Horizontal Discovery: This is defined as discovering songs of a similar genre, time period, or artist collection to those the customer is already familiar with. With 30,000 recommended songs, the pre-programmed channels according to the present embodiments are much deeper than the playlists of terrestrial, satellite, or Internet radio broadcasters. Going to simply "all songs 1.0 and above in audience reach" will likely generate songs that even a very narrowly focused listener has not heard before. The Channel Recommendation System described above is an especially effective way to generate Horizontal Discovery. By submitting a target playlist or artist group, it will identify exactly which pre-programmed channels have the type of music they are looking for.

Vertical Discovery: This is defined as including songs from genres, time periods, and artist collections that are unfamiliar to the customer. One method to promote Vertical Discovery is to select channels based only on a particular mood, popularity level, or Era (e.g., New Release) across all 30 genres.

Acting upon Discovery: Once customers discovers new songs, they should be able to ADD, OMIT, SAVE, and PURCHASE the discovered songs to their authorized devices as soon as possible. This is important in order to distinguish from, satellite radio, and portable internet radio schemes, such as Slacker.

Re-Rating for Popularity: After the rating team has rated the 30,000 songs in the library, the team will re-evaluate the popularity of many of these songs in order to make room for future candidates. From time to time, the entire song catalog may be re-evaluated for popularity as songs move from the Recent to Modern eras. Even the customer base will provide valuable "skip" information to help access popularity. This is especially important for songs from the Remote Contributor Network that have never been exposed to a large audience.

Crash and Loss Protection: A very large number of iTunes/iPod users now realize that the system locks up or the device fails, frequently. This is especially true with very large libraries on the larger iPods that do not use flash based memory. The customer's PC may also crash (or become infected) for dozens of reasons unrelated to their music use. The problem today, is that it is extremely difficult to reliably back-up even a moderately sized iTunes on an external memory device. Apple offers no support or advice for such activity. Most customers simply do not have the time to carefully back-up an ever changing iTunes library. As a result, they risk losing their entire library, and many have. Finally, the iPod itself may have a large list of favorites stored in the on-the-go list, which will be gone if the device is lost. In another embodiment, the present invention can maintain a text file of: 1.) the genres the customer omitted from their PC library, 2.) the songs they downloaded and sided-loaded to their portable device, 3.) the changes (omissions) they made to any of the 620 channels 4.) their pre-set station favorites and 5.) their customized playlists. This is a lot of information that is very valuable to the customers in case of PC and/or device failure. For an extra fee of perhaps $5.00 per month, or a onetime fee of perhaps $120, PBM will store that text file on a PBM server under the customer's user ID. This insures that the information on the customers' devices and/or the libraries on their PCs can be replaced quickly.

Figure 26:
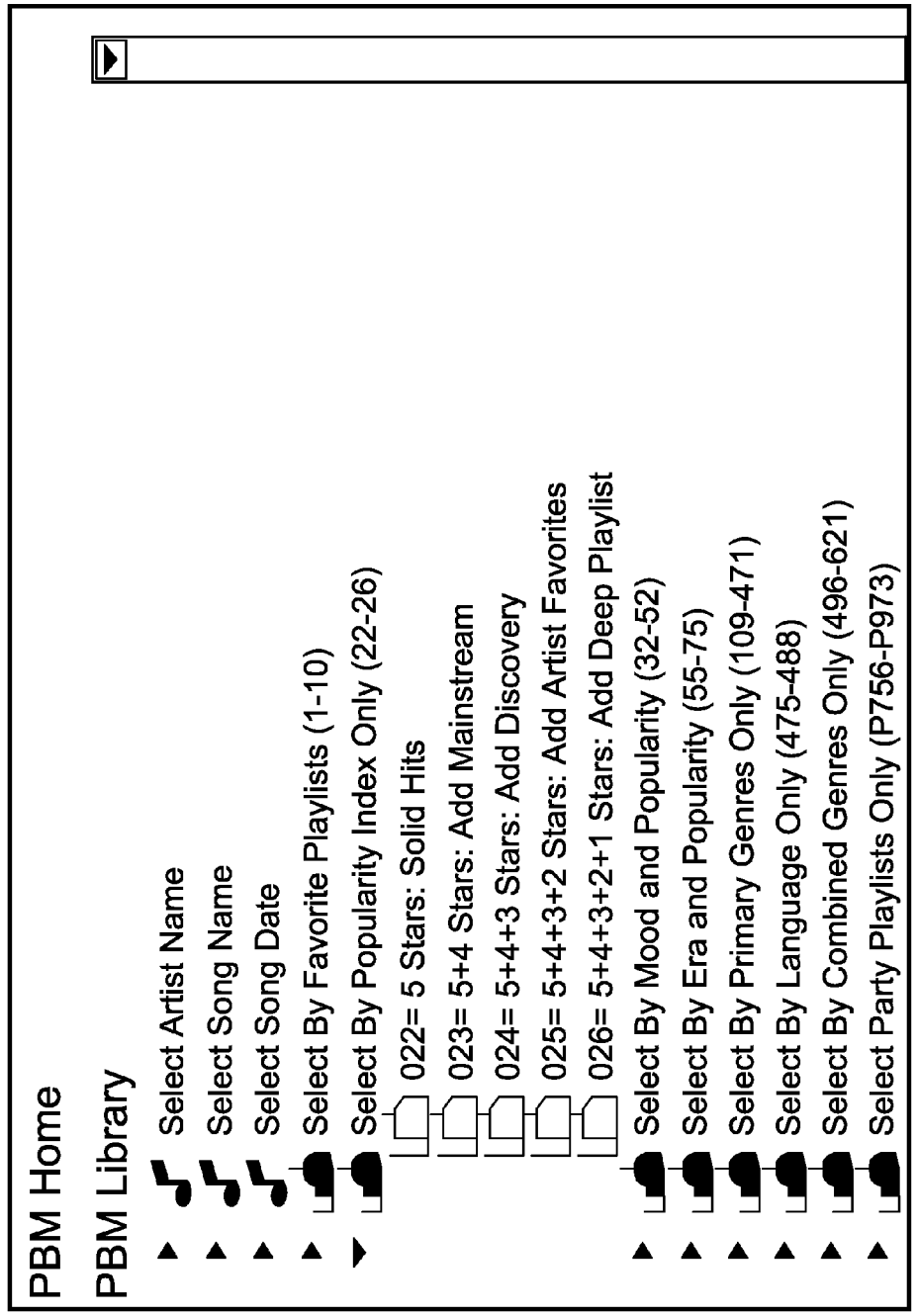
FIG. 26 is a diagram showing Playlist Menu Sub-directories.

Device Subdirectory: Just like cable TV, new subscribers will review the current channel guide or scroll through hundreds of choices on their device (or PC) to decide which channel(s) they want to hear. The ability to then pre-set their favorite stations (channels) greatly reduces the need to repeat this process over and over. However, to make searching the menu easier, the 620 channels are preferably organized into a sub-directory which preferably appears on the left-hand side of the media player on the PC. This subdirectory (shown below in FIG. 26) makes it much easier to find the type of channel the customer looking for, without scrolling through the whole menu. Even more preferably, his subdirectory will appear on the device itself.

Device Omit Button: In yet another embodiment, customers will be able to transfer Customer Actions on the portable device to the PC-based media player. For example, an Omit Button (or sequence on the device) may be provided on the device that allows customers to continuously customize the 620 music channels on both the device and, after synching with the PC, on the PC media player. Thus, customers will have a method to omit a specific song from a specific music channel, or the entire library, from the portable device. This will ensure an omitted song will always be omitted from that playlist even when a new sync occurs. This omit button has these principle benefits: 1.) Over time, customers can use this feature to customize their 620 channels, further reducing the need to build their own playlists; 2.) Customers can risk a higher level of discovery by totally removing unwanted songs versus skipping them over and over; and 3.) The PBM churn rate will be very low, since customers are unlikely to drop the PBM service and lose their customized playlists and library.

Device Save Button: A Save Button (or sequence) may also be provided on the device. The device will have a favorites list, but it will also be transferred from the device to the PBM media player. Likewise, a Purchase Button (or sequence) may also be provided on the device. There are many reasons a customer may want to purchase a song, and such a capability would permit them to do so.

Web Based Customer Interface That Contacts the PC-Based Media Player: After receiving the loaded device in the mail, the customer will register on-line and then go through a multi-step process to download and install PBM's 25 MB media player to their PC. The PBM media player is a PC application that controls what happens to the music on the customer's PC, much like iTunes™. This includes providing a "singing spreadsheet", a screen that appears like an Excel spreadsheet in format. While music is playing, it displays all the songs in a playlist, while offering buttons to search for songs, artist, or other playlists. It also displays the play, pause, rewind buttons, etc. that appears on the PC. This screen allows customers to choose songs and playlists from their current library and listen to them on their PC. The media player may also be used to select playlists and songs to download from the MediaNet server and to side-load the selected songs to the portable device.

The PBM media player (currently built by J River) is designed to make customer interaction with the PBM service easy. Unfortunately, even the best designed currently-known media players do not have the simplicity, appearance, interactivity, or navigation tools found on a state-of-the-art website. As a result, such media players are far less intuitive and simple to use. For now, the customer will download the media player and use it directly to perform certain of the tasks discussed above. However, the web based customer interface may be linked directly to the media player. This linkage will allow the website to instruct the media player what functions to perform. The website would then appear inside the player, and may include somewhat complex text instructions (and a link to video instructions) to help explain exactly how to work the media player to accomplish various tasks.

In an alternative embodiment, the customer will still download a very simplified media player to their PC when their Express Package arrives. This "embedded player" will then be largely invisible to the customer. Instead, the customer will use a very simple website to perform tasks on the service. The media player will only provide the basic "singing spreadsheet" that allows customers to choose artists, songs, and playlists to listen to from their current PC library. The website meanwhile will be one click away (or "always on") to perform any task, except listening to music on the PC.

In this alternative embodiment, the website will be designed to navigate the customer through the necessary clicks with little chance of error. For simplicity, it will be modeled after ATM's, airline ticket kiosks and satellite TV menus. For that reason, customers should rarely have to go to FAQ, Help, or e-mail customer service to complete their desired tasks. While PBM will still provide an instructional video for the entire process, the alternative embodiment will largely eliminate text instructions for completing tasks on the media player.

The Express Service may be offered to make receiving desired music even easier. The following steps may be used to offer such a service. The steps shown can be performed over the Internet or in-person at a retail location, or a combination of Internet and retail location.

Step 1: Customers will sign-up for the Express Service via PBM's website using, for example, a credit card.

Step 2: At sign-up, the customer will agree to purchase an authorized MP3 player from the PBM online store. Initially, this may include, for example, a 60 GB/14,250 song MP3 player from Creative Labs (HDD), and/or a 32 GB/7,600 song player (flash drive) from the same company. These pre-loaded devices may retail at $399.99 and $349.99, respectfully. Of course, other players may, be offered as well.

Step 3: On the order form the customer will then be asked to OMIT any of the 30 genres offered by PBM they do not want on their PC library or loaded to their portable device (e.g., explicit rap).

Step 4: Acting as the customer's agent, PBM will then register the customer as a PBM subscriber and download a PBM media player to a PBM Express Loading Station (preferably located at one or more PBM company sites). Note that each media player preferably comes pre-installed with a 30,000 song library and 620 pre-programmed music channels. At the PBM Express Loading Station, PBM will then side-load the customer's chosen portable device with the most popular music available from the genres the customer did not omit in step 2.

Step 5: Within 72 hours the customer will receive by priority mail: 1.) A fully loaded MP3 player ready to play. 2.) A hard-copy channel menu for their device (similar to a cable TV menu) and 3.) A simple to read instruction sheet.

Step 6: Using the instruction sheet (also found on the PBM website), the customer will download the media player to their own PC. The instruction hand-out will also tell them how to use the PBM media player to accept daily updates, re-authorize their subscription every 30 days, and make changes to the contents of their portable player, if desired.

In the Express Service, preferably a PBM employee working the Loading Station will: (i) register the customer as a subscriber, (ii) downloaded a media player to a device, in the customer's name, (iii) use that player to omit the genres the customer does not want, and (iv) side-load the most popular music available among the allowed genres, to fill-up the device.

When the customer receives their Express Package, the instruction sheet enclosed will explain how to install the media player onto the customer's home PC. If the player already reflects the actions taken at the Loading Station, the process will be far simpler. Another way to deliver instant music to the customer might be to choose a smaller set of files to load into each device, then let the player fill in at night while the user sleeps. Several different sets of music could be offered (hip hop, hippy, etc.).

Tasks Avoided: The above-described PBM Express Service will allow the customer to initially avoid (i) installing the media player to their PC, (ii) eliminating the music genres they don't want, and (iii) side-loading their portable device. However, any changes the customer wants to make to these settings after they receive their Express Package at home will still require installing and using the media player. At a minimum, they will have to use the player to update their PC and portable device libraries with new music and renew their subscription every 30 days.

Bandwidth/Convenience: The Express Service option will minimize any problems associated with downloading large song libraries over the internet. For example, at DSL speed, a 30,000 song library can take up to 15 days to download to a customer's PC, at a significant cost. By downloading the entire library to an authorized Loading Station, PBM can then side-load the same library to a portable device in only a few hours at a very small cost. Updating the portable player with new music will require customers to first download the music to their PC and then side-load the device. These volumes, however, are quite small in most cases. Using an Express Loading Station in this manner avoids "pre-loading" devices themselves. Pre-Loading is often not permissible under the terms of Data Rights Management agreements with music libraries and record companies. Also, pre-loading the device itself may cause problems related to library content, inventory stocking, and manufacturing delays.

Online Device Sales: In early 2008, customers seeking non-iPod devices and a way to load them face a dizzying array of devices, download services, music libraries, and copying restrictions. By selling authorized devices directly, the present embodiments eliminate this problem. Device manufacturers such as Creative Labs, Sony, Sandisk, Samsung, Toshiba, Philips, Archos, Zvue, and various mobile phone manufacturers may supply the devices.

8. Conclusion

Thus, what has been described is apparatus and method for providing consumers with whole or partial libraries of pre-categorized songs for quick and painless download to their PCs and/or portable music players.

The individual components shown in outline or designated by blocks in the attached Drawings are all well-known in the music arts and Internet, and their specific construction and operation are not critical to the operation or best mode for carrying out the invention.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents discussed above are hereby incorporated by reference into the Detailed Description of the Preferred Embodiment.

What is claimed is:

1. A method of preloading a portable music device for a consumer, comprising:
   identifying from third party sources a first subset of songs comprising songs available to consumers through commercial channels;
   identifying a second subset of songs from said first subset of songs; wherein each song of said second subset of songs has an estimated audience reach level above a predetermined audience reach level;
   associating said audience reach level, a mood or tempo, an era, a genre, and an initial release date with each song identified in said second subset of songs; and
   loading onto a portable music device a selection of said second subset of songs to the extent of available memory on said portable music device,
   wherein said selection of said second subset of songs loaded onto a portable music device are selected according to a selection method comprising:
   selecting a maximum number of songs desired to be loaded onto said portable music device;
   applying a forced audience reach curve to said second subset of songs; and
   making a selection of songs having the highest audience reach on said forced audience reach curve; wherein said number of selected songs corresponds to said maximum number of songs desired to be loaded onto said portable music device.

2. A method of preloading a portable music device for a consumer, comprising:
   determining a maximum number of songs desired to be loaded onto said portable music device;
   applying a forced audience reach curve to a subset of songs having a predetermined audience reach; and
   making a selection of songs from said subset of songs having the highest audience reach on said forced audience reach curve; wherein said number of selected songs corresponds to said maximum number of songs desired to be loaded onto said portable music device.

3. The method according to claim 2, wherein said subset of songs is selected from a plurality of third party sources.

4. The method according to claim 3, wherein said audience reach for each of said subset of songs is calculated from song activity data.

5. The method according to claim 4, wherein said song activity data includes terrestrial airplay activity, compact disc sales, internet airplay activity, file sharing activity, and internet downloads.

6. The method according to claim 2, further comprising assigning to each song descriptive data specific to said song.

7. The method according to claim 6, wherein said descriptive data specific to each said song comprises at least: song name, artist name, estimated audience reach level, mood or tempo, era, genre, and initial release date.

\* \* \* \* \*